US008775842B2

(12) United States Patent
Sasaki et al.

(10) Patent No.: US 8,775,842 B2
(45) Date of Patent: Jul. 8, 2014

(54) MEMORY DEVICE, DISPLAY DEVICE EQUIPPED WITH MEMORY DEVICE, DRIVE METHOD FOR MEMORY DEVICE, AND DRIVE METHOD FOR DISPLAY DEVICE

(75) Inventors: Yasushi Sasaki, Osaka (JP); Yuhichiroh Murakami, Osaka (JP); Shige Furuta, Osaka (JP); Seijirou Gyouten, Osaka (JP); Shuji Nishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 317 days.

(21) Appl. No.: 13/395,739

(22) PCT Filed: May 18, 2010

(86) PCT No.: PCT/JP2010/058384
§ 371 (c)(1),
(2), (4) Date: Mar. 13, 2012

(87) PCT Pub. No.: WO2011/033823
PCT Pub. Date: Mar. 24, 2011

(65) Prior Publication Data

US 2012/0179923 A1 Jul. 12, 2012

(30) Foreign Application Priority Data

Sep. 16, 2009 (JP) ................................. 2009-215069

(51) Int. Cl.
*G06F 1/32* (2006.01)

(52) U.S. Cl.
USPC ............................ 713/323; 345/545; 365/227

(58) Field of Classification Search
USPC ............................ 345/545; 365/227; 713/323
See application file for complete search history.

(56) References Cited

U.S. PATENT DOCUMENTS 6,522,319 B1 2/2003 Yamazaki
6,900,788 B2 5/2005 Yamazaki (Continued)

FOREIGN PATENT DOCUMENTS

JP 5823091 A 2/1983
JP 2002-175051 A 6/2002

(Continued)

OTHER PUBLICATIONS

International Search Report.
Written Opinion of Search Authority.

*Primary Examiner* — Albert Wang
(74) *Attorney, Agent, or Firm* — Harness, Dickey & Pierce, P.L.C.

(57) ABSTRACT

A memory device can perform a first operation mode in which a discrete level is supplied to cause the memory cell to retain a logical level, and prevent unnecessary power consumption due to an operation of a power source which is unnecessary in the first operation mode. The memory device includes: a first power source for supplying a first potential level; a second power source for supplying a second potential level, a third power source for supplying a potential higher than a highest potential of discrete levels; and a fourth power source for supplying a potential lower than a lowest potential of the discrete levels, the first and second potential levels being used to supply the discrete levels, when the first operation is carried out, VDD, VSS, and GVDD being caused to be in operation and the fourth power source being stopped from being in operation.

18 Claims, 41 Drawing Sheets

(56) References Cited

U.S. PATENT DOCUMENTS

| | | | |
|---|---|---|---|
| 2001/0024187 A1 | | 9/2001 | Sato et al. |
| 2002/0075205 A1 | | 6/2002 | Kimura et al. |
| 2003/0222838 A1 | * | 12/2003 | Iida et al. ........................ 345/87 |
| 2005/0195149 A1 | | 9/2005 | Ito |
| 2007/0024566 A1 | | 2/2007 | Miyazawa et al. |
| 2008/0309655 A1 | | 12/2008 | Ito |

FOREIGN PATENT DOCUMENTS

| | | | |
|---|---|---|---|
| JP | 2002-229532 | A | 8/2002 |
| JP | 2005-284271 | A | 10/2005 |
| JP | 2007-34095 | A | 2/2007 |
| JP | 2008-145632 | A | 6/2008 |
| WO | WO-9940561 | A1 | 8/1999 |

* cited by examiner

| | | GVDD | VDD | VSS | GVSS |
|---|---|---|---|---|---|
| NORMAL MODE | NORMAL WRITING | 10V | 5V | 0V | −5V |
| MEMORY MODE | ALL WRITING | 10V | 5V | 0V | 0V |
| | REFRESHING | 10V | 5V | 0V | 0V |

FIG. 15

| POL | 0 | | 1 | |
|---|---|---|---|---|
| DATA | 0 | 1 | 0 | 1 |
| POTENTIAL OF BIT LINE | L | H | H | L |

MEMORY DEVICE, DISPLAY DEVICE EQUIPPED WITH MEMORY DEVICE, DRIVE METHOD FOR MEMORY DEVICE, AND DRIVE METHOD FOR DISPLAY DEVICE

TECHNICAL FIELD

The present invention relates to a memory device which can retain data.

BACKGROUND ART

As a liquid crystal display device for displaying a still image, there has been a liquid crystal display device which includes a pixel memory for displaying an image by (i) provisionally retaining image data written in a pixel, and (ii) carrying out a refresh operation while reversing a polarity of the image data. In a normal operation for displaying a multiple gray-scale moving image, new image data is written in the pixel via a data signal line every frame. Meanwhile, in a memory operation for displaying a still image, image data retained in the pixel memory is used. For this reason, during a time period in which the refresh operation is carried out, it is unnecessary to supply, to the data signal line, new image data to be written.

Accordingly, an operation of a circuit for driving a scan signal line and an operation of a circuit for driving the data signal line can be stopped during the time period of the memory operation. This makes it possible to reduce power consumption. Moreover, the power consumption can be further reduced since (i) the number of times that the data signal line, having a large capacity, is charged and discharged, can be reduced, and (ii) it is unnecessary to transfer, to a controller, image data corresponding to the time period of the memory operation.

For the reasons described above, a pixel for carrying out such a memory operation is often employed for a case where a low-power consumption property is strongly required, such as a case where a standby screen is displayed on a mobile phone.

FIG. 38 is a view illustrating only a memory circuit part in each pixel structure of a liquid crystal display device employing such a pixel memory. The pixel structure illustrated in FIG. 38 has a liquid crystal capacitor C1*c* (indicated by a dotted line) so that the pixel having the pixel structure can be used as a pixel for a liquid crystal display device. Such a pixel structure is identical with a structure disclosed in Patent Literature 1, for example.

A memory circuit MR100 serving as the memory circuit part includes a switching circuit SW100, a first data retention section DS101, a data transfer section TS100, a second data retention section DS102, and a refresh output control section RS100.

The switching circuit SW100 is constituted by a transistor N100, which is an N-channel TFT. The first data retention section DS101 is constituted by a capacitor Ca100. The data transfer section TS100 is constituted by a transistor N101, which is an N-channel TFT. The second data retention section DS102 is constituted by a capacitor Cb100. The refresh output control section RS100 is constituted by an inverter INV100 and a transistor N103, which is an N-channel TFT. The inverter INV100 is constituted by a transistor P100, which is a P-channel TFT, and a transistor N102, which is an N-channel TFT.

Further, for each of rows of a pixel matrix, the following lines are provided to drive each memory circuit MR100: a data transfer control line DT100; a switch control line SC100; a high power source line PH100; a low power source line PL100; a refresh output control line RC100; and a capacitor line CL100. Furthermore, for each of columns of the pixel matrix, a data input line IN100 is provided.

As to a field-effect transistor such as the aforementioned TFTs, one of a drain terminal and a source terminal is referred to as "first drain/source terminal", and the other one of the drain terminal and the source terminal is referred to as "second drain/source terminal". Note, however, that, in a case where which one of the first and second drain/source terminals serves as the drain terminal and which one of the first and second drain/source terminals serves as the source terminal are determined on the basis of a direction in which a current flows between the first and second drain/source terminals, the first and second drain/source terminals are merely referred to as "drain terminal" and "source terminal", appropriately. A gate terminal of the transistor N100 is connected to the switch control line SC100. A first drain/source terminal of the transistor N100 is connected to the data input line IN100. A second drain/source terminal of the transistor N100 is connected to a node PIX which is connected to one of ends of the capacitor Ca100. The other one of ends of the capacitor Ca100 is connected to the capacitor line CL100.

A gate terminal of the transistor N101 is connected to the data transistor control line DT100. A first drain/source terminal of the transistor N101 is connected to the node PIX. A second drain/source terminal of the transistor N101 is connected to a node MRY which is connected to one of ends of the capacitor Cb100. The other one of ends of the capacitor Cb100 is connected to the capacitor line CL100.

An input terminal IP of the inverter INV100 is connected to the node MRY. A gate terminal of the transistor P100 is connected to the input terminal IP of the inverter INV100. A source terminal of the transistor P100 is connected to the high power source line PH100. A drain terminal of the transistor P100 is connected to an output terminal OP of the inverter INV100. A gate terminal of the transistor N102 is connected to the input terminal IP of the inverter INV100. A drain terminal of the transistor N102 is connected to the output terminal OP of the inverter INV100. A source terminal of the transistor N102 is connected to the low power source line PL100. A gate terminal of the transistor N103 is connected to the refresh output control line RC100. A first drain/source terminal of the transistor N103 is connected to the output terminal OP of the inverter INV100. A second drain/source terminal of the transistor N103 is connected to the node PIX.

Note that, in a case where a pixel is constituted in such a manner that the memory circuit MR100 includes the liquid crystal capacitor C1*c*, the liquid crystal capacitor C1*c* is connected between the node PIX and a common electrode COM.

Next, the following description deals with an operation of the memory circuit MR100 with reference to FIG. 39.

FIG. 39 shows a case where the memory circuit MR100 is in a memory operation mode, e.g., in displaying a standby screen of a mobile phone etc. Further, to the data transfer control line DT100, the switch control line SC100, and the refresh output control line RC100, a binary-level (represented by a high (active) level or a low (inactive) level) potential is applied from a driving circuit (not illustrated). The high level and the low level of the binary level voltage can be set for each of the lines described above, independently. To the data input line IN100, a binary logical level represented by a high level or a low level is supplied from another driving circuit (not illustrated). A potential supplied via the high power source line PH100 is identical with the high level of the binary logical level, while a potential supplied via the low power source line PL100 is identical with the low level of the binary logical level. Further, a potential supplied via the capacitor line CL100 can be either (i) constant or (ii) variable at predetermined timing. Here, the potential supplied via the capacitor line CL100 is constant for the sake of simple explanation.

The memory operation mode has a writing time period T101 and a refreshing time period T102. During the writing time period T101, data to be retained by the memory circuit MR100 is written. The writing time period T101 is constituted by a time period t101 and a time period t102 which sequentially follows the time period t101. During the writing time period T101, writing is carried out with respect to the memory circuits MR100, row by row, sequentially. For this reason, the time period t101 is set for each of the rows so as to terminate within a time period in which corresponding writing data is outputted. Further, as timing when the time period t102 terminates, the same timing is set for all of the rows, that is, as timing when the writing time period T101 terminates, the same timing is set for all of the rows. During the refreshing time period T102, the data, which has been written in the memory circuit MR100 during the writing time period T101, is retained while being refreshed. For all of the rows, the refreshing time period T102 is started simultaneously. The refreshing time period T102 is constituted by continuous time periods t103 through t110, which are sequentially provided.

During the time period t101 of the writing time period T101, the potential of the switch control line SC100 is high, while the potentials of the data transfer control line DT100 and the refresh output control line RC100 are low. This turns on the transistor N100, so that a potential of data (here, the potential is high), supplied to the data input line IN100, is written in the node PIX. During the time period t102, the potential of the switch control line SC100 becomes low. This turns off the transistor N100, so that an electric charge corresponding to the potential of data thus written is retained by the capacitor Ca100.

Here, in a case where the memory circuit MR100 is constituted by only the capacitor Ca100 and the transistor N100, the node PIX is in a floating state during a time period in which the transistor N100 is in an OFF state. In this case, ideally, the electric charge is retained by the capacitor Ca100 so that the potential of the node PIX is maintained to be high. In an actual situation, however, an off-leakage current is generated in the transistor N100. Accordingly, the electric charge retained by the capacitor Ca100 is gradually leaked to the outside of the memory circuit MR100. As the electric charge retained by the capacitor Ca100 is leaked, the potential of the node PIX is changed. In a case where the electric charge is leaked for a long time, the potential of the node PIX is changed to such a degree that the potential of data thus written loses its original meaning.

In view of this, the data transfer section TS100, the second data retention section DS102, and the refresh output control section RS100 are caused to refresh the potential of the node PIX so that the data which has been written would not be lost.

In order not to lose the data thus written, the writing time period T101 is followed by the refreshing time period T102. During the time period t103, the potential of the data transfer control line DT100 becomes high. This turns on the transistor N101, so that the capacitor Ca100 and the capacitor Cb100 are electrically connected in parallel to each other via the transistor N101. The capacitor Ca100 is set to have a greater capacitance than that of the capacitor Cb100. Accordingly, an electric charge is transferred between the capacitors Ca100 and Cb100, so that the potential of the node MRY becomes high. From the capacitor Ca100 to the capacitor Cb100, a positive electric charge is transferred via the transistor N101, until the potential of the node PIX becomes identical with that of the node MRY. This reduces the potential of the node PIX by a small voltage ΔV1, as compared with the potential of the node PIX during the time period t102. However, the potential of the node PIX is still in a range of the high level. During the time period t104, the potential of the data transfer control line DT100 becomes low. This turns off the transistor N101. As a result, (i) the electric charge is retained by the capacitor Ca 100 so that the potential of the node PIX is maintained to be high and (ii) the electric charge is retained by the capacitor Cb100 so that the potential of the node MRY is maintained to be high.

During the time period t105, the potential of the refresh output control line RC100 becomes high. This turns on the transistor N103, so that the output terminal OP of the inverter INV100 is electrically connected to the node PIX. Since a reversal potential (here, the reversal potential is low) with respect to the potential of the node MRY is supplied to the output terminal OP, the node PIX is charged with the reversal potential. During the time period t106, the potential of the refresh output control line RC100 becomes low. This turns off the transistor N103. Accordingly, the electric charge is retained by the capacitor Ca100 so that the potential of the node PIX is maintained to be the reversal potential.

During the time period t107, the potential of the data transfer control line DT100 becomes high. This turns on the transistor N101, so that the capacitor Ca100 and the capacitor Cb100 are electrically connected in parallel to each other via the transistor N101. Accordingly, an electric charge is transferred between the capacitor Ca 100 and the capacitor Cb100, so that the potential of the node MRY becomes low. From the capacitor Cb100 to the capacitor Ca100, a positive electric charge is transferred via the transistor N101, until the potential of the node MRY becomes identical with the potential of the node PIX. This increases the potential of the node PIX by a small voltage ΔV2 as compared with the potential of the node PIX during the time period t106. However, the potential of the node PIX is still in a range of the low level.

During the time period t108, the potential of the data transfer control line DT100 becomes low. This turns off the transistor N101. As a result, (i) the electric charge is retained by the capacitor Ca 100 so that the potential of the node PIX is maintained to be low and (ii) the electric charge is retained by the capacitor Cb100 so that the potential of the node MRY is maintained to be low.

During the time period t109, the potential of the refresh output control line RC100 becomes high. This turns on the transistor N103, so that the output terminal OP of the inverter INV100 is electrically connected to the node PIX. Since the reversal potential (here, the reversal potential is high) with respect to the potential of the node MRY is supplied to the output terminal OP, the node PIX is charged with the reversal potential. During the time period t110, the potential of the refresh output control line RC100 becomes low. This turns off the transistor N103. Accordingly, the electric charge is retained by the capacitor Ca 100 so that the potential of the node PIX is maintained to be the reversal potential.

The operations of the time periods t103 through t110 are repeated until the refreshing time period T102 is followed by the next writing time period T101. The potential of the node PIX is refreshed to the reversal potential during the time period t105, and is then, during the time period t109, refreshed to the potential supplied at the time of the writing. Note that, in a case where a low potential of data is written in the node PIX during the time period t101 of the writing time period T101, a waveform of the potential of the node PIX is such that a waveform of the potential, shown in FIG. 39, is reversed.

As described above, according to the memory circuit MR100 employing such a data inversion method, the data thus written is retained while being refreshed. In a case where the memory circuit MR100 includes the liquid crystal capacitor C1*c*, the potential of the common electrode COM may be set so as to be reversed between the high level and the low level at timing when the data is refreshed. In this case, it is possible to refresh black display data or white display data while causing such data to be subjected to polarity reversal.

CITATION LIST

Patent Literature

[Patent Literature 1]
Japanese Patent Application Publication, Tokukai, No. 2002-229532 A (Publication Date: Aug. 16, 2002)
[Patent Literature 2]
Japanese Patent Application Publication, Tokukai, No. 2002-175051 A (Publication Date: Jun. 21, 2002)

SUMMARY OF INVENTION

Technical Problem

In the normal operation mode in which (i) data is neither retained nor refreshed by the memory circuit and (ii) a multiple gray-scale moving image is displayed, a display device including a pixel having the conventional memory circuit described above requires a power source for generating an ON/OFF potential of a gate pulse. The ON/OFF potential is used in writing a data signal in the pixel as a potential indicating a positive level or a negative level with respect to the potential of the common electrode COM. In the arrangement illustrated in FIG. 38, the gate pulse is supplied from a row driver, which also serves as a gate driver, to the switch control line SC100, which also serves as a gate line. In the memory operation mode in which the memory circuit is used, the high level of the binary logical level indicating the data is 5 V, and the low level of the binary logical level is 0 V, for example. On the other hand, in the normal operation mode, an upper limit of the positive level of the data signal may be more than 5 V and a lower limit of the negative level of the data signal may be less than 0 V, for example. Further, there may be a case where the potential of a pixel electrode in which the data signal is written may be fluctuated due to driving of a retention capacitor line or driving of the common electrode, and, as a result, a range of the data signal may become wider than the range of 0 V to 5 V.

Accordingly, a relatively wide voltage range is required as an amplitude of the gate pulse. For example, a voltage range whose upper limit is 10 V and whose lower limit is −5 V is required, which voltage range is not within the range of the binary logical level in the memory operation mode.

For example, FIG. 40 shows a case where a range of a positive potential of the data signal, assigned to the potential (2.5 V) of the common electrode COM, is from 2.5 V to 7.5 V (a difference between upper and lower limits of the positive potential is 5 V), and a range of a negative potential of the data signal, assigned to the potential (2.5 V) of the common electrode COM, is from 2.5 V to −2.5 V (a difference between upper and lower limits of the negative potential is 5 V). Here, the range of the potential of the data signal (a difference between upper and lower limits of the potential) is 10 V in total. Such a range of the potential of the data signal can be generated by driving the retention capacitor line with the use of power sources of 5 V and 0 V. In this case, it is necessary for the amplitude of the gate pulse to have a lower limit of approximately −5 V. With the gate pulse of approximately −5 V, a selection element (the transistor N100 of the switching circuit SW100 in FIG. 38) of the pixel can be sufficiently turned off. Further, it is necessary for the amplitude of the gate pulse to have an upper limit of approximately 10 V. With the gate pulse of approximately 10 V, the selection element can be sufficiently turned on. That is, a difference between the upper and lower limits of the gate pulse should be approximately 15 V. For this reason, a 10 V power source GVDD and a −5 V power source GVSS are provided.

In the memory operation mode, however, the binary logical level which is represented by, for example, a voltage of 5 V or a voltage of 0 V, is written in the memory circuit, and a signal having a large amplitude, such as an amplitude of 15 V, is not used. Accordingly, there has been a problem of unnecessary power consumption in the memory operation mode, that is, the power source VDD for supplying a voltage of 5 V, the power source VSS for supplying a voltage of 0 V, the power source GVDD for supplying a voltage of 10 V, and the power source GVSS for supplying a voltage of −5 V are all in operation unnecessarily in the memory operation mode.

The present invention is made in view of the problem. An object of the present invention is to provide (i) a memory device which (1) can carry out a first operation mode in which a discrete level is supplied to a memory cell so as to cause the memory cell to retain a logical level and (2) can prevent unnecessary power consumption due to an unnecessary operation(s) of a power source(s) in the first operation mode, which power source(s) is unnecessary in the first operation mode, (ii) a display device including the memory device, (3) a method of driving the memory device, and (4) a method of driving the display device.

Solution to Problem

In order to attain the object, a memory device of the present invention includes: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source, the second power source, and the third power source being capable of, in combination with each other, carrying out a first operation mode in which the column driver supplies the one of the plurality of discrete levels to the memory cell so as to cause the memory cell to retain the one of the plurality of logical levels, in a case where the first operation mode is carried out, the first power source, the second power source, and the third power source being caused to be in operation, and the fourth power source being stopped from being in operation.

According to the invention described above, in a case where the first operation mode is carried out, the first, second and third power sources are caused to be in operation, and the fourth power source is stopped from being in operation. It is therefore possible to reduce the power consumption by an amount corresponding to the operation of the fourth power source in the first operation mode, which operation is unnecessary in the first operation mode.

As a result, it is possible to realize a memory device which can (i) carry out a first operation mode in which a discrete level is supplied to a memory cell so as to cause the memory cell to retain a logical level, and (ii) prevent unnecessary power consumption due to an operation of a power source in the first operation mode, which power source is unnecessary in the first operation mode.

In order to attain the object, a memory device of the present invention includes: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source, the second power source, and the fourth power source being capable of, in combination with each other, carrying out a first operation mode in which the column driver supplies the one of the plurality of discrete levels to the memory cell so as to cause the memory cell to retain the one of the plurality of logical levels, in a case where the first operation mode is carried out, the first power source, the second power source, and the fourth power source being caused to be in operation, and the third power source being stopped from being in operation.

According to the invention described above, in a case where the first operation mode is carried out, the first, second, and fourth power sources are caused to be in operation, and the third power source is stopped from being in operation. It is therefore possible to reduce the power consumption by an amount corresponding to the operation of the third power source in the first operation mode, which operation is unnecessary in the first operation mode.

As a result, it is possible to realize a memory device which can (i) carry out a first operation mode in which a discrete level is supplied to a memory cell so as to cause the memory cell to retain a logical level, and (ii) prevent unnecessary power consumption due to an operation of a power source in the first operation, which power source is unnecessary in the first operation mode.

In order to attain the object, a memory device of the present invention includes: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source and the second power source being capable of, in combination with each other, carrying out a first operation mode in which the column driver supplies the one of the plurality of discrete levels to the memory cell so as to cause the memory cell to retain the one of the plurality of logical levels, in a case where the first operation mode is carried out, the first power source and the second power source being caused to be in operation, and the third power source and the fourth power source being stopped from being in operation.

According to the invention described above, in a case where the first operation mode is carried out, the first and second power sources are caused to be in operation, and the third and fourth power sources are stopped from being in operation. It is therefore possible to reduce the power consumption by an amount corresponding to the operations of the third and fourth power sources in the first operation mode, which operations are unnecessary in the first operation mode.

As a result, it is possible to realize a memory device which can (i) carry out a first operation mode in which a discrete level is supplied to a memory cell so as to cause the memory cell to retain a logical level, and (ii) prevent unnecessary power consumption due to operations of power sources in the first operation mode, which power sources are unnecessary in the first operation mode.

Further, the first operation mode is carried out with a power source voltage in a range which is identical with a difference between the first and second potential levels. Accordingly, it is possible to reduce the power consumption by carrying out the operation with a power source voltage in a significantly narrow range which could not be realized conventionally.

In order to attain the object, a display device of the present invention includes: any one of the memory devices described above; and a liquid crystal capacitor in each of the plurality of memory cells, the liquid crystal capacitor receiving a data signal from the column driver, in the first operation mode, the one of the plurality of discrete levels, supplied from the column driver, being the data signal, the column driver being capable of supplying multivalued level data signal which is the data signal having potential levels, the number of which is greater than the number of the plurality of discrete levels, the first power source, the second power source, the third power source, and the fourth power source being capable of, in combination with each other, carrying out a second operation mode in which the multivalued level data signal is supplied.

According to the invention described above, in a case where the first operation mode is carried out, power sources, other than the power sources which are necessary in the first operation mode, are stopped from being in operation. In a case where the second operation mode is carried out, the first, second, third, and fourth power sources are caused to be in operation. Accordingly, it is possible to realize a display device which has multiple functions and high power source efficiency.

In order to attain the object, a method of the present invention, for driving a memory device, the memory device including: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source, the second power source, and the third power source being capable of, in combination with each other, carrying out a first operation mode in which the column driver supplies the one of the plurality of discrete levels to the memory cell so as to cause the memory cell to retain the one of the plurality of logical levels, includes the step of: in a case where the first operation mode is carried out, causing (i) the first power source, the second power source, and the third power source to be in operation and (ii) the fourth power source to be stopped from being in operation.

According to the invention described above, in a case where the first operation mode is carried out, the first, second, and third power sources are caused to be in operation, and the fourth power source is stopped from being in operation. It is therefore possible to reduce the power consumption by an amount corresponding to the operation of the fourth power source in the first operation mode, which operation is unnecessary in the first operation mode.

As a result, it is possible to realize a memory device which can (i) carry out a first operation mode in which a discrete level is supplied to a memory cell so as to cause the memory cell to retain a logical level, and (ii) prevent unnecessary power consumption due to an operation of a power source in the first operation mode, which power source is unnecessary in the first operation mode.

In order to attain the object, a method of the present invention, for driving a memory device, the memory device including: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source, the second power source, and the fourth power source being capable of, in combination with each other, carrying out a first operation mode in which the column driver supplies the one of the plurality of discrete levels to the memory cell so as to cause the memory cell to retain the one of the plurality of logical levels, includes the step of: in a case where the first operation mode is carried out, causing (i) the first power source, the second power source, and the fourth power source to be in operation and (ii) the third power source to be stopped from being in operation.

According to the invention described above, in a case where the first operation mode is carried out, the first, second, and fourth power sources are caused to be in operation, and the third power source is stopped from being in operation. It is therefore possible to reduce the power consumption by an amount corresponding to the operation of the third power source in the first operation mode, which operation is unnecessary in the first operation mode.

As a result, it is possible to realize a method of driving a memory device which can (i) carry out a first operation mode in which a binary logical level is supplied to a memory cell, and (ii) prevent unnecessary power consumption due to an operation of a power source in the first operation mode, which power source is unnecessary in the first operation mode.

In order to attain the object, a method of the present invention, for driving a memory device, the memory device including: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source and the second power source being capable of, in combination with each other, carrying out a first operation mode in which the column driver supplies the one of the plurality of discrete levels to the memory cell so as to cause the memory cell to retain the one of the plurality of logical levels, includes the step of: in a case where the first operation mode is carried out, causing (i) the first power source and the second power source to be in operation and (ii) the third power source and the fourth power source to be stopped from being in operation.

According to the invention described above, in a case where the first operation mode is carried out, the first and second power sources are caused to be in operation, and the third and fourth power sources are stopped from being in operation. It is therefore possible to reduce the power consumption by an amount corresponding to the operations of the third and fourth power sources in the first operation mode, which operations are unnecessary in the first operation mode.

As a result, it is possible to realize a memory device which can (i) carry out a first operation mode in which a discrete level is supplied to a memory cell so as to cause the memory cell to retain a logical level, and (ii) prevent unnecessary power consumption due to operations of power sources in the first operation mode, which power sources are unnecessary in the first operation mode.

Further, the first operation mode is carried out with a power source voltage in a range which is identical with a difference between the first and second potential levels. Accordingly, it is possible to have a reduction in power consumption by carrying out the operation with a power source voltage in a significantly narrow range which could not be realized conventionally.

In order to attain the object, a method of the present invention, for driving a display device, the display device including: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a liquid crystal capacitor in each of the plurality of memory cells, the liquid crystal capacitor receiving a data signal from the column driver; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source, the second power source, and the third power source being capable of, in combination with each other, carrying out a first operation mode in which the column driver supplies the one of the plurality of discrete levels to the memory cell so as to cause the memory cell to retain the one of the plurality of logical levels, the one of the plurality of discrete levels, supplied from the column driver, being the data signal in the first operation mode, the column driver being capable of supplying a multivalued level data signal which is the data signal having potential levels, the number of which is greater than the number of the plurality of discrete levels, the first power source, the second power source, the third power source, and the fourth power source being capable of, in combination with each other, carrying out a second operation mode in which the multivalued level data signal is supplied to the memory cell, includes the steps of: in a case where the first operation is carried out, causing (i) the first power source, the second power source, and the third power source to be in operation and (ii) the fourth power source to be stopped from being in operation; and in a case where the second operation mode is carried out, causing the first power source, the second power source, the third power source, and the fourth power source to be in operation.

According to the invention described above, in a case where the first operation mode is carried out, the first, second, and third power sources are caused to be in operation, and the fourth power source is stopped from being in operation. In a case where the second operation mode is carried out, the first, second, third, and fourth power sources are caused to be in operation. Accordingly, it is possible to realize a display device which has multiple functions and has high power source efficiency.

In order to attain the object, a method of the present invention, for driving a display device, the display device including: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a liquid crystal capacitor in each of the plurality of memory cells, the liquid crystal capacitor receiving a data signal from the column driver; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source, the second power source, and the fourth power source being capable of, in combination with each other, carrying out a first operation mode in which the column driver supplies the one of the plurality of discrete levels to the memory cell so as to cause the memory cell to retain the one of the plurality of logical levels, the one of the plurality of discrete levels, supplied from the column driver, being the data signal in the first operation mode, the column driver being capable of supplying a multivalued level data signal which is the data signal having potential levels, the number of which is greater than the number of the plurality of discrete levels, the first power source, the second power source, the third power source, and the fourth power source being capable of, in combination with each other, carrying out a second operation mode in which the multivalued level data signal is supplied to the memory cell, includes the steps of: in a case where the first operation is carried out, causing (i) the first power source, the second power source, and the fourth power source to be in operation and (ii) the third power source to be stopped from being in operation; and in a case where the second operation mode is carried out, causing the first power source, the second power source, the third power source, and the fourth power source to be in operation.

According to the invention described above, in a case where the first operation mode is carried out, the first, second, and fourth power sources are caused to be in operation, and the third power source is stopped from being in operation. In a case where the second operation mode is carried out, the first, second, third, and fourth power sources are caused to be in operation. Accordingly, it is possible to realize a method of driving a display device which has multiple functions and high power source efficiency.

In order to attain the object, a method of the present invention, for driving a display device, the display device including: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a liquid crystal capacitor in each of the plurality of memory cells, the liquid crystal capacitor receiving a data signal from the column driver; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source and the second power source being capable of, in combination with each other, carrying out a first operation mode in which the column driver supplies the one of the plurality of discrete levels to the memory cell so as to cause the memory cell to retain the one of the plurality of logical levels, the one of the plurality of discrete levels, supplied from the column driver, being the data signal in the first operation mode, the column driver being capable of supplying a multivalued level data signal which is the data signal having potential levels, the number of which is greater than the number of the plurality of discrete levels, the first power source, the second power source, the third power source, and the fourth power source being capable of, in combination with each other, carrying out a second operation mode in which the multivalued level data signal is supplied to the memory cell, includes the steps of: in a case where the first operation is carried out, causing (i) the first power source and the second power source to be in operation and (ii) the third power source and the fourth power source to be stopped from being in operation; and in a case where the second operation mode is carried out, causing the first power source, the second power source, the third power source, and the fourth power source to be in operation.

According to the invention described above, in a case where the first operation mode is carried out, the first and second power sources are caused to be in operation, and the third and fourth power sources are stopped from being in operation. In a case where the second operation mode is carried out, the first, second, third, and fourth power sources are caused to be in operation. Accordingly, it is possible to realize a method of driving a display device which has multiple functions and high power source efficiency.

Note that, in any of the inventions described above, the number of the plurality of discrete levels may be two. Further, the highest potential may be identical with one of the first and second potential levels, while the lowest potential may be identical with the other one of the first and second potential levels. Further, the number of the plurality of logical levels may be two.

Advantageous Effects of Invention

As described above, a memory device of the present invention includes: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source, the second power source, and the third power source being capable of, in combination with each other, carrying out a first operation mode in which the column driver supplies the one of the plurality of discrete levels to the memory cell so as to cause the memory cell to retain the one of the plurality of logical levels, in a case where the first operation mode is carried out, the first power source, the second power source, and the third power source being caused to be in operation, and the fourth power source being stopped from being in operation.

With the arrangement, it is possible to realize a memory device which can (i) carry out a first operation mode in which a discrete level is supplied to a memory cell so as to cause the memory cell to retain a logical level, and (ii) prevent unnecessary power consumption due to an operation of a power source in the first operation mode, which power source is unnecessary in the first operation mode.

BRIEF DESCRIPTION OF DRAWINGS

FIG. 15 is an explanatory view showing a polarity of data, in accordance with an embodiment of the present invention.

DESCRIPTION OF EMBODIMENTS

One embodiment of the present invention is described below with reference to FIGS. 1 through 37, and FIGS. 41 through 44.

Figure 31:
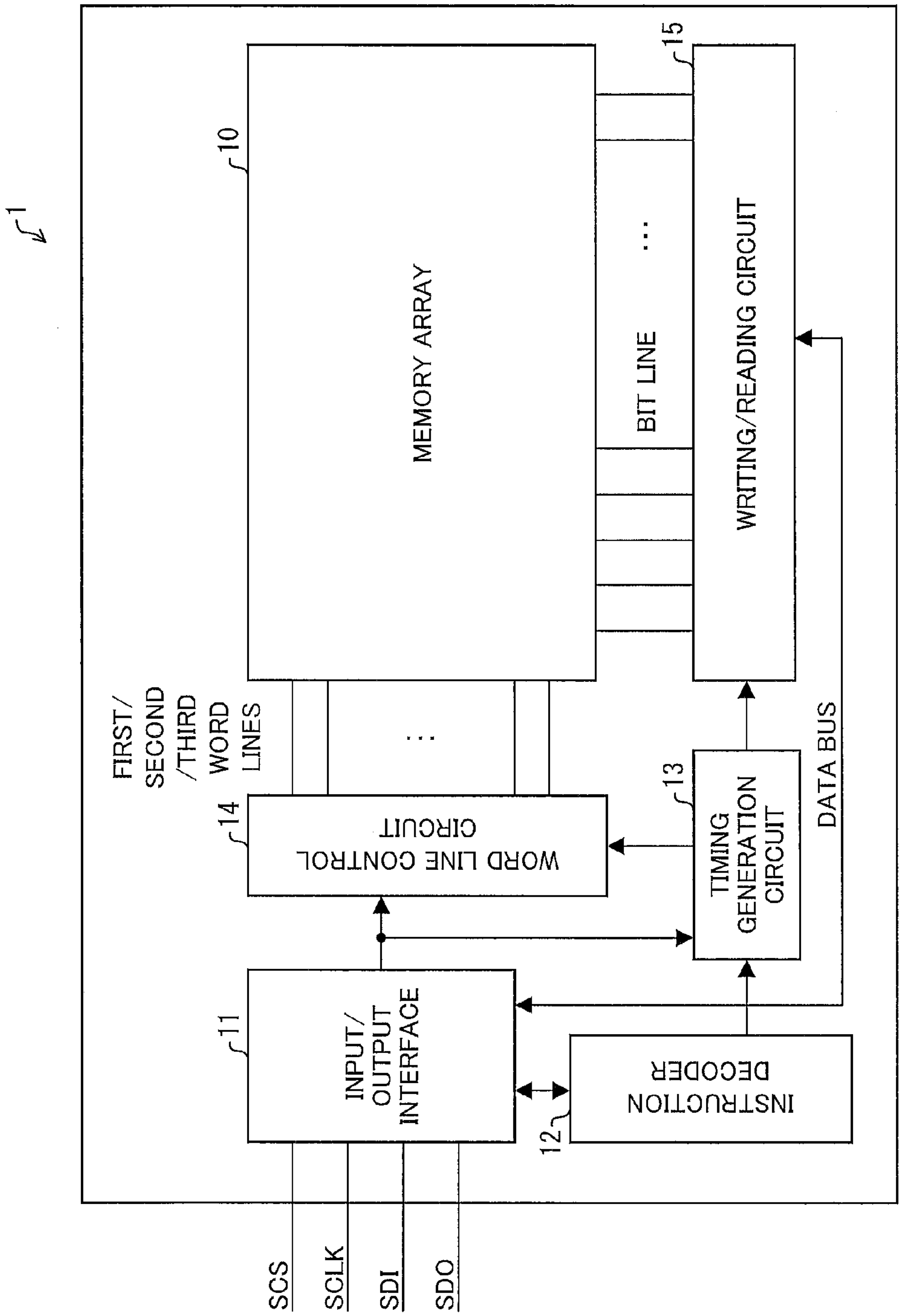
FIG. 31 is a block diagram illustrating an arrangement of a memory device in accordance with an embodiment of the present invention.

FIG. 31 illustrates an arrangement of a memory device 1 in accordance with the present embodiment.

The memory device 1 includes a memory array 10, an input/output interface 11, an instruction decoder 12, a timing generation circuit 13, a word line control circuit 14, and a writing/reading circuit 15.

Figure 32:
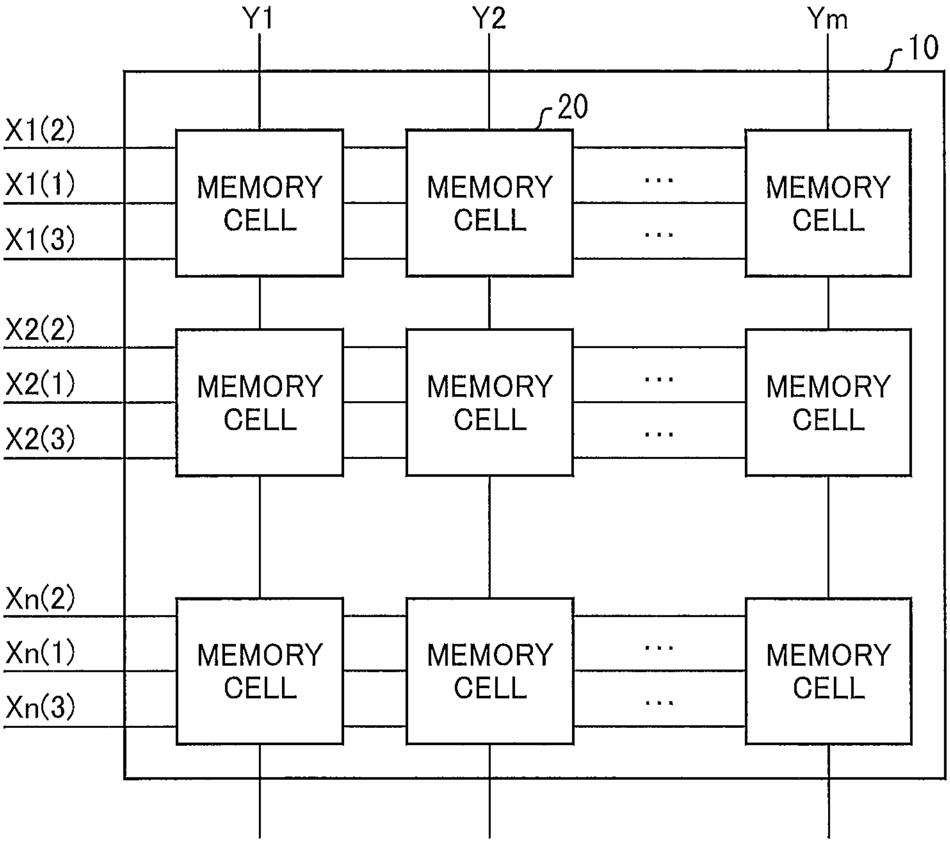
FIG. 32 is a block diagram illustrating how memory cells and lines are arranged relative to each other in the memory device illustrated in FIG. 31.

The memory array 10 has an arrangement in which a plurality of memory cells 20 are arranged in a matrix manner (n rows, m columns) (see FIG. 32). Each of the plurality of memory cells 20 retains data independently. As to a memory cell 20 positioned at an intersection of an ith row (i is an integer, $1 \le i \le n$) and a jth column (j is an integer, $1 \le j \le m$), writing/reading of data is controlled by a first word line Xi(1) connected to the ith row, a second word line Xi(2) connected to the ith row, a third word line Xi(3) connected to the ith row, and a bit line Yj connected to the jth column.

The input/output interface 11 is an interface for controlling an input or an output of data between the memory device 1 and the outside of the memory device 1. For example, in a case where a four-wire serial interface is employed as the input/output interface 11, the four-wire serial interface controls transmission of a serial chip selection signal SCS, a serial clock signal SCLK, a serial data input signal SDI, and a serial data output signal SDO (see FIG. 31). By the control, the input/output interface 11 (i) receives, from the outside of the memory device 1, an instruction to carry out the writing/reading, an address, or data, and (ii) outputs data read out from the memory array 10 to the outside. The input/output interface 11 is not limited to the four-wire serial interface, and may be a parallel interface, for example.

The instruction decoder 12 is connected to the input/output interface 11 and the timing generation circuit 13. The instruction decoder 12 decodes an instruction received from the input/output interface 11, selects an operation mode in accordance with the instruction thus decoded, and transmits such a selection to the timing generation circuit 13.

The timing generation circuit 13 is connected to the input/output interface 11, the instruction decoder 12, the word line control circuit 14, and the writing/reading circuit 15. The timing generation circuit 13 generates, in accordance with the operation mode selected by the instruction decoder 12, an internal timing signal necessary for a corresponding operation. The internal timing signal is generated based on a clock signal, which (i) can be supplied from an external system via the input/output interface 11, or (ii) can be generated, by use of an oscillator or the like, inside the memory device 1 or inside the timing generation circuit 13.

The word line control circuit (row driver) 14 is connected to the memory array 10, the input/output interface 11, and the timing generation circuit 13. The word line control circuit 14 (i) appropriately selects, in accordance with a writing/reading address inputted via the input/output interface 11, one of a plurality of sorts of word line connected to each of the rows of the memory array 10, that is, one of the first word line Xi(1), the second word line Xi(2), and the third word line Xi(3) (i is a row number), and (ii) controls the one thus selected in accordance with the internal timing signal generated by the timing generation circuit 13.

The writing/reading circuit (column driver) 15 is connected to the memory array 10, the input/output interface 11, and the timing generation circuit 13. The writing/reading circuit 15 controls, in accordance with the internal timing signal generated by the timing generation circuit 13, the bit line Yj (j is a column number) connected to each of the columns of the memory array 10. During a writing operation, the writing/reading circuit 15 applies a binary logical level to the bit line in accordance with writing data received from the input/output interface 11. Meanwhile, during a reading operation, the writing/reading circuit 15 senses a potential of each of the bit lines, and outputs data to the input/output interface 11 in accordance with the potential thus sensed. The binary logical level is represented by a first potential level or a second potential level. For example, one of the first potential level and the second potential level is represented as a high potential, and the other one of the first potential level and the second potential level is represented as a low potential. The first potential level and the second potential level are logical levels, so that the first potential level and the second potential level could have their potentials in certain ranges, respectively.

The memory cell 20 may have the aforementioned structure illustrated in FIG. 38 or another structure which will be described later.

Figure 38:
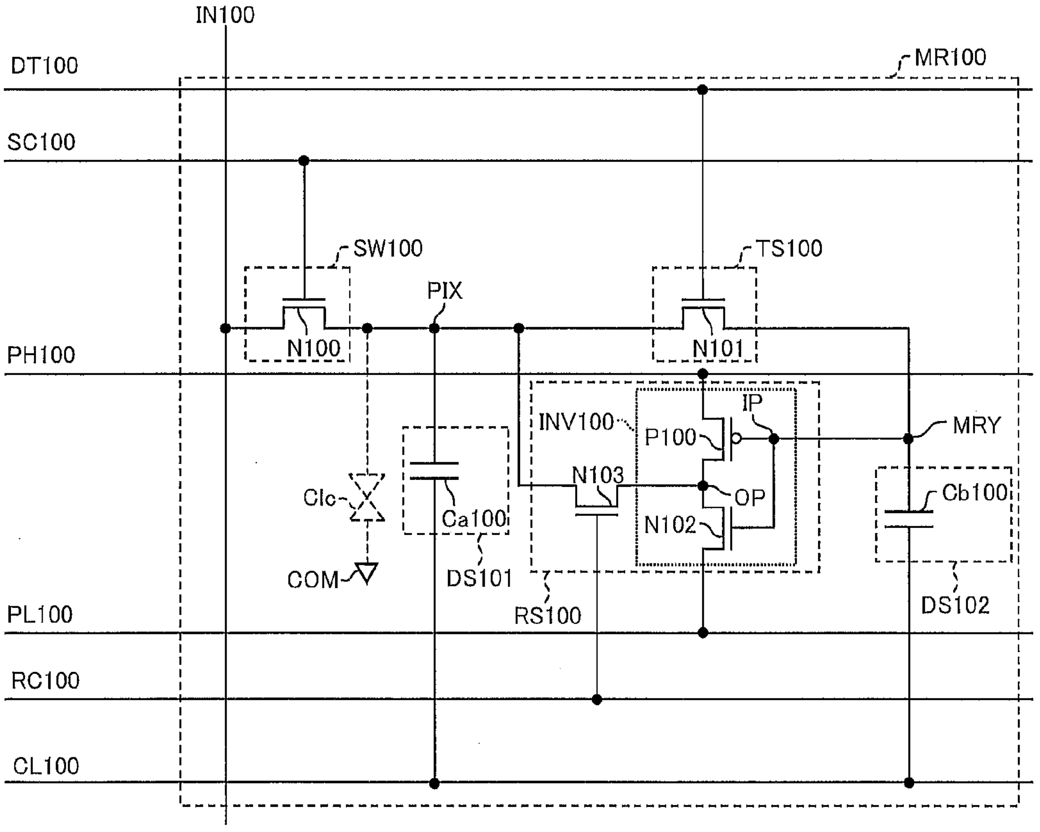
FIG. 38 is a circuit diagram illustrating an arrangement of a memory circuit in accordance with a conventional technique.

In a case where a memory cell MR100 illustrated in FIG. 38 is employed, the first word line Xi(1) corresponds to a switch control line SC100, the second word line Xi(2) corresponds to a data transfer control line DT100, the third word line Xi(3) corresponds to a refresh output control line RC100, and the bit line Yj corresponds to a data input line IN100. Here, the following description deals with a case where (i) the first potential level is a high level, (ii) the second potential level is a low level, (iii) a first power source is a high power source line PH100, and (iv) a second power source is a low power source line PL100. Further, a capacitor line CL100 may receive a potential via the low power source line PL100. Alternatively, the capacitor line CL100 can receive a potential via both the high power source line PH100 and the low power source line PL100.

In this case, a third power source and a fourth power source are further provided to supply electric power to the memory array 10. The third power source generates a potential which is higher than a power source potential of the high power source line PH100. The fourth power source generates a potential which is lower than a power source potential of the low power source line PL100. Note that it is possible that (i) the first potential level is the low level and the second potential level is the high level and (ii) the first power source is the low power source line PL100 and the second power source is the high power source line PH100.

Here, the third and fourth power sources (not illustrated in FIG. 38) are typical power sources for generating a gate pulse of a display device illustrated in FIG. 35 (later described). Note, however, that a purpose of provision of the third and fourth power sources is not limited to this, and the third and fourth power sources may be provided for another purpose.

Here, the first power source is referred to as "VDD", the second power source is referred to as "VSS", the third power source is referred to as "GVDD", and the fourth power source is referred to as "GVSS". An operation of the memory circuit MR100, explained above with reference to FIG. 38, is a first operation mode in which a binary logical level is supplied from the writing/reading circuit (column driver) 15 to the memory cell 20, which binary logical level is represented by the first potential level supplied from the power source VDD or the second potential level supplied from the power source VSS. The power source GVDD and the power source GVSS can be generated by use of the power source VDD and the power source VSS, respectively.

Figure 3:
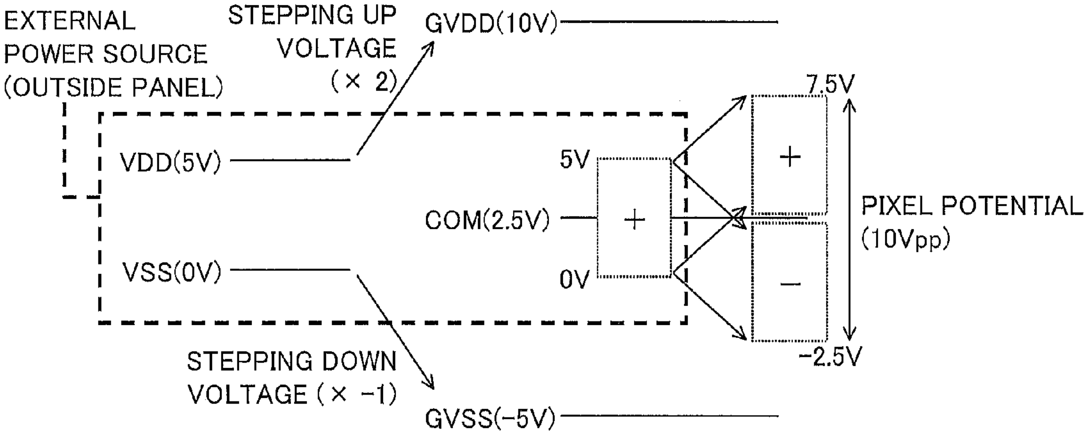
FIG. 3 is a view illustrating a first example for explaining power sources and a potential of a signal in a second operation mode, in accordance with an embodiment of the present invention.

For example, in a case where the memory device 1 is a display device, the power source VDD (5 V) and the power source VSS (0 V) are supplied from power sources provided outside a display panel, and a potential (2.5 V) of the common electrode COM and a potential of a data signal are generated by use of the power source VDD and the power source VSS (see FIG. 3). Further, in a pixel to which the data signal has been supplied, a rise or a drop in pixel potential is generated by driving of the retention capacitor line, so that a range of the pixel potential is 10 Vpp from −2.5 V to 7.5 V (a center potential of the range is equal to the potential of the common electrode COM). The memory cell 20 serves as a pixel.

In this case, (i) the power source GVDD (10 V) is obtained by stepping up a voltage of the power source VDD so that a voltage of the power source GVDD is twice that of the power source VDD, and (ii) the power source GVSS (−5 V) is obtained by stepping down a voltage of the power source VSS so that a voltage of the power source GVSS is −1 times that of the power source VSS.

Figure 4:
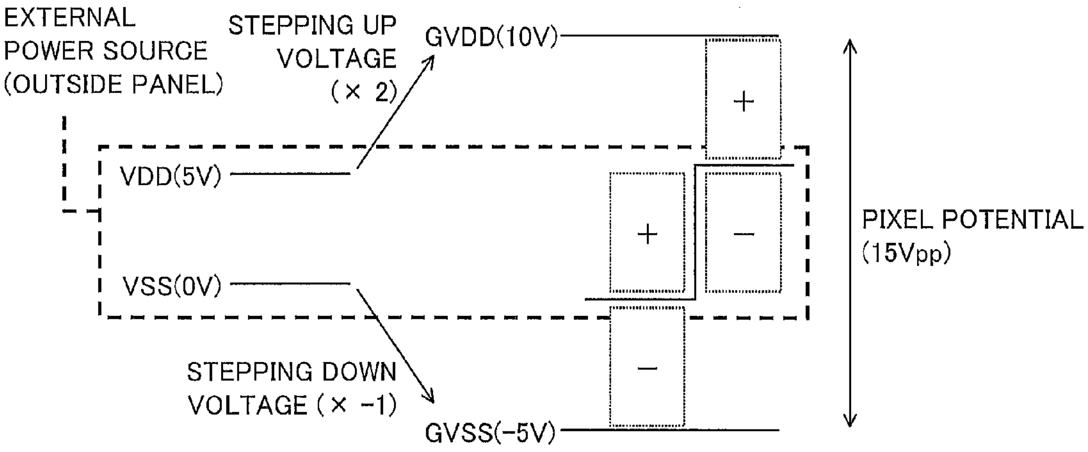
FIG. 4 is a view illustrating a second example for explaining the power sources and a potential of a signal in the second operation mode, in accordance with an embodiment of the present invention.

Further, as illustrated in FIG. 4, in a case where the memory device 1 is a display device, the power source VDD (5 V) and the power source VSS (0 V) are supplied from power sources provided outside the display panel, and a potential of a data signal is generated by use of the power source VDD and the power source VSS. The common electrode COM is subjected to reversal driving with an AC by use of the power source VDD and the power source VSS. When the common electrode COM is driven, a range of a pixel potential is widen by 5 V positively and by 5 V negatively (a center potential of the range is equal to the potential of the common electrode COM) in the pixel to which the data signal has been supplied. As a result, the range of the pixel potential becomes 15 Vpp (from −5 V to 10 V). The memory cell 20 serves as a pixel.

In this case, (i) the power source GVDD (10 V) is obtained by stepping up a voltage of the power source VDD so that a voltage of the power source GVDD is twice that of the power source VDD, and (ii) the power source GVSS (−5 V) is obtained by stepping down a voltage of the power source VSS so that a voltage of the power source GVSS is −1 times that of the power source VSS.

Figure 5:
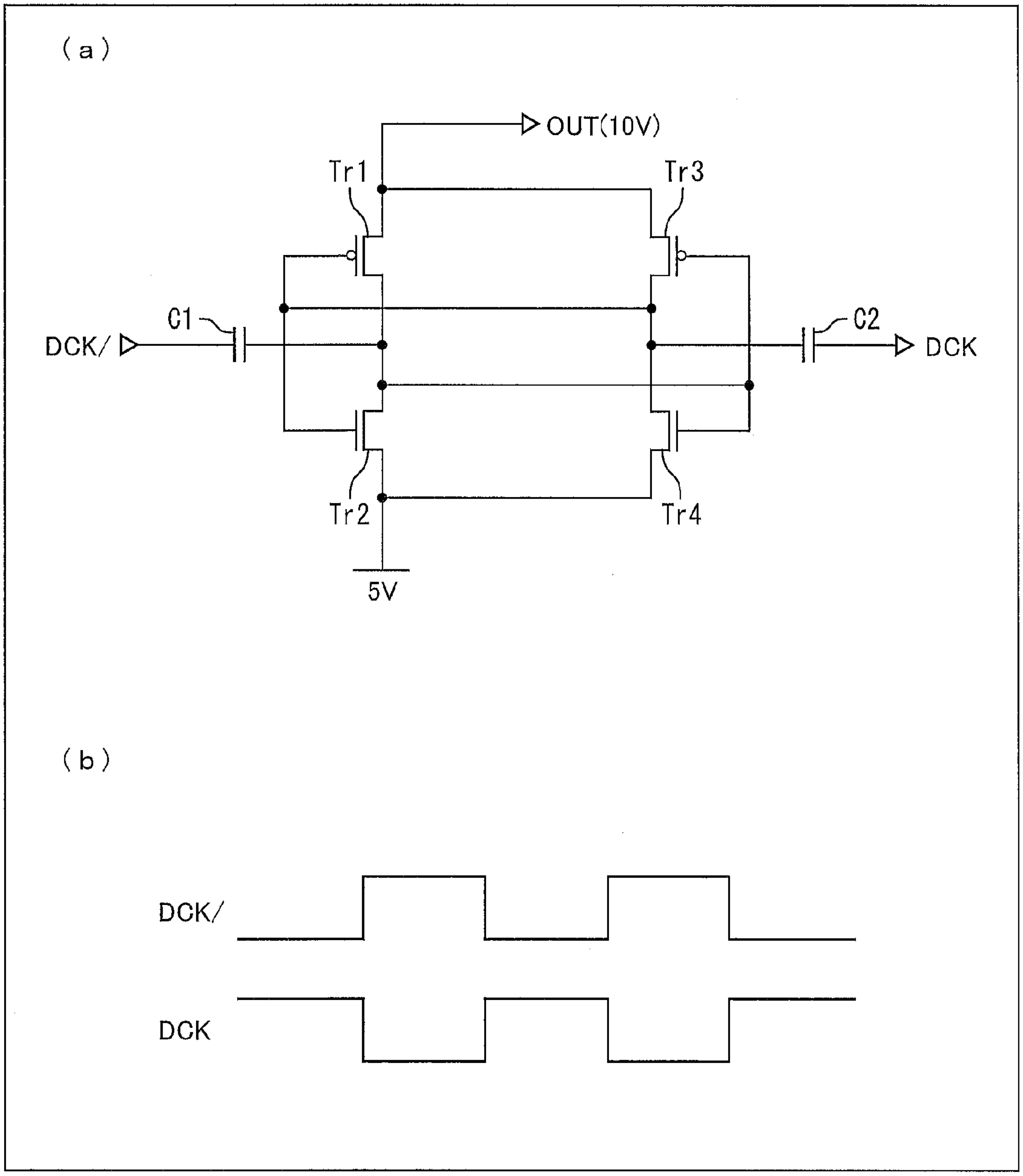
FIG. 5 is an explanatory view illustrating a voltage step-up (×2) circuit in accordance with an embodiment of the present invention: (a) of FIG. 5 is a circuit diagram illustrating an arrangement of the voltage step-up (×2) circuit; and (b) of FIG. 5 is a waveform chart showing a waveform of a clock signal used in the voltage step-up (×2) circuit.

(a) of FIG. 5 illustrates an example of an arrangement of a voltage step-up (×2) circuit.

The voltage step-up (×2) circuit includes transistors Tr1 through Tr4, and capacitors C1 and C2. The transistors Tr1 and Tr3 are P-channel field-effect transistors, and the transistors Tr2 and Tr4 are N-channel field-effect transistors.

A gate of the transistor Tr1 and a gate of the transistor Tr2 are connected to each other, and a gate of the transistor Tr3 and a gate of the transistor Tr4 are connected to each other. A source of the transistor Tr1 and a source of the transistor Tr3 are connected to an output terminal OUT, and a source of the transistor Tr2 and a source of the transistor Tr4 are connected to an input terminal. A drain of the transistor Tr1, a drain of the transistor Tr2, the gate of the transistor Tr3, and the gate of the transistor Tr4 are connected to each other, and a connection point between them is connected to, via the capacitor C1, an input terminal for receiving a clock signal DCK/. A drain of the transistor Tr3, a drain of the transistor Tr4, the gate of the transistor Tr1, and the gate of the transistor Tr2 are connected to each other, and a connection point between them is connected to, via the capacitor C2, an input terminal for receiving a clock signal DCK.

A phase of the clock signal DCK/ and a phase of the clock signal DCK are opposite to each other (see (b) of FIG. 5).

In (a) of FIG. 5, in a case where a voltage of 5 V is supplied from the power source VDD to the input terminal, the voltage of 5 V is stepped up to 10 V, and is outputted from the output terminal OUT.

Figure 6:
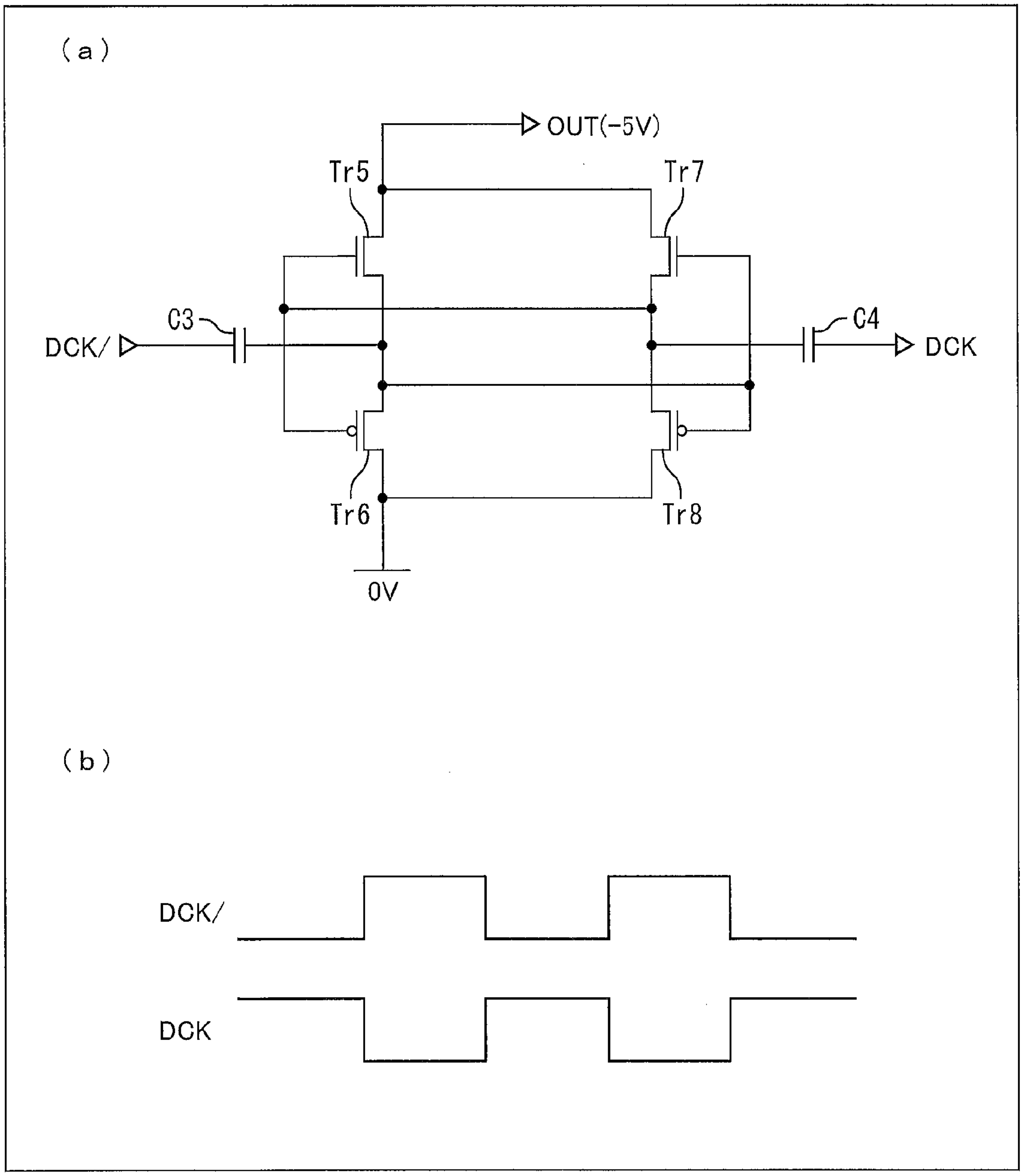
FIG. 6 is an explanatory view illustrating a voltage step-down (×−1) circuit in accordance with an embodiment of the present invention: (a) of FIG. 6 is a circuit diagram illustrating an arrangement of the voltage step-down (×−1) circuit; and (b) of FIG. 6 is a waveform chart showing a waveform of a clock signal used in the voltage step-down (×−1) circuit.

(a) of FIG. 6 illustrates an arrangement of a voltage step-down (×−1) circuit.

The voltage step-down (×−1) circuit includes transistors Tr5 through Tr8, and capacitors C3 and C4. The transistors Tr5 and Tr7 are N-channel field-effect transistors, and transistors Tr6 and Tr8 are P-channel field-effect transistors.

A gate of the transistor Tr5 and a gate of the transistor Tr6 are connected to each other, and a gate of the transistor Tr7 and a gate of the transistor Tr8 are connected to each other. A source of the transistor Tr5 and a source of the transistor Tr6 are connected to an output terminal OUT, and a source of the transistor Tr6 and a source of the transistor Tr8 are connected to an input terminal. A drain of the transistor Tr5, a drain of the transistor Tr6, the gate of the transistor Tr7, and the gate of the transistor Tr8 are connected to each other, and a connection point between them is connected to, via the capacitor C3, an input terminal for receiving a clock signal DCK/. A drain of the transistor Tr7, a drain of the transistor Tr8, the gate of the transistor Tr5, and the gate of the transistor Tr6 are connected to each other, and a connection point between them is connected to, via the capacitor C4, an input terminal for receiving a clock signal DCK.

A phase of the clock signal DCK/ and a phase of the cock signal DCK are opposite to each other (see (b) of FIG. 6).

In (a) of FIG. 6, in a case where a voltage of 0 V is supplied from the power source VSS to the input terminal, the voltage of 5 V is stepped down to −5 V, and is outputted from the output terminal OUT.

With the arrangement, the third power source generates a potential by stepping up a higher one of the first and second potential levels, and supplies the potential. In this case, by supplying, from an external power source, the higher one of the first and second potential levels, the potential supplied from the third power source is generated. Accordingly, it is possible to reduce the number of external power sources.

Similarly, with the arrangement, the fourth power source generates a potential by stepping down a lower one of the first and second potential levels, and supplies the potential. In this case, by supplying, from an external power source, the lower one of the first and second potential levels, the potential supplied from the fourth power source is generated. Accordingly, it is possible to reduce the number of external power sources.

According to the present embodiment, in a case where the memory device 1 carries out the first operation mode, the power source VDD, the power source VSS, and the power source GVDD are caused to be in operation, and the power source GVSS is unnecessary and therefore is stopped from being in operation. For example, in a case of a power source arrangement illustrated in FIG. 3 or a power source arrangement illustrated in FIG. 4, the operation of the voltage step-down (×−1) circuit is stopped. This makes it possible to have a reduction in power consumption.

Figure 1:
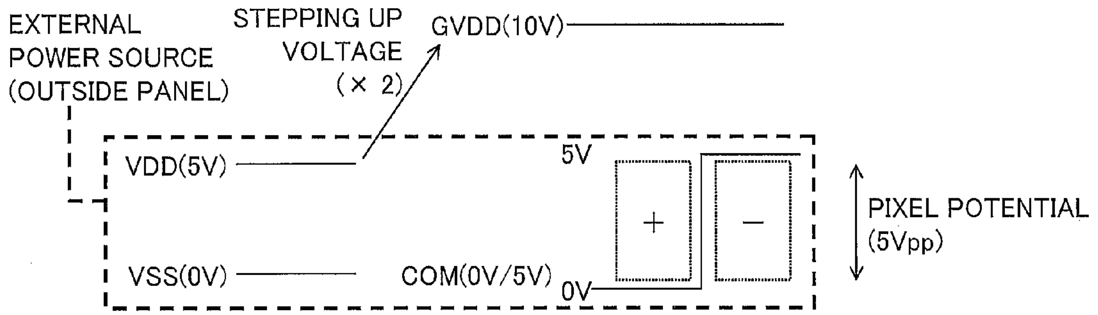
FIG. 1 is a view illustrating a first example for explaining power sources and a potential of a signal in a first operation mode, in accordance with an embodiment of the present invention.
Figure 2:
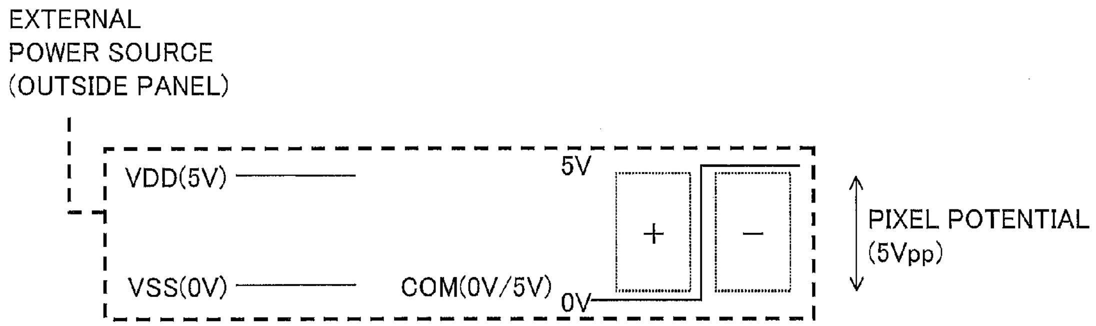
FIG. 2 is a view illustrating a second example for explaining the power sources and a potential of a signal in the first operation mode, in accordance with an embodiment of the present invention.

In the first operation mode, a potential of a binary logical level supplied to the memory cell 20 is, inside the memory cell 20, equal to the potential supplied from the power source VDD or the potential supplied from the power source VSS, and it is unnecessary to employ a negative power source to turn off the N-channel transistor (see FIG. 1). Accordingly, it is possible to stop the operation of the power source GVSS. The operation of the power source GVDD is not stopped because, for example, it is necessary to use the power source GVDD to turn on the N-channel transistor. In a case where the memory device 1 is a display device, it is possible to realize, with the use of the binary logical level, a 2 gray-scale liquid crystal applied voltage having negative and positive polarities in such a manner that the common electrode COM is subjected to the reversal driving with an AC by use of the power source VDD and the power source VSS.

As described above, in a case where the first operation mode is carried out, the first, second and third power sources are caused to be in operation and the fourth power source is stopped from being in operation. Accordingly, it is possible to reduce the power consumption by an amount corresponding to the operation of the fourth power source in the first operation mode, which operation is unnecessary in the first operation mode.

As a result, it is possible to realize a memory device which can (i) carry out a first operation mode in which a binary logical level is supplied to a memory cell and (ii) prevent unnecessary power consumption due to an operation of a power source in the first operation mode, which power source is unnecessary in the first operation mode.

Further, here, a difference between the potential (10 V) supplied from the power source GVDD and the potential (0 V) supplied from the power source VSS is twice a difference (5 V) between the potential (5 V) supplied from the power source VDD and the potential (0 V) supplied from the power source VSS. In a case where a difference between the potential supplied from the third power source and the lower one of the first and second potential levels is not more than twice a difference between the potentials of the first and second potential levels, the first operation mode is carried out with a power source voltage in a range which is not more than twice the difference between the potentials of the first and second potential levels. It is therefore possible to reduce power consumption by carrying out an operation with a power source voltage in a narrow range, which could not be realized conventionally.

Figures 9, 10:
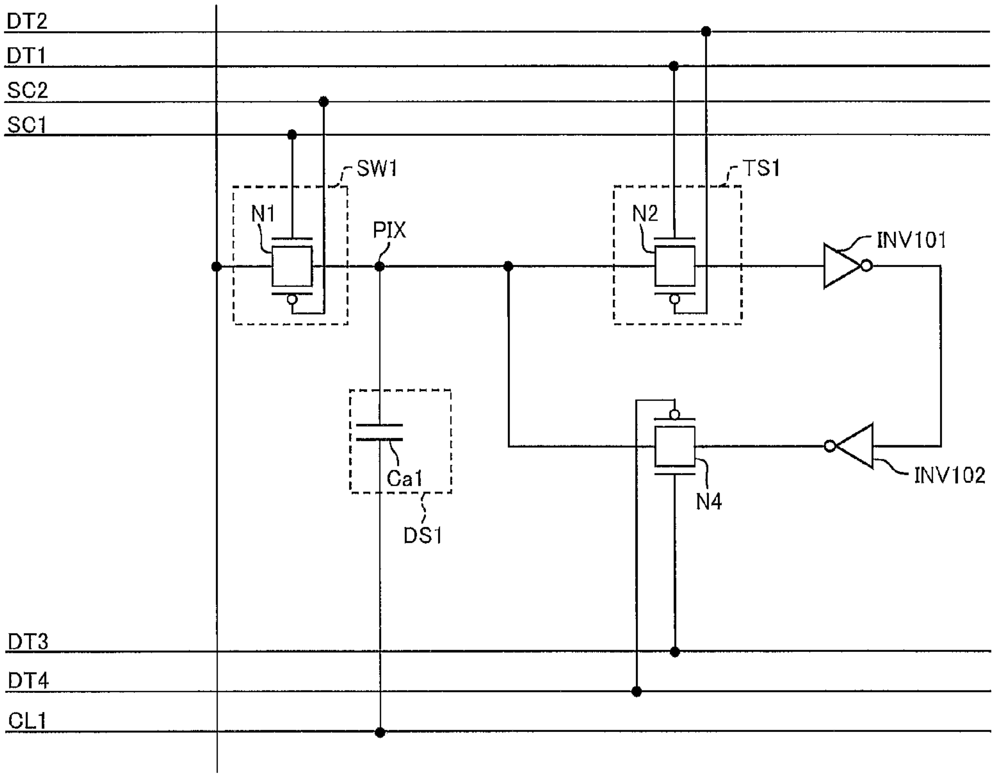
FIG. 9 is a circuit diagram illustrating a third arrangement of the memory cell having the CMOS arrangement, in accordance with an embodiment of the present invention.
FIG. 10 is a view showing combinations of power sources in accordance with an embodiment of the present invention, which power sources are used in a case where a memory device is a display device.

With the arrangement, each of the power sources of the display device has an operation pattern shown in FIG. 10, for example. Here, the first operation mode corresponds to "memory mode". The "memory mode" is a memory circuit operation mode which will be described later in an explanation of a display device. Meanwhile, a "normal mode" is a multiple gray-scale display mode which will be described later in the explanation of the display device. In the "memory mode", "all writing" indicates an operation of writing data in the memory cell 20 (pixel), and "refreshing" indicates an operation of refreshing the data written in the memory cell 20 (pixel). Further, here, the GVSS, whose operation has been stopped, outputs a voltage of 0 V instead of outputting a voltage of −5 V. This is a state where the voltage of 0 V, supplied from the power source VSS, is outputted through the GVSS without any change.

Figure 7:
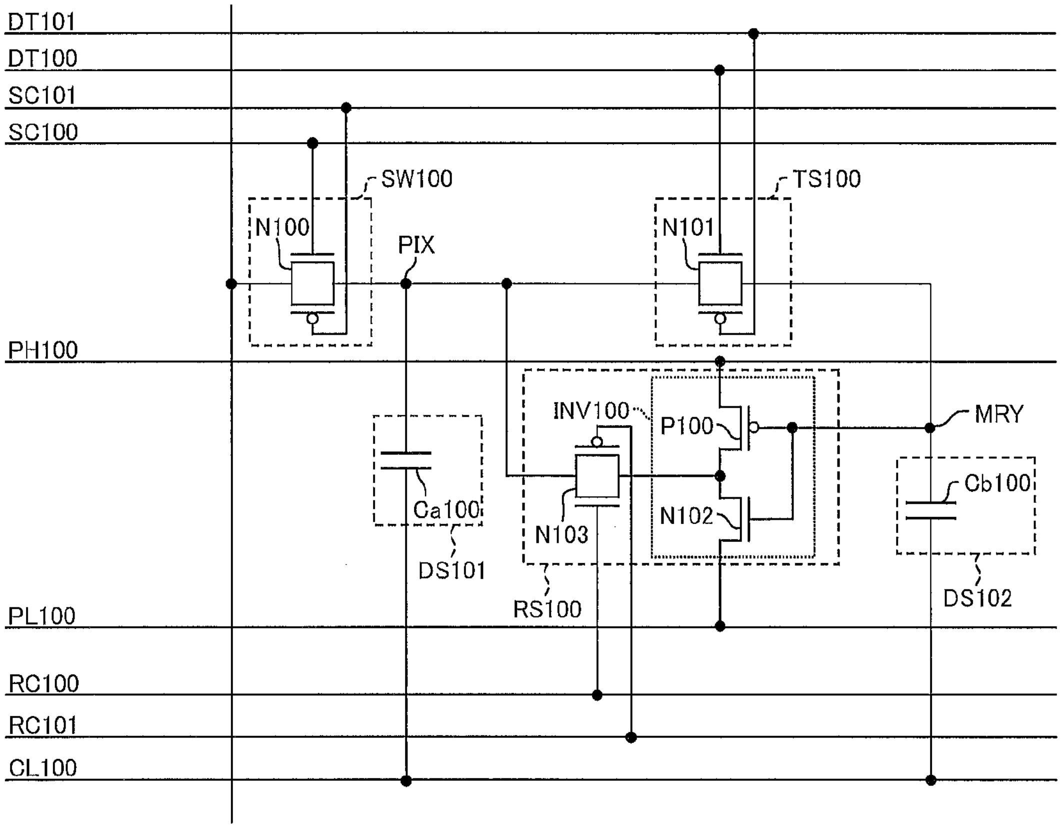
FIG. 7 is a circuit diagram illustrating a first arrangement of a memory cell having a CMOS arrangement, in accordance with an embodiment of the present invention.
Figure 8:
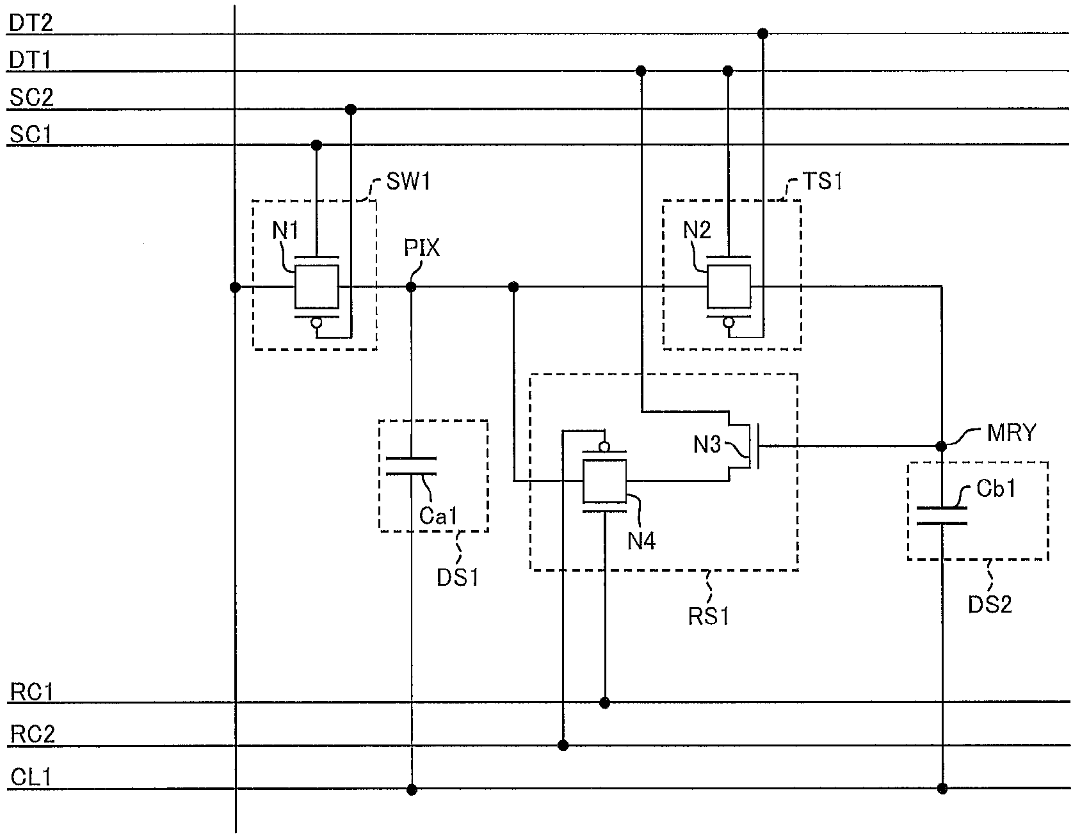
FIG. 8 is a circuit diagram illustrating a second arrangement of the memory cell having the CMOS arrangement, in accordance with an embodiment of the present invention.

Further, in a case where each of switches has a CMOS arrangement as in FIG. 7 or 8, it becomes possible to carry out an ON/OFF operation of the switch by using only the power source VDD and the power source VSS. Accordingly, it is also possible to stop the operation of the power source GVDD (see FIG. 2). In the case of the power source arrangement illustrated in FIG. 3 or the power source arrangement illustrated in FIG. 4, the operation of the step-up (×2) circuit can be stopped, for example.

In this case, during the time period of the first operation mode, the first and second power sources are caused to be in operation and the third and fourth power sources are stopped from being in operation. Accordingly, it is possible to reduce the power consumption by an amount corresponding to the operations of the third and fourth power sources in the first operation mode, which operations are unnecessary in the first operation mode.

It is therefore possible to realize a memory device which can (i) carry out a first operation mode in which a binary logical level is supplied to a memory cell and (ii) prevent unnecessary power consumption due to operations of power sources in the first operation mode, which power sources are unnecessary in the first operation mode. Further, here, the first operation mode is carried out with a power source voltage in a range (5 V) which is identical with a difference between the first and second potential levels. Accordingly, it is possible to reduce the power consumption by carrying out an operation with a power source voltage in a significant narrow range, which could not be realized conventionally.

FIG. 7 illustrates an arrangement in which each of transistors N100, N101, and N103 illustrated in FIG. 38 functions as a CMOS switch. An ON/OFF operation of a P-channel transistor of the CMOS switch is controlled in such a manner that (i) a reversal potential of a data transfer control line DT100 is supplied to a data transfer control line DT101, (ii) a reversal potential of a switch control line SC100 is supplied to a switch control line SC101, and (iii) a reversal potential of a refresh output control line RC100 is supplied to a refresh output control line RC101.

FIG. 8 illustrates an arrangement in which each of transistors N1, N2, and N4 of an arrangement described below functions as a CMOS switch. An ON/OFF operation of a P-channel transistor of the CMOS switch is controlled in such a manner that (i) a reversal potential of a data transfer control line DT1 is supplied to a data transfer control line DT2, (ii) a reversal potential of a switch control line SC1 is supplied to a switch control line SC2, and (iii) a reversal potential of a refresh output control line RC1 is supplied to a refresh output control line RC2.

Further, as illustrated in FIG. 9, the arrangement illustrated in FIG. 8 can be modified such that inverters INV101 and INV102, cascade-connected between a data transfer section TS1 and a CMOS switch N4, are used in place of the second data retention section DS102, the inverter INV100, and the transistor N3. The CMOS switch N4 is operated by (i) a data transfer control line DT3 for controlling an ON/OFF operation of an N-channel transistor and (ii) a data transfer control line DT4 for controlling an ON/OFF operation of a P-channel transistor.

According to either the arrangement illustrated in FIG. 7 or the arrangement illustrated in FIG. 9, the memory cell is constituted by a CMOS circuit. In the arrangement illustrated in FIG. 8, a part of the memory cell other than the transistor N3, which part is controlled from the outside of the memory cell, is constituted by the CMOS circuit. With the arrangement in which at least a part of the memory cell, which part is controlled from the outside of the memory cell, is constituted by the CMOS circuit, it is possible for the memory cell to be operated by use of only a binary logical level. That is, even if a part of the memory cell is controlled inside the memory cell, such a part is controlled by use of the binary logical level. Accordingly, it becomes easy to stop the operations of the third and fourth power sources.

Next, the following description deals with (i) details of the arrangement of the memory cell 20 in accordance with the present embodiment, and (ii) how the memory device 1 serves as a display device.

[Details of Arrangement of Memory Cell 20]

The following description deals with a memory device which can carry out writing and reading of data, with reference to FIGS. 11 through 34.

Figure 33:
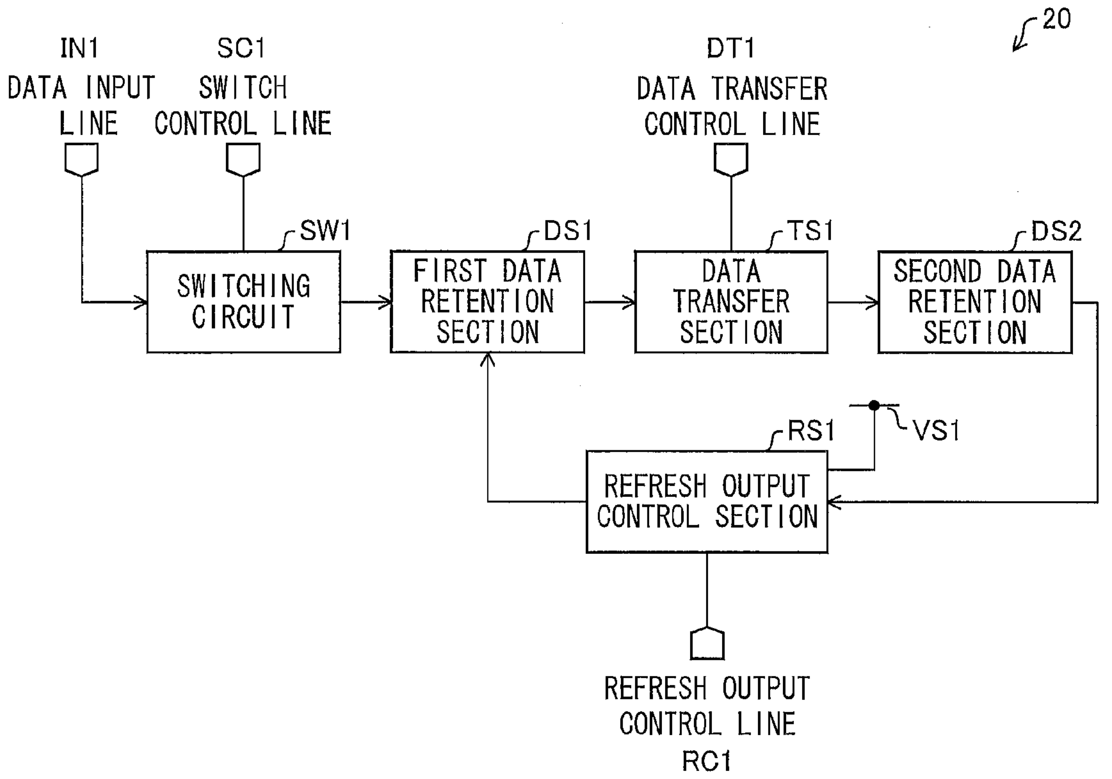
FIG. 33 is a block diagram illustrating an arrangement of the memory cell illustrated in FIG. 32.

FIG. 33 illustrates a concept of an arrangement of each of memory cells 20.

The memory cell 20 includes a switching circuit SW1, a first data retention section DS1, a data transfer section TS1, a second data retention section DS2, a refresh output control section RS1, and a supply source VS1.

Further, a memory array 10 is provided with a data input line IN1, a switch control line SC1, a data transfer control line DT1, and a refresh output control line RC1. In FIG. 32, a bit line Yj corresponds to the data input line IN1, a first word line Xi(1) corresponds to the switch control line SC1, the data a second word line Xi(2) corresponds to the transfer control line DT1, and a third word line Xi(3) corresponds to the refresh output control line RC1.

The switching circuit SW1 is driven by a word line control circuit 14 via the switch control line SC1 (first line) so as to cause selectively (i) the data input line IN1 (fourth line) and the first data retention section (first retention section) DS1 to be electrically connected to each other or (ii) the data input line IN1 and the first data retention section DS1 to be electrically disconnected from each other.

The first data retention section DS1 receives and retains a binary logical level.

The data transfer section (transfer section) TS1 is driven by the word line control circuit 14 via the data transfer control line DT1 (second line) so as to carry out selectively (i) a transfer operation in which the binary logical level retained by the first data retention section DS1 is transferred to the second data retention section DS2 while the first data retention section DS1 keeps retaining the binary logical level or (ii) a non-transfer operation in which the transfer operation is not carried out. Note that all of the memory cells 20 receive the same signal via corresponding data transfer control lines DT1. Accordingly, the data transfer control line DT1 is not necessarily provided for each of the rows, and is not necessarily driven by the word line control circuit 14. It is possible to drive the data transfer control line DT1 with the use of the writing/reading circuit 15 or the like.

The second data retention section (second retention section) DS2 receives and retains the binary logical level.

The refresh output control section (first control section) RS1 is driven by the word line control circuit 14 via the refresh output control line RC1 (third line) so as to be controlled selectively to be in a state for carrying out a first operation or in a state for carrying out a second operation. Note that all of the memory cells 20 receive the same signal via corresponding refresh output control lines RC1. Accordingly, the refresh output control line RC1 is not necessarily provided for each of the rows, and is not necessarily driven by the word line control circuit 14. It is possible to drive the refresh output control line RC1 with the use of the writing/reading circuit 15 or the like.

The first operation is an operation for selecting, in accordance with control information indicating which one of the first potential level or the second potential level the binary logical level retained by the second data retention section is, one of the following states: (i) an active state in which an input received by the refresh output control section RS1 is supplied to the first data retention section DS1 as an output of the refresh output control section RS1, and (ii) an inactive state in which the refresh output control section RS1 does not supply its output.

The second operation is an operation for causing the refresh output control section RS1 to stop supplying its output, irrespective of the control information.

The supply source VS1 supplies a predetermined potential, as an input, to the refresh output control section RS1.

Figure 34:
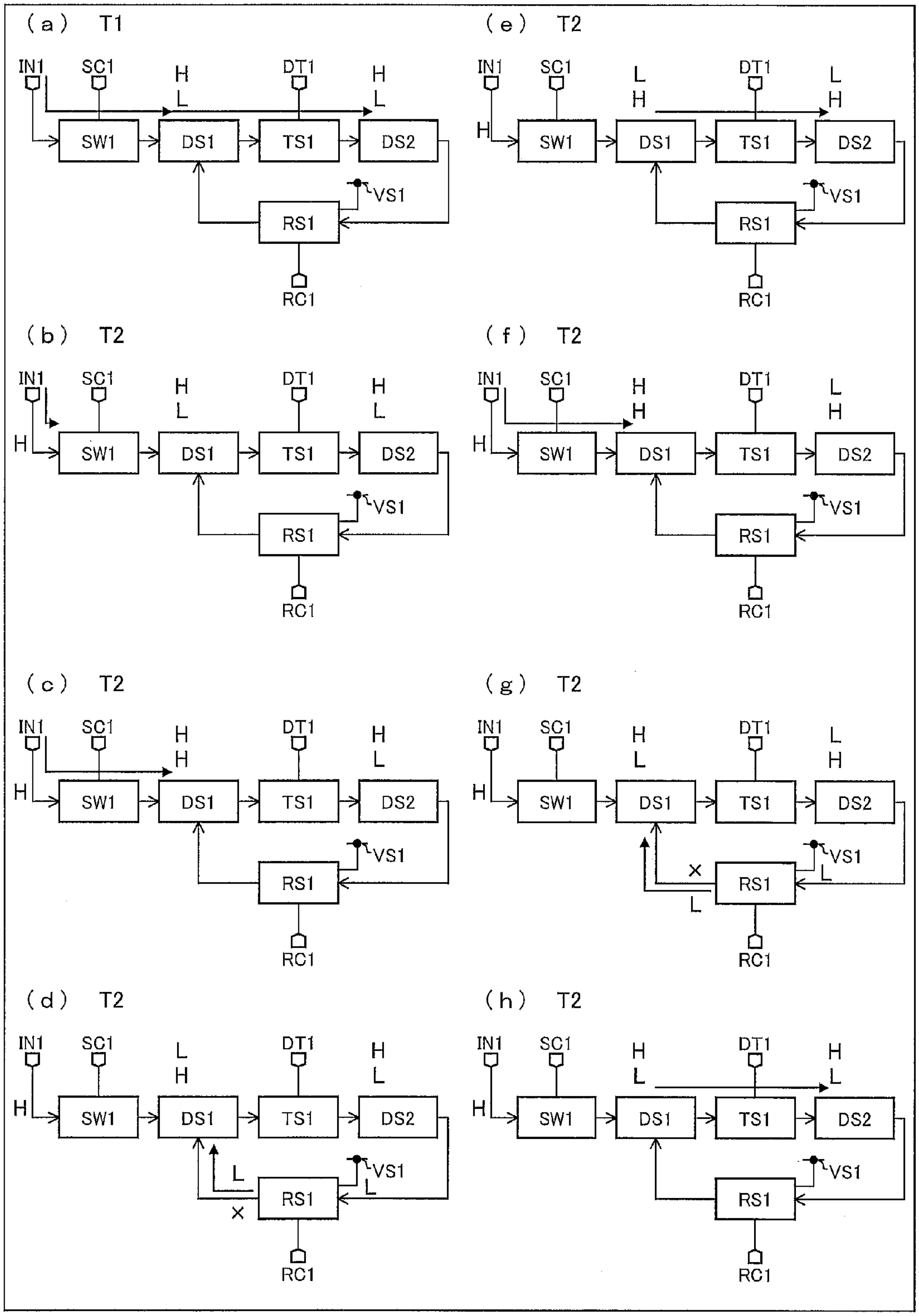
FIG. 34 is a view illustrating an operation of the memory cell illustrated in FIG. 33: (a) through (h) of FIG. 34 illustrate operations of the memory cell, respectively.

Next, the following description deals with transition of a state of the memory cell 20, with reference to (a) through (h) of FIG. 34. Here, the first potential level is a high level (indicated by "H" in FIG. 34), and the second potential level is a low level (indicated by "L" in FIG. 34). Further, in FIG. 34, there are parts where the "H" and the "L" are adjacently arranged in a vertical direction. Such a part indicates that (i) the "H" or the "L" shown in an upper part indicates a transition state of the potential level when the "H" is written in the memory cell 20 and (ii) the "H" or the "L" shown in a lower part indicates a transition state of the potential level when the "L" is written in the memory cell 20.

In a writing mode for writing data, first, a writing time period T1 for writing data is provided.

During the writing time period T1, the switching circuit SW1 is turned on by the switch control line SC1 and therefore a binary logical level to be retained is supplied from the data input line IN1 to the first data retention section DS1 via the switching circuit SW1, which binary logical level is represented by the first potential level or the second potential level in accordance with data (see (a) of FIG. 34).

In a case where the binary logical level is supplied to the first data retention section DS1, the switching circuit SW1 is turned off by the switch control line SC1. Further, here, the data transfer section TS1 is turned on by the data transfer control line DT1, i.e., the data transfer section TS1 is turned into a transfer operation state. In this state, the binary logical level is transferred from the first data retention section DS1 to the second data retention section DS2 via the data transfer section TS1, while the first data retention section DS1 keeps retaining the binary logical level. In a case where the binary logical level is transferred to the second data retention section DS2, the data transfer section TS1 is turned off, i.e., the data transfer section TS1 is turned into a non-transfer operation state.

Further, a refreshing time period T2 is provided to follow the writing time period T1.

During the refreshing time period T2, first, the first potential level is supplied from the writing/reading circuit 15 to the data input line IN1 (see (b) of FIG. 34).

Then, the switching circuit SW1 is turned on by the switch control line SC1 so that the first potential level is supplied from the data input line IN1 to the first data retention section DS1 via the switching circuit SW1 (see (c) of FIG. 34). In a case where the first potential level is supplied to the first data retention section DS1, the switching circuit SW1 is turned off by the switch control line SC1.

Next, the refresh output control section RS1 is controlled by the refresh output control line RC1 to be in the state for carrying out the first operation (see (d) of FIG. 34). The first operation of the refresh output control section RS1 differs depending on which one of the first potential level and the second potential level is indicated by the control information as being retained as the binary logical level by the second data retention section DS2.

That is, in a case where the first potential level is retained by the second data retention section DS2, the refresh output control section RS1 is turned into the active state in such a manner that first control information indicating that the first potential level is retained by the second data retention section DS2 is transferred from the second data retention section DS2 to the refresh output control section RS1. In this state, the refresh output control section RS1 receives an input and supplies, as its output, the input thus received to the first data retention section DS1. In a case where the refresh output control section RS1 carries out the first operation, the potential of the supply source VS1 is set so that the second potential level is supplied as the input to the refresh output control section RS1 during a time period in which the first control information is transferred to the refresh output control section RS1 (at least at the end of the time period). In this case, the second potential level is overwritten on the binary logical level which has been retained by the first data retention section DS1 so that the first data retention section DS1 retains the second potential level supplied from the refresh output control section RS1.

Meanwhile, in a case where the second potential level is retained by the second data retention section DS2, the refresh output control section RS1 is turned into the inactive state (i.e., the state in which the refresh output control section RS1 does not supply its output, indicated by "x" in FIG. 34) in such a manner that second control information indicating that the second potential level is retained by the second data retention section DS2 is transferred from the second data retention section DS2 to the refresh output control section RS1. In this case, the first data retention section DS1 keeps retaining the first potential level.

After that, the refresh output control section RS1 is controlled by the refresh output control line RC1 to be in the state for carrying out the second operation.

Next, during the refreshing time period T2, the data transfer section TS1 is turned into the transfer operation state by the data transfer control line DT1 (see (e) of FIG. 34). As a result, the binary logical data which has been retained by the first data retention section DS1 is transferred from the first data retention section DS1 to the second data retention section DS2 via the data transfer section TS1 while the first data retention section DS1 keeps retaining the binary logical data. In a case where the data is transferred from the first data retention section DS1 to the second data retention section DS2, the data transfer section TS1 is turned off, i.e., the data transfer section TS1 is turned into the non-transfer operation state.

Then, the switching circuit SW1 is turned on by the switch control line SC1 so that the first potential level is supplied from the data input line IN1 to the first data retention section DS1 via the switching circuit SW1 (see (f) of FIG. 34). In a case where the first potential level is supplied to the first data retention section DS1, the switching circuit SW1 is turned off by the switch control line SC1.

After that, the refresh output control section RS1 is controlled by the refresh output control line RC1 to be in the state for carrying out the first operation (see (g) of FIG. 34). In a case where the second data retention section DS2 retains the first potential level, the refresh output control section RS1 is turned into the active state, and supplies, to the first data retention section DS1, the second potential level received from the supply source VS1. In this case, the second potential level is overwritten on the binary logical level which has been retained by the first data retention section DS1 so that the first data retention section DS1 retains the second potential level supplied from the refresh output control section RS1. Meanwhile, in a case where the second data retention section DS2 retains the second potential level, the refresh output control section RS1 is turned into the inactive state, i.e., the state in which the refresh output control section RS1 does not supply its output. In this case, the first data retention section DS1 continues retaining the first potential level. Then, the refresh output control section RS1 is controlled by the refresh output control line RC1 to be in the state for carrying out the second operation, i.e., the state in which the refresh output control section RS1 does not supply its output.

Next, the data transfer section TS1 is turned into the transfer operation state by the data transfer control line DT1 (see (h) of FIG. 34). As a result, the binary logical level which has been retained by the first data retention section DS1 is transferred from the first data retention section DS1 to the second data retention section DS2 via the data transfer section TS1 while the first data retention section DS1 keeps retaining the binary logical level. In a case where the binary logical level is transferred from the first data retention section DS1 to the second data retention section DS2, the data transfer section TS1 is turned off, i.e., the data transfer section TS1 is turned into the non-transfer operation state.

With a series of operations described above, the binary logical level which has been written during the writing time period T1 ((a) of FIG. 34) is recovered in the first data retention section DS1 and in the second data retention section DS2 in (h) of FIG. 34. Accordingly, even if, after the operation of (h) of FIG. 34 is finished, the operations of (b) through (h) of FIG. 34 are repeated arbitrary times, the data which has been written during the writing time period T1 is recovered in the same manner as described above.

Here, in a case where the first potential level (here, the high level) is written during the writing time period T1, the first potential level is refreshed in such a manner that the first potential level is reversed once in (d) of FIG. 34 and once in (f) of FIG. 34. The first potential level is thus recovered. In a case where the second potential level (here, the low level) is written during the writing time period T1, the second potential level is refreshed in such a manner that the second potential level is reversed once in (c) of FIG. 34 and once in (g) of FIG. 34. The second potential level is thus recovered.

Note that, in a case where the first potential level is the low level and the second potential level is the high level, the operation logic described above should be reversed.

During the refreshing time period T2, the first potential level is supplied from the data input line IN1 to the first data retention section DS1 (as in (c) and (f) of FIG. 34), while the refresh output control section RS1 supplies, to the first data retention section DS1, the second potential level received from the supply source VS1 (as in (d) and (g) of FIG. 34). It is therefore unnecessary to provide an inverter to carry out the refresh operation, which inverter has been conventionally necessary to carry out the refresh operation.

As described above, according to the memory device 1, after the binary logical data is written in the first data retention section DS1 of each memory cell 20, one of the first and second potential levels is supplied from the data input line IN1, while the other one of the first and second potential levels is supplied from the supply source VS1. With the arrangement, it is possible to refresh, without using the inverter, the binary logical level corresponding to the binary logical data written in the memory cell 20, while causing the binary logical level to be subjected to level reversal. In a case where the refresh operation is carried out, the binary logical level of the first data retention section DS1 and the binary logical level of the second data retention section DS2 are identical with each other. Accordingly, in a case where the data transfer section TS1 carries out the transfer operation, the first data retention section DS1 and the second data retention section DS2 have no change in their potential level. With the arrangement, it becomes possible to retain the refreshed binary logical level at both the first data retention section DS1 and the second data retention section DS2 for a long time while causing the data transfer section TS1 to be in the transfer operation state. Here, the first data retention section DS1 and the second data retention section DS2 are electrically connected to each other via the data transfer section TS1. Accordingly, presence of an off-leakage current in a transfer element of the data transfer section TS1 is irrespective of retention of the binary logical level. Further, from a standpoint of the entire memory cell 20, the binary logical level is retained in a large electrical capacity represented by a sum of an electrical capacity of the first data retention section DS1 and an electrical capacity of the second data retention section DS2. Because of this, the potential of the binary logical level is not likely to be fluctuated due to an influence of external noise.

Figure 39:
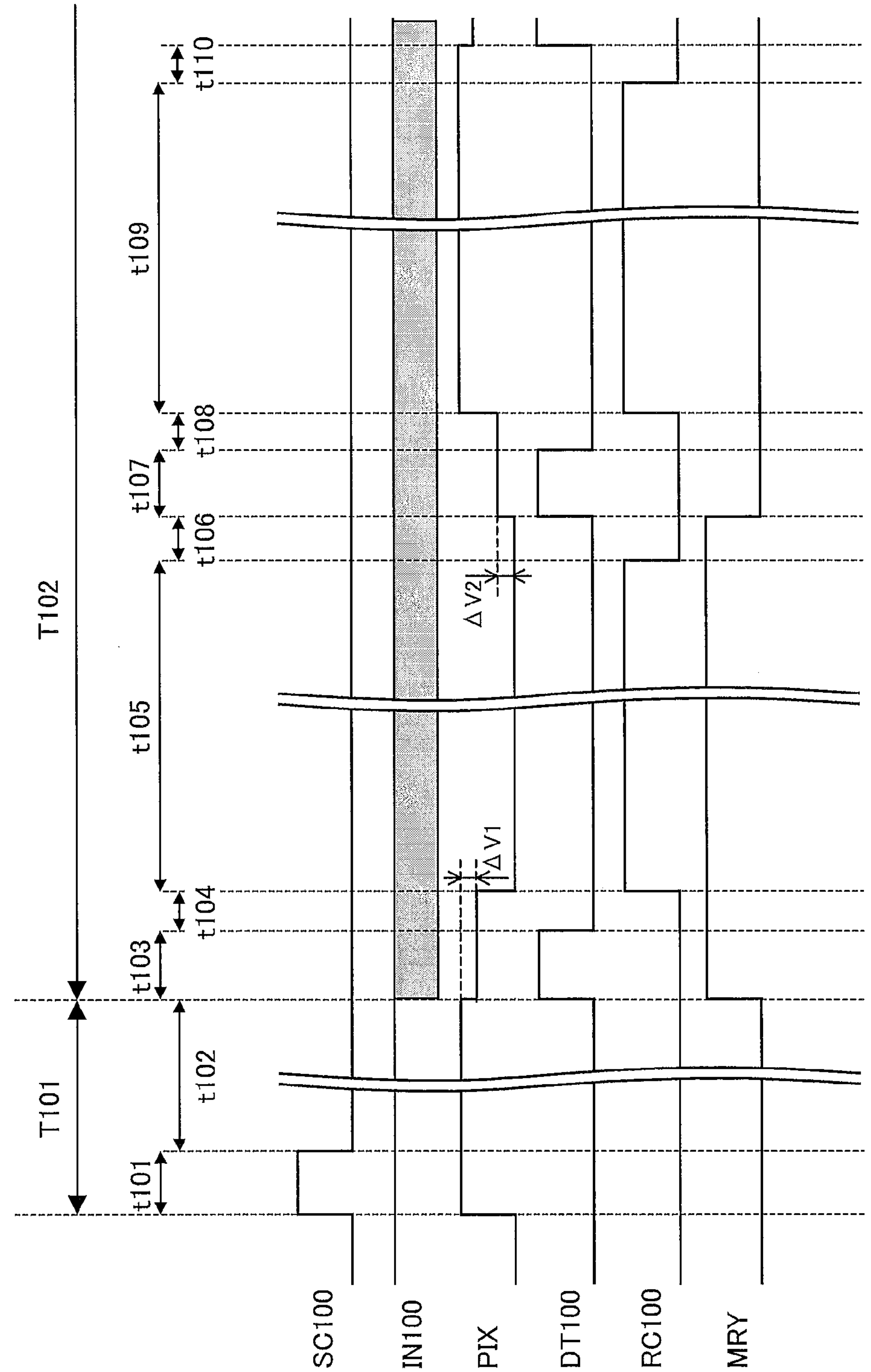
FIG. 39 is a view showing signals used in a writing operation of the memory circuit illustrated in FIG. 38.
Figure 40:
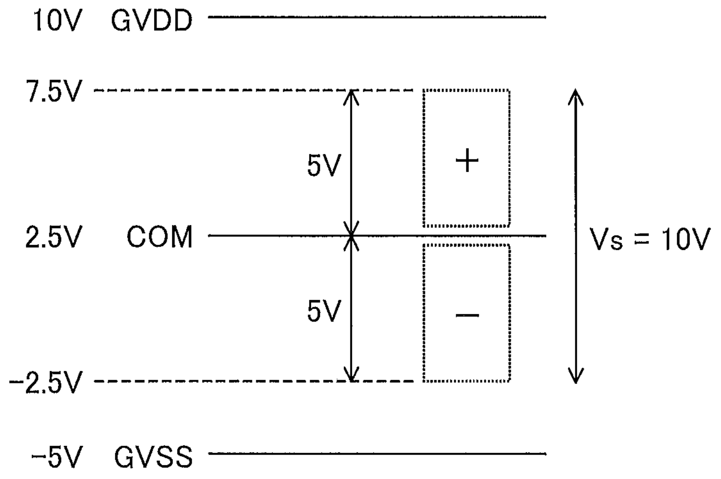
FIG. 40 is a view showing power source voltages and a range of a potential of a signal, in accordance with the conventional technique.

Accordingly, even if there is an off-leakage current in the transfer element used in the data transfer section TS1, a potential of a retention node for retaining the binary logical level of the second data retention section DS2 is retained for a long time with a potential of a retention node of the first data retention section DS1. The potential of the retention node of the second retention section DS2 is therefore not likely to be fluctuated. According to a conventional memory cell, in a case where the refresh operation is carried out, the first data retention section DS101 and the second data retention section DS102 retain, for a long time, different binary logical levels, respectively, while they are electrically disconnected from each other by the transfer element (transistor N101) of the data transfer section TS100 (as in time periods t105 and t109 of FIG. 39). With the arrangement, an off-leakage current in the transfer element has a significant influence on the potential of the second data retention section DS102.

Further, even if the potential of the retention node of the second data retention section DS2 is fluctuated, a time period in which the potential is being fluctuated is not such a long time period that the control information for controlling the refresh control section RS1, which is carrying out the first operation, is switched between the active level and the inactive level.

Furthermore, assuming that there is an inverter in the refresh control section RS1, there would be two complementary levels as active levels for the inverter to operate, i.e., the high level and the low level. In this case, a range in which the potential of the second data retention section DS2 could serve as a level for causing the inverter to maintain the same operation stably is narrow. For example, in a case where (i) the potential of the second data retention section DS2 is the low level, (ii) the inverter is operated to cause a P-channel transistor to be in an ON state and an N-channel transistor to be in an OFF state, and (iii) a gate potential of the P-channel transistor is slightly increased, there is a risk that the N-channel transistor might be turned into an electrically-conductive state. In order to prevent such a situation, a threshold voltage of the N-channel transistor may be set to be high. In this case, however, when it is desired that (i) the P-channel transistor is turned off, and (ii) the N-channel transistor is turned on, a range in which the high level could serve as the active level would become narrow. On the other hand, according to the present embodiment, the active level of the refresh control section RS1 is one of the first and second potential levels. That is, a range in which the control information for controlling the refresh control section RS1 serves as the inactive level is large, so that there is a low risk that the inactive level might be switched to the active level. Meanwhile, it is possible to supply easily the active level from the supply section VS1 to the first data retention section DS1, if only the active level functions in an initial state of the active state of the first operation of the refresh control section RS1. Accordingly, even if the active level is ultimately switched to the inactive level, there is a low risk that the refresh control section RS1 might have a malfunction. It is therefore possible to realize easily a design having such wide allowance that, even if the potential of the retention node of the second data retention section DS2 is fluctuated, the refresh control section RS1 would not have a malfunction. For example, there is a case where the control information for controlling the refresh control section RS1 is inputted into a gate of a transistor. The arrangement described above corresponds to such a design that (i) the threshold voltage of the transistor is set to be high, and, as a result, (ii) a voltage between the gate and the source is not likely to be higher than the threshold voltage of the transistor, even if the potential of the second data retention section DS2 is fluctuated and does not become the target inactive level.

Moreover, even if the potential of the retention node of the second data retention section DS2 is fluctuated, the refresh output control section RS1 would not have a malfunction during a time period in which the refresh output control section RS1 carries out the second operation.

Accordingly, it is possible to realize a memory device which can cause a circuit for carrying out the refresh operation to carry out appropriately, without an increase in consumption current or generation of a malfunction, an original refresh operation on the basis of a binary logical level retained by one of two retention sections, even if there is an off-leakage current in a transfer element used in a transfer section which transfers binary logical data between the two retention sections.

Next, the following description deals with a specific arrangement and a specific operation of the memory cell 20 with an example.

EXAMPLE 1

Figure 11:
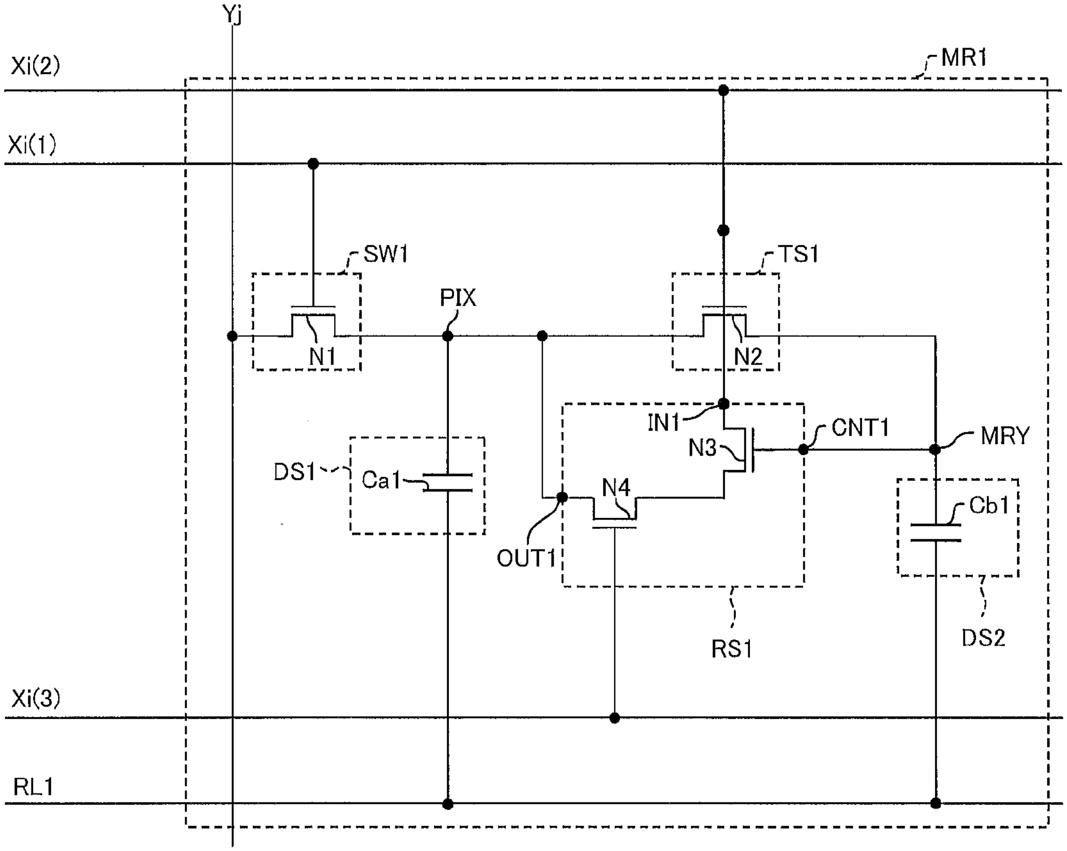
FIG. 11 is a circuit diagram illustrating an arrangement of a first memory circuit, in accordance with an embodiment of the present invention.

FIG. 11 illustrates a memory circuit MR1 serving as an equivalent circuit, which corresponds to an arrangement of a memory cell 20 of the present example.

As described above, the memory circuit MR1 includes a switching circuit SW1, a first data retention section DS1, a data transfer section TS1, a second data retention section DS2, and a refresh output control section RS1.

The switching circuit SW1 is constituted by a transistor N1 which is an N-channel TFT. The first data retention section DS1 is constituted by a capacitor (first capacitor) Ca1. The data transfer section TS1 is constituted by a transistor (third switch) N2 which is an N-channel TFT. The transistor N2 serves as a transfer element. The second data retention section DS2 is constituted by a capacitor (second capacitor) Cb1. The refresh output control section RS1 is constituted by a transistor (first switch) N3 which is an N-channel TFT, and a transistor (second switch) N4 which is an N-channel TFT. The capacitor Ca1 has a capacitance larger than that of the capacitor Cb1.

That is, in FIG. 11, all of the transistors constituting the memory circuit are N-channel TFTs (field-effect transistors). Accordingly, the memory circuit MR1 can be incorporated in amorphous silicon easily.

Further, the memory device 1 includes, as a line for driving each of the memory circuits MR1, a reference potential line RL1, in addition to a first word line Xi(1), a second word line Xi(2), a third word line Xi(3), and a bit line Yj which are described above.

Furthermore, one of drain/source terminals of the field-effect transistor like the above TFTs is referred to as “first drain/source terminal”, and the other one of drain/source terminals is referred to as “second drain/source terminal”. This applies to other examples which will be described later.

A gate terminal of the transistor N1 is connected to the first word line Xi(1). A first drain/source terminal of the transistor N1 is connected to the bit line Yj. A second drain/source terminal of the transistor N1 is connected to a node (retention node) PIX which is connected to one of ends of the capacitor Ca1. The other one of ends of the capacitor Ca1 is connected to the reference potential line RL1. When the transistor N1 is turned on, the switching circuit SW1 is turned into an electrically-conductive state. When the transistor N1 is turned off, the switching circuit SW1 is turned into a shutoff state.

A gate terminal of the transistor N2 is connected to the second word line Xi(2). A first drain/source terminal of the transistor N2 is connected to the node PIX. A second drain/source terminal of the transistor N2 is connected to a node (retention node) MRY which is connected to one of ends of the capacitor Cb1. The other one of ends of the capacitor Cb1 is connected to the reference potential line RL1. When the transistor N2 is turned on, the data transfer section TS1 is turned into a transfer operation state. When the transistor N2 is turned off, the data transfer section TS1 is turned into a non-transfer operation state.

A gate terminal of the transistor N3 is connected to the node MRY as a control terminal CNT1 of the refresh output control section RS1. A first drain/source terminal of the transistor N3 is connected to the second word line Xi(2) as an input terminal IN1 of the refresh output control section RS1. A second drain/source terminal of the transistor N3 is connected to a first drain/source terminal of the transistor N4. A gate terminal of the transistor N4 is connected to the third word line Xi(3). A second drain/source terminal of the transistor N4 is connected to the node PIX as an output terminal OUT1 of the refresh output control section RS1. That is, the transistors N3 and N4 are connected to each other in series between an input and an output of the refresh output control section RS1 so that the transistor N3 is provided on an input side of the refresh output control section RS1 with respect to the transistor N4. Note that a position of the transistor N3 and a position of the transistor N4 can be replaced with each other, provided that the transistors N3 and N4 are connected to each other in series between the input and the output of the refresh output control section RS1.

During a time period in which the transistor N4 is in an ON state, the refresh output control section RS1 is controlled to be in a state for carrying out a first operation. Meanwhile, during a time period in which the transistor N4 is in an OFF state, the refresh output control section RS1 is controlled to be in a state for carrying out a second operation. Since the transistor N3 is an N-channel TFT, (i) control information that controls the refresh output control section RS1 to be in an active state when the refresh output control section RS1 carries out the first operation, i.e., an active level, is a high level, and (ii) control information that controls the refresh output control section RS1 to be in an inactive state when the refresh output control section RS1 carries out the first operation, i.e., an inactive level, is a low level.

Next, the following description deals with operations of the memory circuit MR1 having the arrangement described above.

First, a writing operation of the memory circuit MR1 is described below.

The writing operation is carried out in such a manner that (i) a write instruction and a write address are inputted from the outside of the memory device 1 to an input/output interface 11 via a transmission line, and (ii) an instruction decoder 12 decodes the write instruction so as to cause the memory circuit MR1 to be in a writing mode. A timing generation circuit 13 receives, from the instruction decoder 12, a signal indicating the writing mode, and generates an internal timing signal of the writing operation in accordance with the signal indicating the writing mode. A word line control circuit 14 selects, on the basis of the write address received via the input/output interface 11, one of the first word line Xi(1), the second word line Xi(2), and the third word line Xi(3), and controls the one of the word lines thus selected. Further, a writing/reading circuit 15 controls all of bit lines Yj. Hereinafter, the first word line Xi(1), the second word line Xi(2), and the third word line Xi(3), one of which is selected on the basis of the write address, are referred to as “first word line Xiw(1) ”, “second word line Xiw(2)”, and “third word line Xiw(3)”, respectively.

Figure 12:
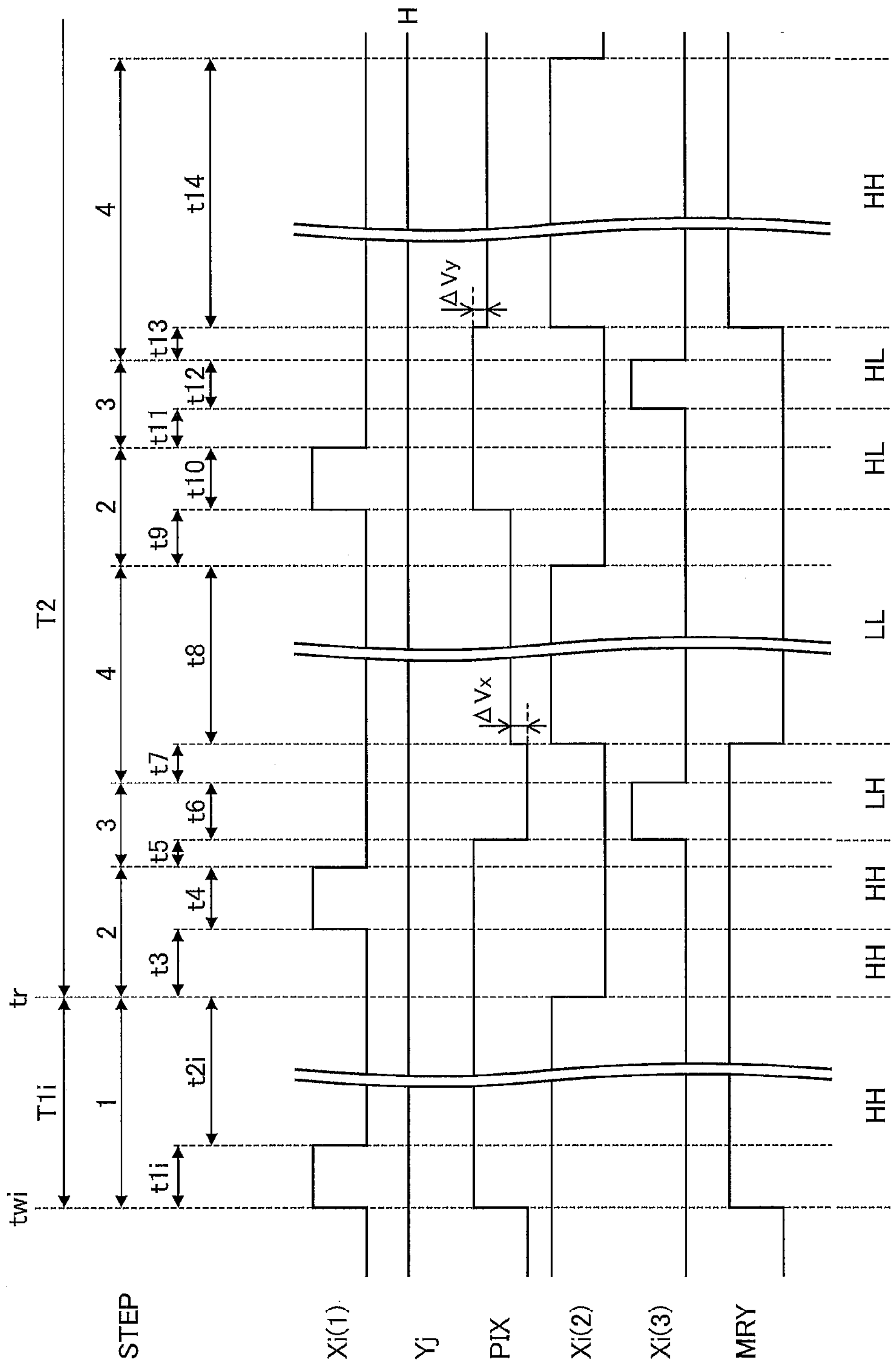
FIG. 12 is a view showing signals used in a writing operation of the first memory circuit illustrated in FIG. 11.
Figure 13:
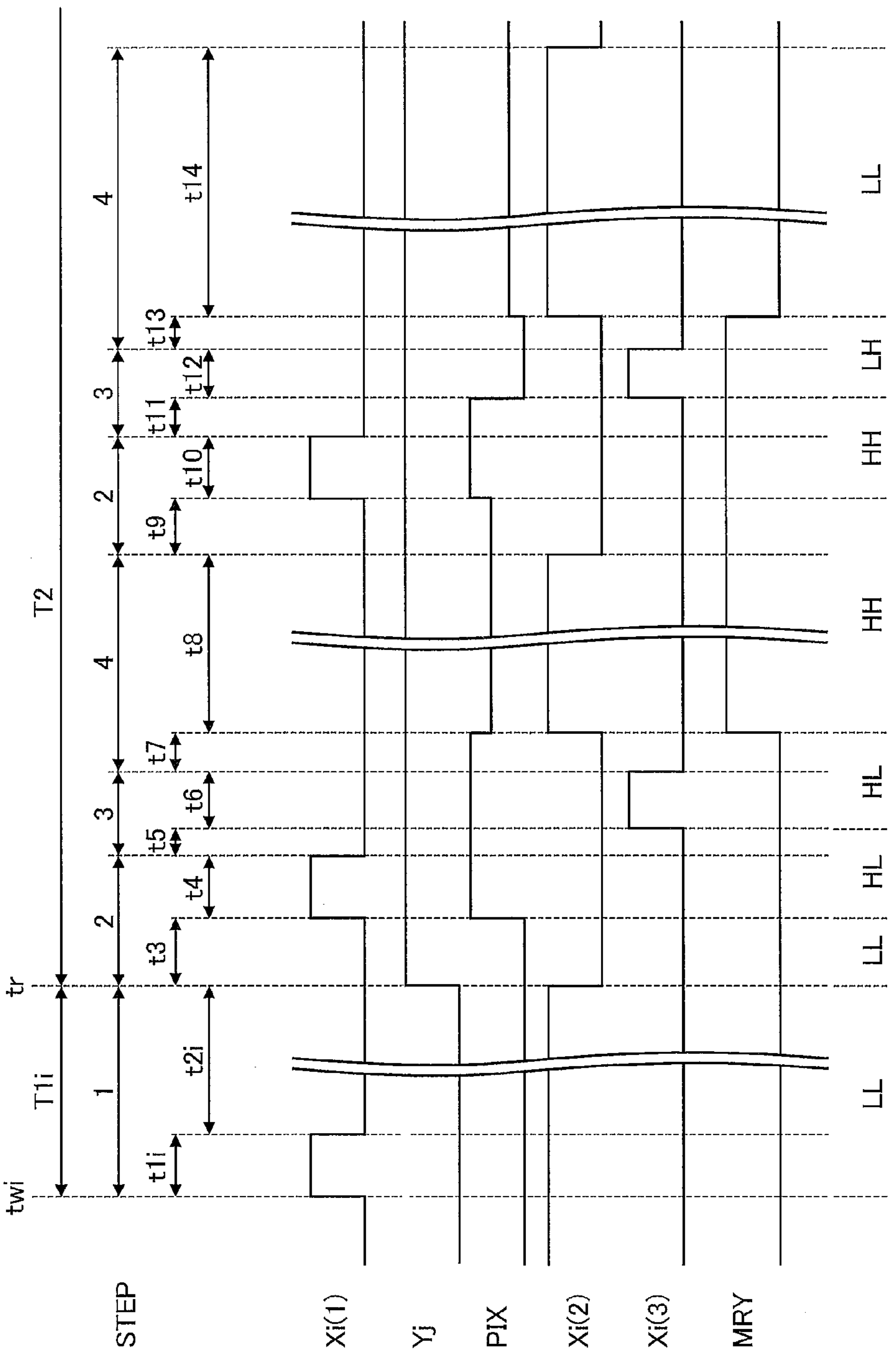
FIG. 13 is a view showing signals used in another writing operation of the first memory circuit illustrated in FIG. 11.

Each of FIGS. 12 and 13 shows how the memory circuit MR1 carries out a writing operation of data. According to the present example, in a case where any data is written in memory circuits MR1 positioned at different rows, rows each of which corresponds to a write address of a memory array 10 are sequentially driven row by row. Accordingly, a writing time period T1 is set for each of the rows. A writing time period T1 of the ith row is referred to as “writing time period T1*i*”. FIG. 12 shows a case where a high level is written as a first potential level during the writing time period T1*i*. FIG. 13 shows a case where a low level is written as a second potential level during the writing time period T1*i*. Further, at a bottom of each of FIGS. 12 and 13, a potential of the node PIX (on the left side) and a potential of the node MRY (on the right side) are shown for each of time periods corresponding to (a) through (h) of FIG. 34, respectively.

In FIG. 12, the word line control circuit 14 applies a binary level potential represented by a high level (active level) or a low level (inactive level) to the first word line Xiw(1), the second word line Xiw(2), and the third word line Xiw(3). A high potential and a low potential of the binary level potential can be set for each of the aforementioned lines. The bit line Yj receives a binary logical level from the writing/reading circuit 15. The binary logical level is represented by a high potential and a low potential, which are lower than the high potential of the first word line Xiw(1). A high potential of the second word line Xiw(2) is identical with one of the high potential of the bit line Yj and the high potential of the first word line Xi(1). A low potential of the second word line Xiw(2) is identical with the low potential of the binary logical level. Further, a potential supplied by the reference potential line RL1 is constant.

For the writing operation of data, a writing time period T1*i* and a refreshing time period T2 are provided. The writing time period T1*i* is started at a time twi, which is set for each of the rows, independently. The refreshing time period T2 is started after data is written in memory circuits MR1 at rows indicated by write addresses. The refreshing time period T2 is started at a time tr, which is set for all of the rows including rows which are not indicated by the write addresses. The writing time period T1*i* is a time period in which a binary logical level corresponding to data to be retained by the memory circuit MR1 is written. The writing time period T1*i* is constituted by a time period t1*i* and a time period t2*i* which follows the time period t1*i* sequentially. The refreshing time period T2 is a time period in which the binary logical level written in the memory circuit MR1 is retained while being refreshed. The refreshing time period T2 is constituted by continuous time periods t3 through t14, which are sequentially provided.

During the time period t1*i* of the writing time period T1*i*, potentials of the first word line Xiw(1) and the second word line Xiw(2) are high. A potential of the third word line Xiw(3) is low. This turns on the transistors N1 and N2, so that the switching circuit SW1 is turned into the electrically-conductive state and the data transfer section TS1 is turned into the transfer operation state. As a result, the first potential level (here, a high level) supplied to the bit line Yj is written in the node PIX. During the time period t2*i*, the potential of the first word line Xiw(1) becomes low, while the potential of the second word line Xiw(2) keeps being high. The potential of the third word line Xiw(3) is low. This turns off the transistor N1, so that the switching circuit SW1 is turned into the shutoff state. Further, since the transistor N2 keeps being in the ON state, the data transfer section TS1 keeps being in the transfer operation state. Accordingly, the first potential level is transferred from the node PIX to the node MRY, and the node PIX and the node MRY are electrically disconnected from the bit line Yj. This process corresponds to a state illustrated in (a) of FIG. 34.

Next, the refreshing time period T2 is started. During the refreshing time period T2, the potential of the bit line Yj is high, i.e., the first potential level. Further, all the first word lines Xi(1) ($1 \leq i \leq n$), all the second word lines Xi(2) ($1 \leq i \leq n$), and all the third word lines Xi(3) ($1 \leq i \leq n$) are driven in the following manner. That is, all the memory cells are subjected to a refresh operation simultaneously (hereinafter, referred to as "all refresh operation" in some cases).

During the time period t3 of the refreshing time period T2, the potential of the first word line Xi(1) becomes low, the potential of the second word line Xi(2) becomes low, and the potential of the third word line Xi(3) becomes low. This turns off the transistor N2, so that the data transfer section TS1 is turned into the non-transfer operation state. As a result, the nodes PIX and MRY are electrically disconnected from each other. Both the nodes PIX and MRY retain the high potential level. This process corresponds to a state illustrated in (b) of FIG. 34.

During the time period t4, the potential of the first word line Xi(1) becomes high, the potential of the second word line Xi(2) keeps being low, and the potential of the third word line Xi(3) keeps being low. This turns on the transistor N1, so that the switching circuit SW1 is turned into the electrically-conductive state. As a result, the high potential supplied from the bit line Yj is written in the node PIX again.

During the time period t5, the potential of the first word line Xi(1) becomes low, the potential of the second word line Xi(2) keeps being low, and the potential of the third word line Xi(3) keeps being low. This turns off the transistor N1, so that the switching circuit SW1 is turned into the shutoff state. As a result, the node PIX is electrically disconnected from the bit line Yj, and retains the high potential.

Each of the processes of the time periods t4 and t5 corresponds to a state illustrated in (c) of FIG. 34.

During the time period t6, the potential of the first word line Xi(1) keeps being low, the potential of the second word line Xi(2) keeps being low, and the potential of the third word line Xi(3) becomes high. This turns on the transistor N4, so that the refresh output control section RS1 carries out the first operation. Further, since the potential of the node MRY is high, the transistor N3 is in the ON state. Accordingly, the refresh output control section RS1 is turned into the active state, and the low potential is supplied from the second word line Xi(2) to the node PIX via the transistors N3 and N4. The second word line Xi(2) also serves as a supply source VS1 in FIG. 33.

During the time period t7, the potential of the first word line Xi(1) keeps being low, the potential of the second word line Xi(2) keeps being low, and the potential of the third word line Xi(3) becomes low. This turns off the transistor N4, so that the refresh output control section RS1 is turned into the state for carrying out the second operation. As a result, the node PIX is electrically disconnected from the second word line Xi(2), and retains the low potential.

Each of the processes of the time periods t6 and t7 corresponds to a state illustrated in (d) of FIG. 34.

During the time period t8, the potential of the first word line Xi(1) keeps being low, the potential of the second word line Xi(2) becomes high, and the potential of the third word line Xi(3) keeps being low. This turns on the transistor N2, so that the data transfer section TS1 is turned into the transfer operation state. Here, an electric charge is transferred between the capacitor Ca1 and the capacitor Cb1, so that both the potentials of the nodes PIX and MRY become low. A positive electric charge is transferred from the capacitor Cb1 to the capacitor Ca1 via the transistor N2, so that the potential of the node PIX is increased by a small voltage of $\Delta Vx$. However, the potential of the node PIX is still in a range of the low potential.

During the time period t8, binary logical data which has been refreshed is retained by both the first data retention section DS1 and the second data retention section DS2 which are connected to each other via the data transfer section TS1. The time period t8 can be set to be long. This also applies to the following examples and the following embodiment.

During the time period t9, the potential of the first word line Xi(1) keeps being low, the potential of the second word line Xi(2) becomes low, and the potential of the third word line Xi(3) keeps being low. This turns off the transistor N2, so that the data transfer section TS1 is turned into the non-transfer operation state. As a result, the nodes PIX and MRY are electrically disconnected from each other. Both the nodes PIX and MRY retain the low potential. Each of the processes of the time periods t8 and t9 corresponds to a state illustrated in (e) of FIG. 34.

During the time period t10, the potential of the first word line Xi(1) becomes high, the potential of the second word line Xi(2) keeps being low, and the potential of the third word line Xi(3) keeps being low. This turns on the transistor N1, so that the switching circuit SW1 is turned into the electrically-conductive state. As a result, the high potential supplied from the bit line Yj is written in the node PIX again.

During the time period t11, the potential of the first word line Xi(1) becomes low, the potential of the second word line Xi(2) keeps being low, and the potential of the third word line Xi(3) keeps being low. This turns off the transistor N1, so that the switching circuit SW1 is turned into the shutoff state. As a result, the node PIX is electrically disconnected from the bit line Yj, and retains the high potential.

Each of the processes of the time periods t10 and t11 corresponds to a state illustrated in (f) of FIG. 34.

During the time period t12, the potential of the first word line Xi(1) keeps being low, the potential of the second word line Xi(2) keeps being low, and the potential of the third word line Xi(3) becomes high. This turns on the transistor N4, so that the refresh output control section RS1 is turned into the state for carrying out the first operation. Further, since the potential of the node MRY is low, the transistor N3 is in the OFF state. Accordingly, the refresh output control section RS1 is turned into the inactive state, and stops supplying its output. Therefore the node PIX keeps retaining the high potential.

During the time period t13, the potential of the first word line Xi(1) keeps being low, the potential of the second word line Xi(2) keeps being low, and the potential of the third word line Xi(3) becomes low. This turns off the transistor N4, so that the refresh output control section RS1 is turned into the state for carrying out the second operation. As a result, the node PIX retains the high potential.

Each of the processes of the time periods t12 and t13 corresponds to a state illustrated in (g) of FIG. 34.

During the time period t14, the potential of the first word line Xi(1) keeps being low, the potential of the second word line Xi(2) becomes high, and the potential of the third word line Xi(3) keeps being low. This turns on the transistor N2, so that the data transfer section TS1 is turned into the transfer operation state. Here, an electric charge is transferred between the capacitor Ca1 and the capacitor Cb1, so that both the potentials of the nodes PIX and MRY become high. A positive electric charge is transferred from the capacitor Ca1 to the capacitor Cb1 via the transistor N2, so that the potential of the node PIX is reduced by a small voltage of ΔVy. However, the potential of the node PIX is still in a range of the high potential. This process corresponds to a state illustrated in (h) of FIG. 34.

During the time period t14, binary logical data which has been refreshed is retained by both the first data retention section DS1 and the second data retention section DS2 which are connected to each other via the data transfer section TS1. The time period t14 can be set to be long. This also applies to the following examples and the following embodiment.

With the operations described above, the potential of the node PIX is high during the time periods t1*i* through t5, and the time periods t10 through t14, and is low during the time periods t6 through t9. Meanwhile, the potential of the node MRY is high during the time periods t1*i* through t7, and the time period t14, and is low during the time periods t8 through t13.

In a case where the refreshing time period T2 is continued after the aforementioned operations, the instruction decoder 12 repeats the operations of the time periods t3 through t14. In a case where new data is written or data is read out, the instruction decoder 12 finishes the refreshing time period T2, and cancels the all refresh operation mode.

The operations shown in FIG. 12 are thus carried out.

An instruction of the all refresh operation is generated by use of a signal externally supplied. Note, however, that the instruction of the all refresh operation may be generated by use of a clock generated internally by use of an oscillator or the like. With the arrangement, it becomes unnecessary for an external system to supply a refresh instruction at predetermined timing. This makes it possible to allow a system structure to be more flexible. In a dynamic memory circuit employing the memory cell 20 of the present example, all the arrays can be subjected to the all refresh operation at once, without carrying out scanning for each of the word lines. Accordingly, with the dynamic memory circuit employing the memory cell 20, it is possible to reduce the number of peripheral circuits, which are necessary to carry out the refreshing in a general conventional dynamic memory circuit while carrying out destructive reading of the potential of the bit line Yj.

Next, the operations shown in FIG. 13 are described below.

In the operations shown in FIG. 13, the low potential is written in the memory cell 20 as the second potential level during the writing time period T1*i*. During the writing time period T1*i*, the potential of the bit line Yj is low. Note that, in each of the time periods, changes in potentials of the first word line Xi(1), the second word line Xi(2), and the third word line Xi(3) are the same as in FIG. 12.

With the arrangement, the potential of the node PIX is low during the time periods t1*i* through t3, and the time periods t12 through t14, and is high during the time periods t4 through t11. Meanwhile, the potential of the node MRY is low during the time periods t1*i* through t7, and the time period t14, and is high during the time periods t8 through t13.

(a) through (h) of FIG. 34 show transitions of a state of the memory cell 20. Meanwhile, operation steps of the memory circuit MR1, shown in each of FIGS. 12 and 13, can be classified as described below.

(1) First Step (Time Periods t1*i* and t2*i* (Writing Time Period T1*i*))

In the first step, on a condition that (i) a binary logical level corresponding to data has been supplied from the writing/reading circuit 15 to the bit line Yj and (ii) the refresh output control section RS1 has carried out the second operation, the switching circuit SW1 is turned into the electrically-conductive state. As a result, the binary logical level is written in the memory cell 20. On a condition that (i) the binary logical level has been written in the memory cell 20 and (ii) the refresh output control section RS1 has carried out the second operation, the data transfer section TS1 carries out the transfer operation.

(2) Second Step (Time Periods t3 and t4, and Time Periods t9 and t10)

In the second step following the first step, on a condition that (i) the refresh output control section RS1 has carried out the second operation and (ii) the data transfer section TS1 has carried out the non-transfer operation, the switching circuit SW1 is turned into the electrically-conductive state. As a result, a binary logical level is supplied to the first data retention section DS1 via the bit line Yj, which binary logical level corresponds to a level of control information which controls the refresh output control section RS1 to be in the active state.

(3) Third Step (Time Periods t5 and t6, and Time Periods t11 and t12)

In the third step following the second step, on a condition that (i) the switching circuit SW1 is in the shutoff state and (ii) the data transfer section TS1 has carried out the non-transfer operation, the refresh output control section RS1 carries out the first operation. When the first operation is finished, the supply source VS1 supplies a binary logical level to the refresh output control section RS1, which binary logical level is a reversal level of the level of the control information which controls the refresh output control section RS1 to be in the active state.

(4) Fourth Step (Time Periods t7 and t8, and Time Periods t13 and t14)

In the fourth step following the third step, on a condition that (i) the switching circuit SW1 is in the shutoff state and (ii) the refresh output control section RS1 has carried out the second operation, the data transfer section TS1 carries out the transfer operation.

As an entire writing operation, first, the operation of the first step is carried out, and then, a series of the operations of the second step through the fourth step (from the beginning of the second step to the end of the fourth step) (time periods t3 through t8) are carried out at least once.

Next, the following description deals with the reading operation of the memory circuit MR1.

The reading operation is carried out in such a manner that (i) a read instruction and a read address are inputted from the outside of the memory device 1 to the input/output interface 11 via the transmission line, and (ii) the instruction decoder 12 decodes the instruction so that the memory circuit MR1 is turned into a reading mode. The timing generation circuit 13 receives a signal indicating the reading mode from the instruction decoder 12, and generates an internal timing signal of the reading operation in accordance with the signal thus received. The word line control circuit 14 selects, in accordance with the read address received from the input/output interface 11, one of the first word line Xi(1), the second word line Xi(2), and the third word line Xi(3), and controls the one of the word lines thus selected. Further, the writing/reading circuit 15 controls all of the bit lines Yj. Hereinafter, the first word line Xi(1), the second word line Xi(2), and the third word line Xi(3), one of which is selected in accordance with the read address, are referred to as "first word line Xir(1)", "second word line Xir(2)", and "third word line Xir(3)", respectively.

Figure 14:
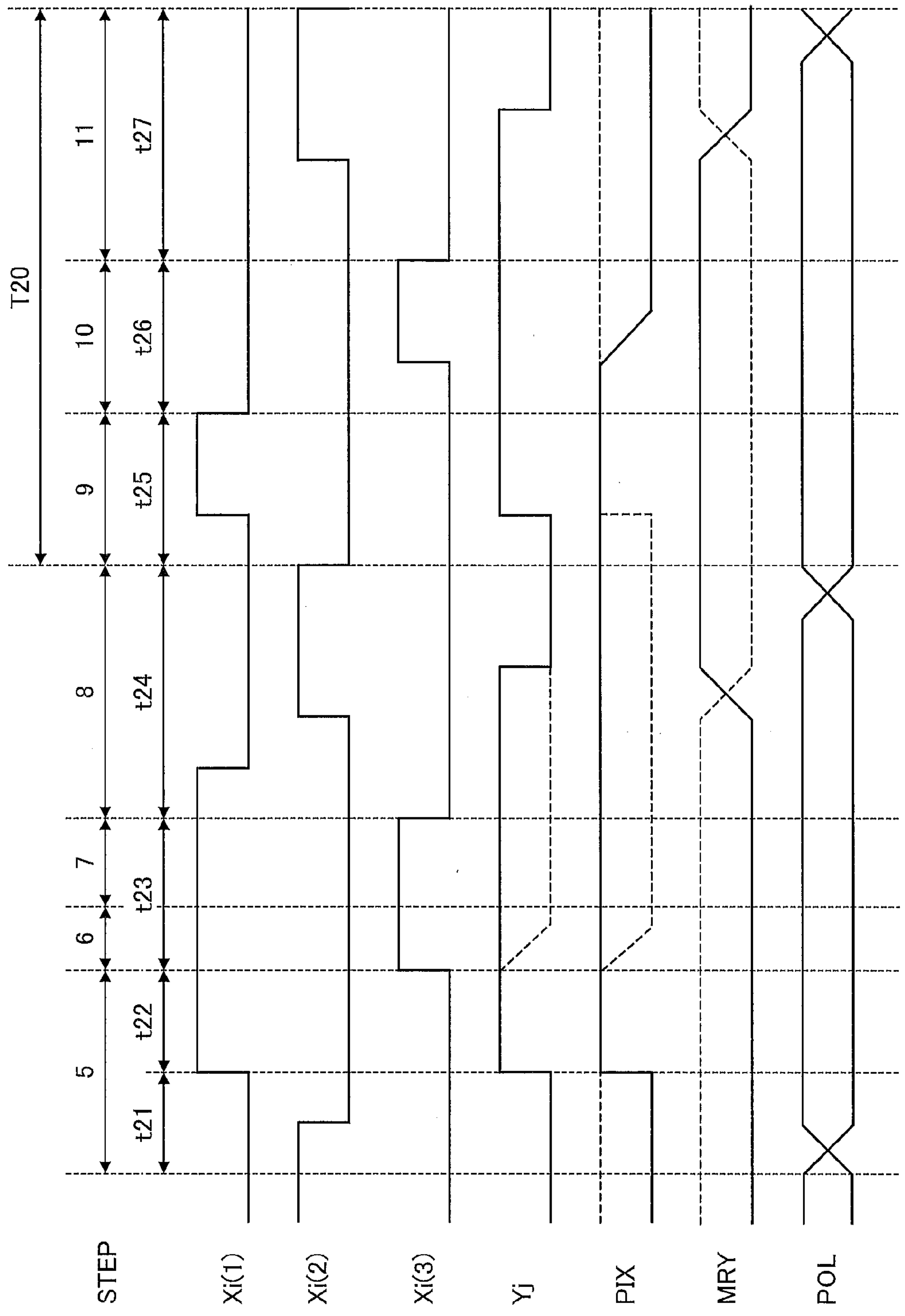
FIG. 14 is a view showing signals used in a reading operation of the first memory circuit illustrated in FIG. 11.

The following description deals with the operation of the memory cell 20 with reference to FIG. 14.

FIG. 14 shows waveforms of potentials of the first word line Xir(1), the second word line Xir(2), the third word line Xir(3), each bit line Yj, the node PIX, and the node MRY, and a waveform of a polarity signal POL.

The polarity signal POL is an internal signal indicating a polarity of data retained in the node PIX. According to the memory cell 20 of the present embodiment, the potential of the node PIX is reversed from the high potential to the low potential (or from the low potential to the high potential) every time the refresh operation is carried out. For this reason, data indicating which one of polarities current data has is retained by use of the polarity signal POL. That is, the polarity of the polarity signal POL is reversed every refresh operation. With the arrangement, it is possible to read out correctly which one of "0" and "1" the data written at any timing indicates, even if the polarity of data is reversed every refresh operation. The polarity signal POL can be controlled either by the writing/reading circuit 15 or by the timing generation circuit 13.

FIG. 15 shows how the polarity signal POL, the data, and the potential of the bit line Yj are related to each other. The polarity signal POL is switched between "0" and "1" every time the data retained by the memory cell 20 is refreshed. For example, in a case where (i) the data, written in the memory cell 20 during a time period in which the polarity signal is 0, is "0", and (ii) the binary logical level supplied in accordance with the data is "L", the memory cell 20 is such that (I) when the polarity signal POL is "0", the binary logical level of "L" is retained, and (II) when the polarity signal POL is "1", the binary logical level of "H" is retained.

In the reading mode, a first set time period t21, a pre-charge time period t22, a sensing time period t23, a second set time period t24, and a refreshing time period T20 are provided sequentially in this order. For each of rows corresponding to read addresses, operations of the first set time period t21, the pre-charge time period t22, the sensing time period t23, and the second set time period t24 are carried out sequentially in this order. Then, for all of the rows, an operation of the refreshing time period T20 is carried out simultaneously. Alternatively, for each of the rows corresponding to the read address, the operations of the first set time period t21, the pre-charge time period t22, the sensing time period t23, the second set time period t24, and the refreshing time period T20 are carried out sequentially in this order.

When the reading mode is started, first, the operation of the first set time period t21 is carried out. That is, the polarity signal POL is reversed, and then, a potential of the second word line Xir(2) is caused to be low.

Next, the pre-charge time period t22 follows the first set time period t21. A potential of the first word line Xir(1) is caused to be high, and potentials of all of the bit lines Yj are caused to be high (the binary logical level identical with the level of the control information which controls the refresh control section RS1 to be in the active state, i.e., the state for carrying out the first operation). Further, the writing/reading circuit 15 causes all the bit lines Yj to be in a high impedance state.

Then, the sensing time period t23 follows the pre-charge time period t22. A potential of the third word line Xir(3) is caused to be high, so that the transistor N4 is turned on. As a result, the refresh output control section RS1 is turned into the state for carrying out the first operation. Here, as shown in a dotted line in FIG. 14, the refresh output control section RS1 is turned into the active state in a case where the potential retained in the node MRY is high. In this case, the transistor N3 is turned on, so that a positive electric charge of the bit line Yj is discharged to the second word line Xir(2). As a result, the potential of the bit line Yj becomes low. On the other hand, as shown in a full line in FIG. 14, the refresh output control section RS1 is turned into the inactive state in a case where the potential retained in the node MRY is low. In this case, the transistor N3 is turned off, so that the bit line Yj retains the high potential.

Accordingly, by (i) sensing, at this point, the potential of each of the bit lines Yj by the writing/reading circuit 15, and (ii) determining output data in accordance with the polarity signal POL as shown in FIG. 15, it is possible to read out data of a selected address. The data thus read out is outputted to the outside by the input/output interface 11. When the sensing time period t23 is finished, the potential of the third word line Xir(3) is caused to be low. As a result, the transistor N4 is turned off, so that the refresh output control section RS1 is turned into the state for carrying out the second operation.

Then, the second set time period t24 follows the sensing time period t23. First, the potential of the first word line Xir(1) is caused to be low, so that the transistor N1 is turned off. That is, the switching circuit SW1 is turned into the shutoff state. Under the circumstances, the potential of the second word line Xir(2) is caused to be high, so that the transistor N2 is turned on. With the arrangement, the data transfer section TS1 is turned into the transfer operation state, so that the nodes PIX and MRY are electrically connected to each other. As a result, the binary logical level is transferred from the node PIX to the node MRY, so that a polarity of data in the node MRY and a polarity of data in the node PIX become identical with each other. The polarity of the data is thus reversed, which data has been retained in the node PIX and in the node MRY before the reading is carried out. After that, the potential of each of the bit lines Yj is caused to be low by the writing/reading circuit 15. The polarity signal POL is reversed before the second set time period t24 is finished.

Then, the refreshing time period T20 follows the second set time period t24. In order to switch the polarities of the node PIX and the node MRY, reversed in the reading operation, back to the original polarities, the refresh operation is carried out with respect to only 1 address by controlling only the word line selected in accordance with the address. During the refreshing time period T20, an operation which is similar to the refresh operation carried out in the writing mode (explained with reference to FIGS. 12 and 13) is carried out.

First, the time period t25 follows the second set time period t24. The potential of the second word line Xir(2) is caused to be low. This turns off the transistor N2, so that the data transfer section TS1 is turned into the non-transfer operation state. Then, the potential of the first word line Xir(1) becomes high, and the potential of each of the bit lines Yj is caused to be high by the writing/reading circuit 15. This change in the potential of the bit line Yj may be carried out from the beginning of the refreshing time period t25 in the same manner as in FIGS. 12 and 13. This causes the transistor N1 to be in the ON state, that is, the switching circuit SW1 is turned into the electrically-conductive state. As a result, the potential of the node PIX becomes high.

Next, the time period t26 follows the time period t25. The potential of the third word line Xir(3) becomes high. This causes the transistor N4 to be in the ON state, that is, the refresh output control section RS1 is turned into the state for carrying out the first operation. Here, in a case where the potential of the node MRY is high, the transistor N3 is in the ON state. In this case, the refresh output control section RS1 is turned into the active state, so that the node PIX is charged with the low potential which is identical with the potential of the second word line Xir(2). On the other hand, in a case where the potential of the node MRY is low, the transistor N3 is in the OFF state. In this case, the refresh output control section RS1 is turned into the inactive state, so that the node PIX retains the high potential.

Then, the time period t27 follows the time period t26. The potential of the third word line Xir(3) becomes low. This causes the transistor N4 to be in the OFF state, that is, the refresh output control section RS1 is turned into the state for carrying out the second operation. After that, the potential of the second word line Xir(2) becomes high. This causes the transistor N2 to be in the ON state, that is, the data transfer section TS1 is turned into the transfer operation state. Accordingly, the data of the node PIX is transferred to the node MRY, so that each of the nodes PIX and MRY is refreshed to have the polarity which is identical with the polarity each of the nodes PIX and MRY had immediately before the reading was carried out. The potential of each of the bit lines Yj is returned to be low. The polarity signal POL is reversed before the time period t27 is finished.

The time period t27 includes a time period in which the potential of the second word line Xir(2) is high. During this time period, the binary logical data thus refreshed is retained by both the first data retention section DS1 and the second data retention section DS2 which are connected to each other via the data transfer section TS1. This time period can be set to be long in the same manner as that of the writing operation. This causes the potentials of the nodes PIX and MRY to be stable. As a result, the memory cell 20 is not likely to have a malfunction.

The refresh operation of the memory cell 20, corresponding to the read address, may be finished in such a manner that the refresh operation is carried out once in the refreshing time period T20. Alternatively, the refresh operation may be carried out once in the refreshing time period T20, and then, the same refresh operation may be repeated. In a case where the refresh operation is repeated, the polarity of each of the nodes PIX and MRY is reversed every refresh operation.

In the above reading mode, when the data is read out, the capacity of the bit line Yj has been sufficiently charged. Accordingly, it is possible to reduce the number of peripheral circuits, which are necessary for a general conventional dynamic memory circuit to carry out, in performing data recovery after the reading is carried out, destructive reading of the potential of the bit line while carrying out the refreshing.

Operation steps of the memory circuit MR1 of FIG. 14 can be classified as described below.

(1) Fifth Step (Time Periods t21 and t22)

In the fifth step, on a condition that (i) the binary logical level has been supplied from the writing/reading circuit 15 to the bit line Yj, which binary logical level is identical with the level of the control information which controls the refresh output control section RS1 to be in the active state, (ii) the data transfer section TS1 has carried out the non-transfer operation, and (iii) the refresh output control section RS1 has carried out the second operation, the switching circuit SW1 is turned into the electrically-conductive state. As a result, the binary logical level is written in the memory cell 20.

(2) Sixth Step (Time Period t23)

In the sixth step following the fifth step, on a condition that (i) the switching circuit SW1 is turned into the electrically-conductive state, and (ii) the data transfer section TS1 has carried out the non-transfer operation, the refresh output control section RS1 carries out the first operation.

(3) Seventh Step (Time Period t23)

In the seventh step following the sixth step, on a condition that (i) the switching circuit SW1 is turned into the electrically-conductive state, and (ii) the data transfer section TS1 has carried out the non-transfer operation state, the potential of the bit line Yj is sensed by the writing/reading circuit 15 so as to determine the data retained by the memory cell 20.

(4) Eighth Step (Time Period t24)

In the eighth step following the seventh step, on a condition that (i) the switching circuit SW1 is turned into the shutoff state, and (ii) the refresh output control section TRS1 has carried out the second operation, the data transfer section TS1 carries out the transfer operation.

(5) Ninth Step (Time Period t25)

In the ninth step following the eighth step, on a condition that (i) the data transfer section TS1 has carried out the non-transfer operation, (ii) the writing/reading circuit 15 has supplied, to the bit line Yj, the binary logical level which is identical with the level of the control information which controls the refresh output control section RS1 to be in the active state, and (iii) the refresh output control section RS1 has carried out the second operation, the switching circuit SW1 is turned into the electrically-conductive state.

(6) Tenth Step (Time Period t26)

In the tenth step following the ninth step, on a condition that (i) the switching circuit SW1 is turned into the shutoff state, and (ii) the data transfer section TS1 has carried out the non-transfer operation, the refresh output control section RS1 carries out the first operation.

(7) Eleventh Step (Time Period t27)

In the eleventh step following the tenth step, on a condition that (i) the switching circuit SW1 is turned into the shutoff state, and (ii) the refresh output control section RS1 has carried out the second operation, the data transfer section TS1 carries out the transfer operation.

As an entire reading operation, first, the operations of the fifth step through the eighth step are carried out. After the operation of the eighth step is carried out, a series of operations of the ninth step through the eleventh step (from the beginning of the ninth step to the end of the eleventh step) (from the time period t25 to the time period t27 (refreshing time period T20)) are carried out at least once.

Next, the following description deals with a modified example of the present example.

Figure 16:
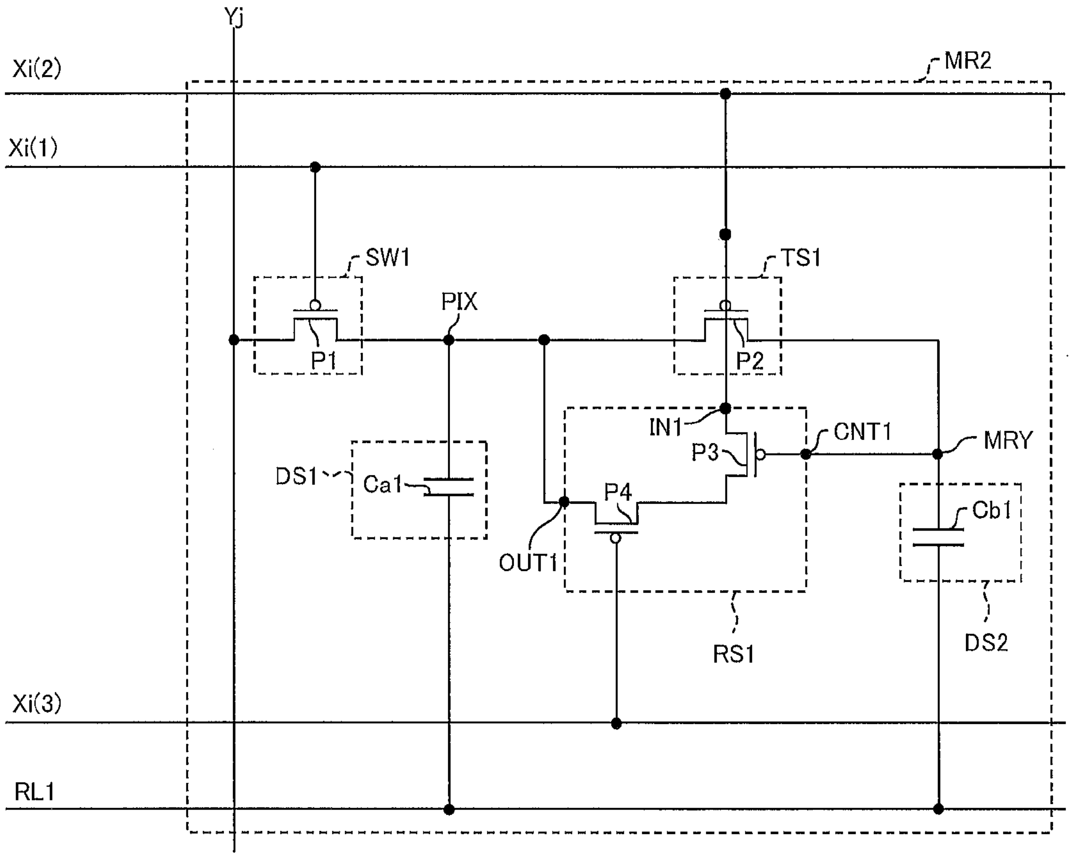
FIG. 16 is a circuit diagram illustrating an arrangement of a second memory circuit in accordance with an embodiment of the present invention.

FIG. 16 illustrates a memory circuit MR2 serving as an equivalent circuit, which corresponds to an arrangement of a memory cell 20 in accordance with the present modified example.

As described above, the memory circuit MR2 includes a switching circuit SW1, a first data retention section DS1, a data transfer section TS1, a second data retention section DS2, and a refresh output control section RS1.

The switching circuit SW1 is constituted by a transistor P1 (P-channel TFT), in place of the transistor N1 illustrated in FIG. 11. The data transfer section TS1 is constituted by a transistor (third switch) P2 (P-channel TFT), in place of the transistor N2 illustrated in FIG. 11. The refresh output control section RS1 is constituted by (i) a transistor (first switch) P3 (P-channel TFT), in place of the transistor N3 illustrated in FIG. 11, and (ii) a transistor (second switch) P4 (P-channel TFT), in place of the transistor N4 illustrated in FIG. 11. The first data retention section DS1 and the second data retention section DS2 have the same arrangements as the arrangements illustrated in FIG. 11.

That is, in FIG. 16, all the transistors constituting the memory circuit are P-channel TFTs (field-effect transistors).

In a case where the transistor P1 is in the ON state, the switching circuit SW1 is turned into the electrically-conductive state. In a case where the transistor P1 is in the OFF state, the switching circuit SW1 is turned into the shutoff state. In a case where the transistor P2 is in the ON state, the data transfer section TS1 is turned into the transfer operation state. In a case where the transistor P2 is in the OFF state, the data transfer section TS1 is turned into the non-transfer operation state.

In a case where the transistor P4 is in the ON state, the refresh output control section RS1 is controlled to be in the state for carrying out the first operation. In a case where the transistor P4 is in the OFF state, the refresh output control section RS1 is controlled to be in the state for carrying out the second operation. Since the transistor P3 is a P-channel TFT, (i) control information which controls the refresh output control section RS1 to be in the active state when the refresh output control section RS1 carries out the first operation, i.e., an active level, is the low level, and (ii) control information which controls the refresh output control section RS1 to be in the inactive state when the refresh output control section RS1 carries out the first operation, i.e., an inactive level, is the high level.

Further, in the same manner as in FIG. 11, a memory device 1 includes, as a line for driving each of the memory circuits MR2, a reference potential line RL1 in addition to the first word line Xi(1), the second word line Xi(2), the third word line Xi(3), and the bit line Yj. Note, however, that waveforms of these lines are different from the waveforms shown in FIG. 12 or 13. The following description explains such differences.

Figure 17:
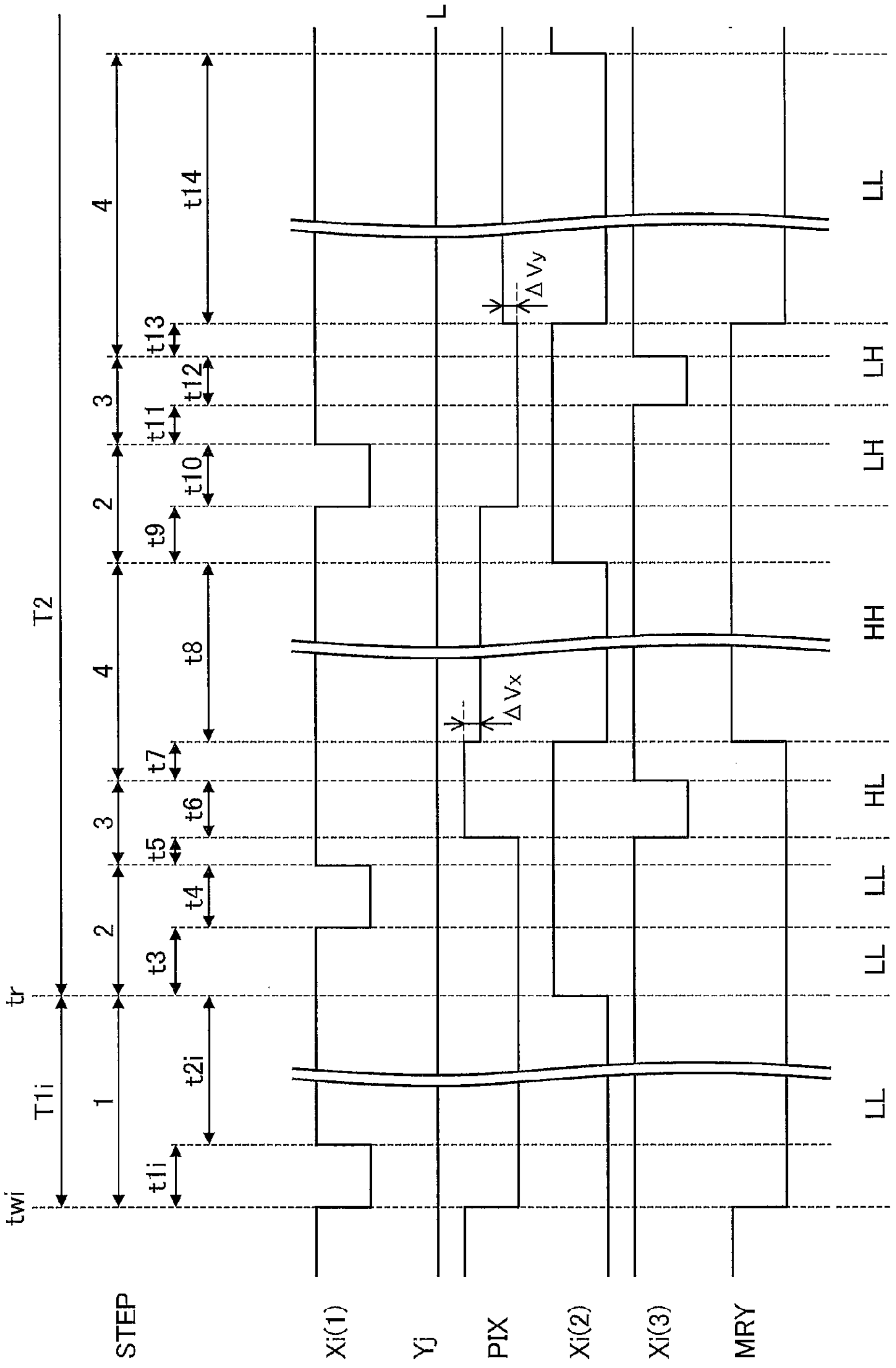
FIG. 17 is a view showing signals used in a writing operation of the second memory circuit illustrated in FIG. 16.

FIG. 17 shows how a reading operation of the memory circuit MR2 is carried out.

In FIG. 17, the waveforms of the first word line Xi(1), the second word line Xi(2), and the third word line Xi(3) are such that the waveforms of the first word line Xi(1), the second word line Xi(2), and the third word line Xi(3), shown in FIG. 12, are reversed between the high level and the low level. Further, as an example, the low potential is written in the memory circuit MR2 via the bit line Yj during a time period t1*i*. The potential of the bit line Yj is low during the time period T2.

With the arrangement, waveforms of potentials of nodes PIX and MRY are such that the waveforms of the potentials, shown in FIG. 12 are reversed upside down between the high level and the low level. A center of such a reversal is a center level between the high level and the low level.

Accordingly, the potential of the node PIX is low during the time periods t1*i* through t5, and the time periods t10 through t14, and is high during the time periods t6 through t9. The potential of the node MRY is low during the time periods t1*i* through t7, and the time period t14, and is high during the time periods t8 through t13.

Further, in a case where the high potential is written in the memory circuit MR2 via the bit line Yj during the time period t1*i* (not shown in FIG. 17), the waveforms of the potentials of the nodes PIX and MRY are such that the waveforms of the potentials, shown in FIG. 13, are reversed upside down between the high level and the low level. A center of such a reversal is a center level between the high level and the low level.

Accordingly, the potential of the node PIX is high during the time periods t1*i* through t3, and the time periods t12 through t14, and is low during the time periods t4 through t11. Further, the potential of the node MRY is high during the time periods t1*i* through t7, and the time period t14, and is low during the time periods t8 through t13.

Further, the reading operation of the memory circuit MR2 is carried out in such a manner that the waveforms of the first word line Xi(1), the second word line Xi(2), and the third word line Xi(3), shown in FIG. 14, are reversed between the high level and the low level (not shown in FIG. 17).

EXAMPLE 2

Figure 18:
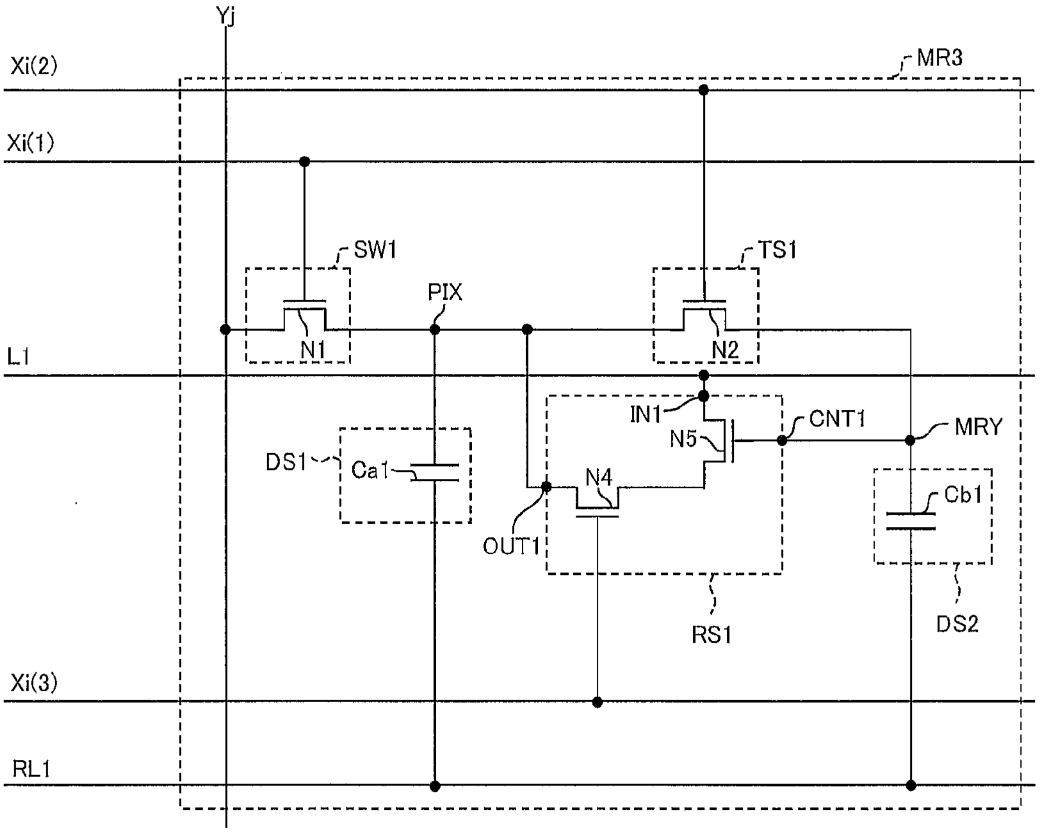
FIG. 18 is a circuit diagram illustrating an arrangement of a third memory circuit in accordance with an embodiment of the present invention.

FIG. 18 illustrates a memory circuit MR3 serving as an equivalent circuit, which corresponds to an arrangement of a memory cell 20 in accordance with the present example.

As described above, the memory circuit MR3 includes a switching circuit SW1, a first data retention section DS1, a data transfer section TS1, a second data retention section DS2, and a refresh output control section RS1.

The switching circuit SW1, the first data retention section DS1, the data transfer section TS1, and the second data retention section DS2 have the same arrangements as those of the memory circuit MR illustrated in FIG. 11. The refresh output control section RS1 is such that the transistor N3 of the memory circuit MR1 is replaced with a transistor (first switch) N5 which is an N-channel TFT (field-effect transistor).

Furthermore, a memory device 1 includes, as lines for driving each of the memory circuits MR3, a first word line Xi(1), a second word line Xi(2), a third word line Xi(3), a bit line Yj, a reference potential line RL1, and a control line L1.

A gate terminal of the transistor N5 is connected to a node MRY as a control terminal CNT1 of the refresh output control section RS1. A first drain/source terminal is connected to the control line L1 as an input terminal IN1 of the refresh output control section RS1. A second drain/source terminal of the transistor N5 is connected to a first drain/source terminal of a transistor N4.

Since the transistor N5 is an N-channel TFT, (i) control information which controls the refresh output control section RS1 to be in an active state when the refresh output control section RS1 carries out a first operation, i.e., an active level, is a high level, and (ii) control information which controls the refresh output control section RS1 to be in an inactive state when the refresh output control section RS1 carries out the first operation, i.e., an inactive level, is a low level.

According to the present example, the control line L1 serves as a supply source for supplying second logical data to the refresh output control section RS1. The control line L1 receives a low potential from, for example, a writing/reading circuit 15 or a word line control circuit 14.

Figure 19:
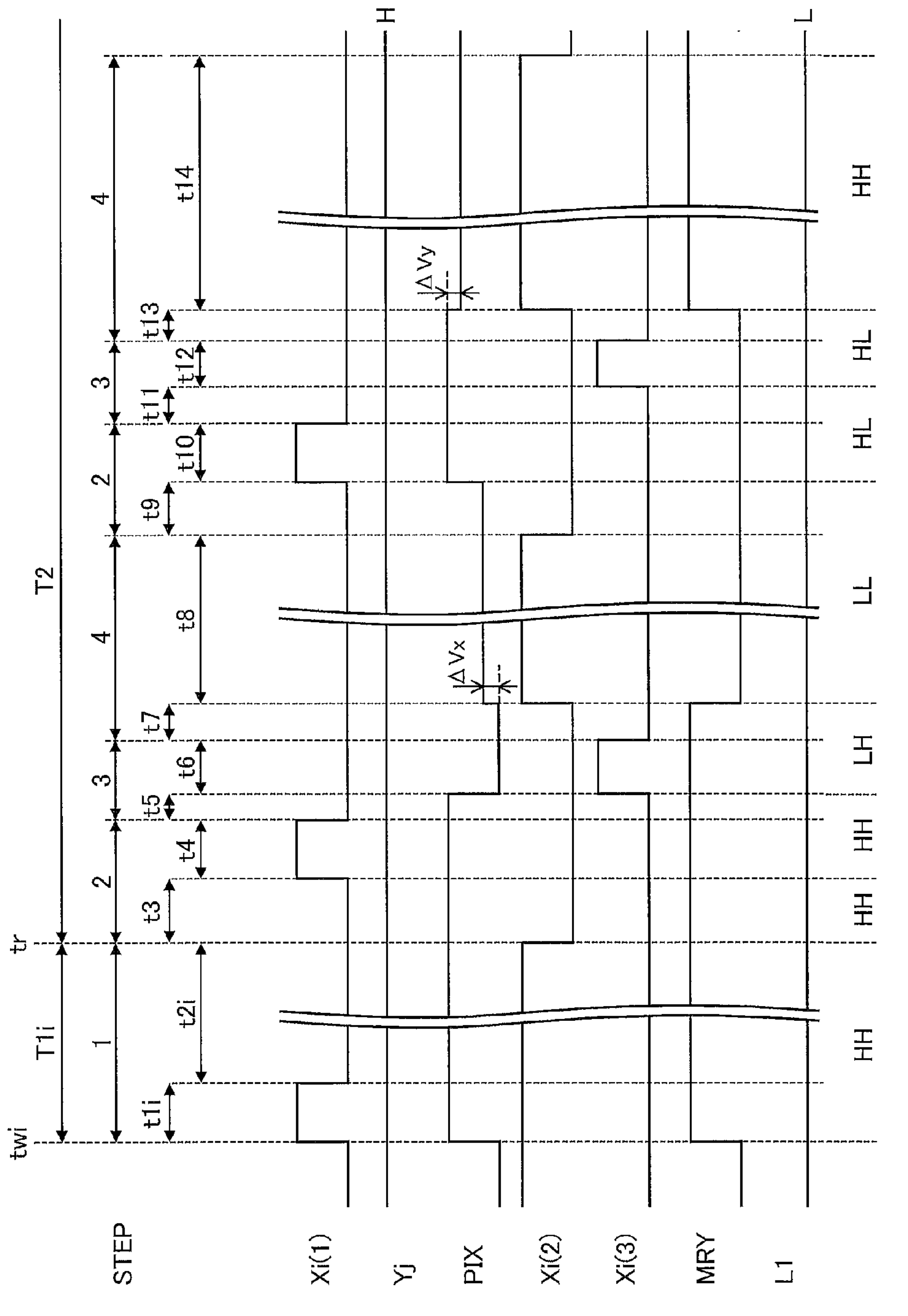
FIG. 19 is a view showing signals used in a writing operation of the third memory circuit illustrated in FIG. 18.

FIG. 19 shows how a writing operation of the memory circuit MR3 is carried out.

In FIG. 19, waveforms are identical with waveforms shown in FIG. 12, except that a potential of the control line L1 is low. For this reason, details of these waveforms are omitted here. In a case where the low potential is written in the memory circuit MR3 via the bit line Yj during a time period t1*i*, the waveforms are identical with waveforms shown in FIG. 13, except that the potential of the control line L1 is low.

Further, a reading operation of the memory circuit MR3 is identical with a reading operation shown in FIG. 14.

Next, the following description deals with a modified example of the present example.

Figure 20:
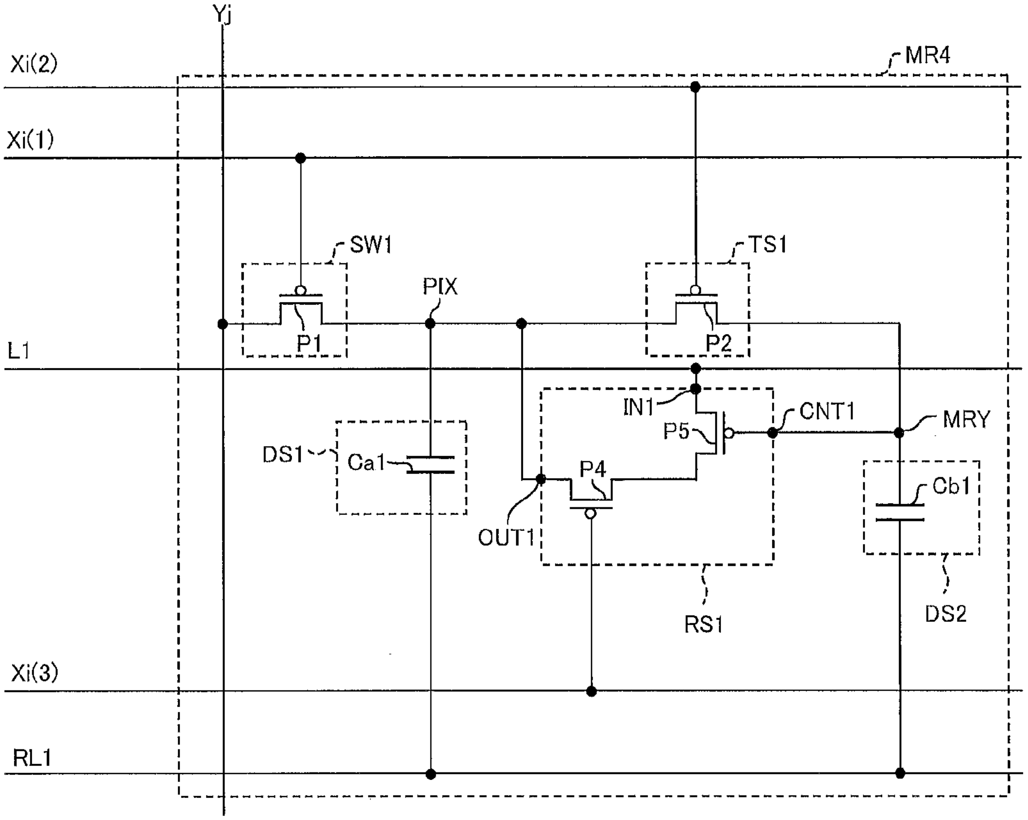
FIG. 20 is a circuit diagram illustrating an arrangement of a fourth memory circuit in accordance with an embodiment of the present invention.

FIG. 20 illustrates a memory circuit MR4 serving as an equivalent circuit, which corresponds to an arrangement of a memory cell 20 in accordance with the present modified example.

As described above, the memory circuit MR4 includes a switching circuit SW1, a first data retention section DS1, a data transfer section TS1, a second data retention section DS2, and a refresh output control section RS1.

The switching circuit SW1 is constituted by a transistor P1 (P-channel TFT), in place of a transistor N1 illustrated in FIG. 18. The data transfer section TS1 is constituted by a transistor P2 (P-channel TFT), in place of a transistor N2 illustrated in FIG. 18. The refresh output control section RS1 is constituted by (i) a transistor P4 (P-channel TFT), in place of the transistor N4 illustrated in FIG. 18, and (ii) a transistor (first switch) P5 (P-channel TFT), in place of the transistor N5 illustrated in FIG. 18. The first data retention section DS1 and the second data retention section DS2 have the same arrangements as the arrangements illustrated in FIG. 18.

That is, in FIG. 20, all the transistors constituting the memory circuit are P-channel TFTs (field-effect transistors).

Since the transistor P5 is a P-channel TFT, (i) control information which controls the refresh output control section RS1 to be in an active state when the refresh output control section RS1 carries out the first operation, i.e., an active level, is a low level, and (ii) control information which controls the refresh output control section RS1 to be in an inactive state when the refresh output control section RS1 carries out the first operation, i.e., an inactive level, is a high level.

Further, in the same manner as in FIG. 18, as lines for driving each of the memory circuits MR4, the first word line Xi(1), the second word line Xi(2), the third word line Xi(3), the bit line Yj, the reference potential line RL1, and the control line L1 are provided. However, drive waveforms of these lines are different from waveforms shown in FIG. 19. The following description deals with such differences.

Figure 21:
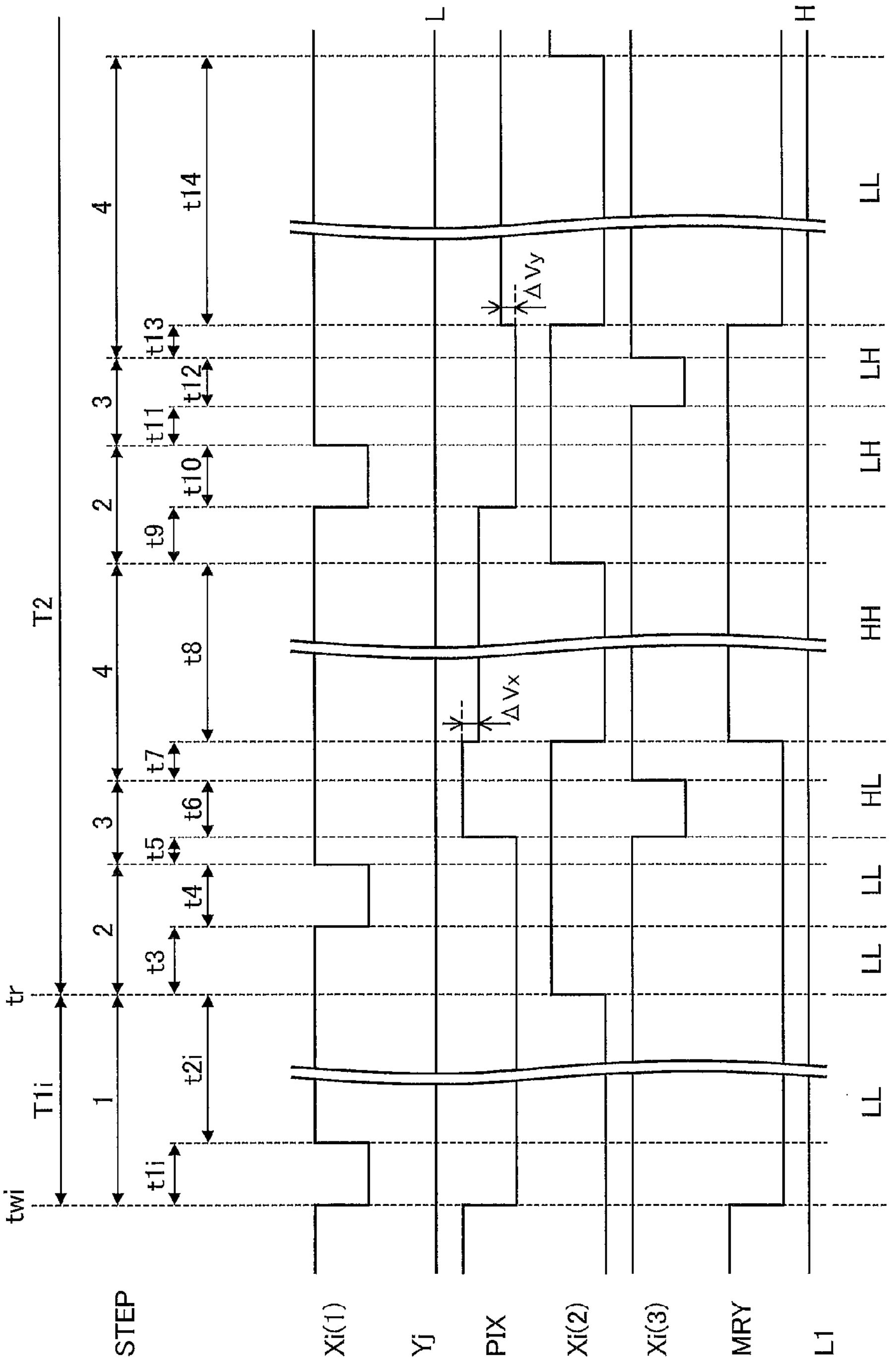
FIG. 21 is a view showing signals used in a writing operation of the fourth memory circuit illustrated in FIG. 20.

FIG. 21 shows how a reading operation of the memory circuit MR4 is carried out.

In FIG. 21, waveforms of potentials of the first word line Xi(1), the second word line Xi(2), and the third word line Xi(3) are such that the waveforms of the potentials, shown in FIG. 19, are reversed between the high level and the low level. Further, as an example, a low potential is written in the memory circuit MR4 via the bit line Yj during a time period t1*i*. The potential of the bit line Yj is low during a time period T2.

With the arrangement, waveforms of potentials of nodes PIX and MRY are such that the waveforms of the potentials, shown in FIG. 19 (i.e., FIG. 12), are reversed upside down between the high level and the low level. A center of such a reversal is a center level between the high level and the low level.

Further, in a case where a high potential is written in the memory circuit MR4 via the bit line Yj during the time period t1*i*, the waveforms of the potentials of the nodes PIX and MRY are such that the waveforms of the potentials, shown in FIG. 13, are reversed upside down between the high level and the low level. A center of such a reversal is a center level between the high level and the low level.

Furthermore, the reading operation of the memory circuit MR4 is carried out in such a manner that the waveforms of the potentials of the first word line Xi(1), the second word line Xi(2), and the third word line Xi(3), shown in FIG. 14, are reversed between the high level and the low level (not shown in FIG. 21).

EXAMPLE 3

Figure 22:
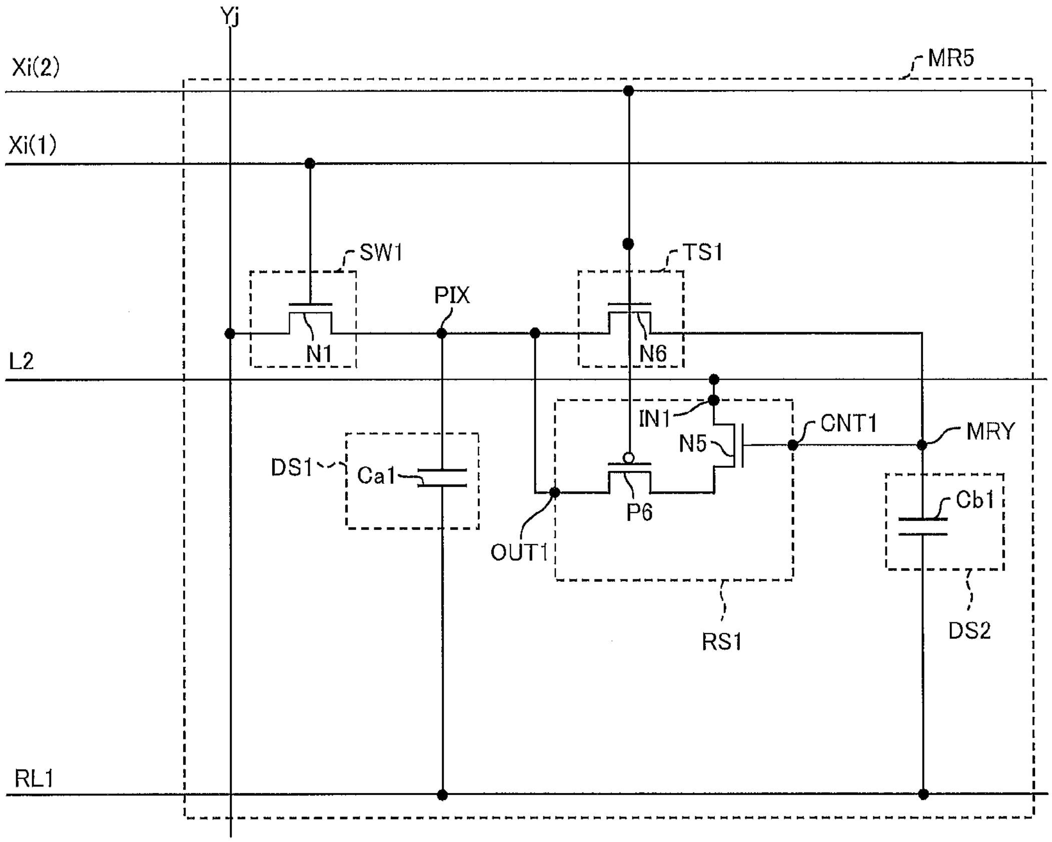
FIG. 22 is a circuit diagram illustrating an arrangement of a fifth memory circuit in accordance with an embodiment of the present invention.

FIG. 22 illustrates a memory circuit MR5 serving as an equivalent circuit, which corresponds to an arrangement of a memory cell 20 of the present example.

As described above, the memory circuit MR5 includes a switching circuit SW1, a first data retention section DS1, a data transfer section TS1, a second data retention section DS2, and a refresh output control section RS1.

The switching circuit SW1 is constituted by a transistor N1 which is an N-channel TFT. The first data retention section DS1 is constituted by a capacitor Ca1. The data transfer section TS1 is constituted by a transistor (third switch) N6 which is an N-channel TFT. The second data retention section DS2 is constituted by a capacitor Cb1. The refresh output control section RS1 is constituted by (i) a transistor (first switch) N5 which is an N-channel TFT, and (ii) a transistor (second switch) P6 which is a p-channel TFT. The capacitor Ca1 has a capacitance which is greater than that of the capacitor Cb1. All the TFTs of the present example are field-effect transistors.

Further, a memory device 1 includes, as lines for driving each of the memory circuits MR5, a first word line Xi(1), a second word line Xi(2), a bit line Yj, a reference potential line RL1, and a control line (supply source) L2. Furthermore, here, the second word line Xi(2) also serves as a third word line Xi(3). Alternatively, it is possible to provided independently the third word line Xi(3) having the same potential as that of the second word line Xi(2).

A gate terminal of the transistor N1 is connected to the first word line Xi(1). A first drain/source terminal of the transistor N1 is connected to the bit line Yj. A second drain/source terminal of the transistor N1 is connected to a node PIX which is connected to one of ends of the capacitor Ca1. The other one of ends of the capacitor Ca1 is connected to the reference potential line RL1.

A gate terminal of the transistor N6 is connected to the second word line Xi(2). A first drain/source terminal of the transistor N6 is connected to the node PIX. A second drain/source terminal of the transistor N6 is connected to a node MRY, which is connected to one of ends of the capacitor Cb1. The other one of ends of the capacitor Cb1 is connected to the reference potential line RL1.

A gate terminal of the transistor N5 is connected to the node MRY as a control terminal CNT1 of the refresh output control section RS1. A first drain/source terminal of the transistor N5 is connected to the control line (supply source) L2 as an input control terminal IN1 of the refresh output control section RS1. A second drain/source terminal of the transistor N5 is connected to a first drain/source terminal of the transistor P6. A gate terminal of the transistor P6 is connected to the second word line Xi(2). A second drain/source terminal of the transistor P6 is connected to the node PIX as an output terminal of the refresh output control section RS1. That is, the transistors N5 and P6 are connected in series to each other between an input and an output of the refresh output control section RS1 so that the transistor N5 is provided on an input side of the refresh output control section RS1 with respect to the transistor P6.

In a case where the transistor N1 is in an ON state, the switching circuit SW1 is turned into an electrically-conductive state. In a case where the transistor N1 is in an OFF state, the switching circuit SW1 is turned into a shutoff state. In a case where the transistor N6 is in the ON state, the data transfer section TS1 is turned into a transfer operation state. In a case where the transistor N6 is in the OFF state, the data transfer section TS1 is turned into a non-transfer operation state.

In a case where the transistor N6 is in the ON state, the refresh output control section RS1 is controlled to be in a state for carrying out a first operation. In a case where the transistor P6 is in the OFF state, the refresh output control section RS1 is controlled to be in a state for carrying out a second operation. Since the transistor N5 is an N-channel TFT, (i) control information which controls the refresh output control section RS1 to be in an active state when the refresh output control section RS1 carries out the first operation, i.e., an active level, is a high level, and (ii) control information which controls the refresh output control section RS1 to be in an inactive state when the refresh output control section RS1 carries out the first operation, i.e., an inactive level, is a low level.

Next, the following description deals with an operation of the memory circuit MR5 having the arrangement described above.

First, how a writing operation of the memory circuit MR5 is carried out is described below.

The writing operation is carried out in such a manner that (i) a write instruction and a write address are inputted, from an outside of the memory device 1, to an input/output interface 11 via a transmission line and (ii) an instruction decoder 12 decodes the write instruction thus received so as to cause the memory cell 20 to be in a writing mode. In accordance with a signal indicating the writing mode, received from the instruction decoder 12, a timing generation circuit 13 generates an internal timing signal of the writing operation. A word line control circuit 14 selects one of the first word line Xi(1) and the second word line Xi(2) in accordance with the write address inputted via the input/output interface 11, and controls the one thus selected. Further, the writing/reading circuit 15 controls all the bit lines Yj. Hereinafter, the first word line Xi(1) and the second word line Xi(2), one of which is selected in accordance with the write address, are referred to as "first word line Xiw(1)" and "second word line Xiw(2)", respectively.

Figure 23:
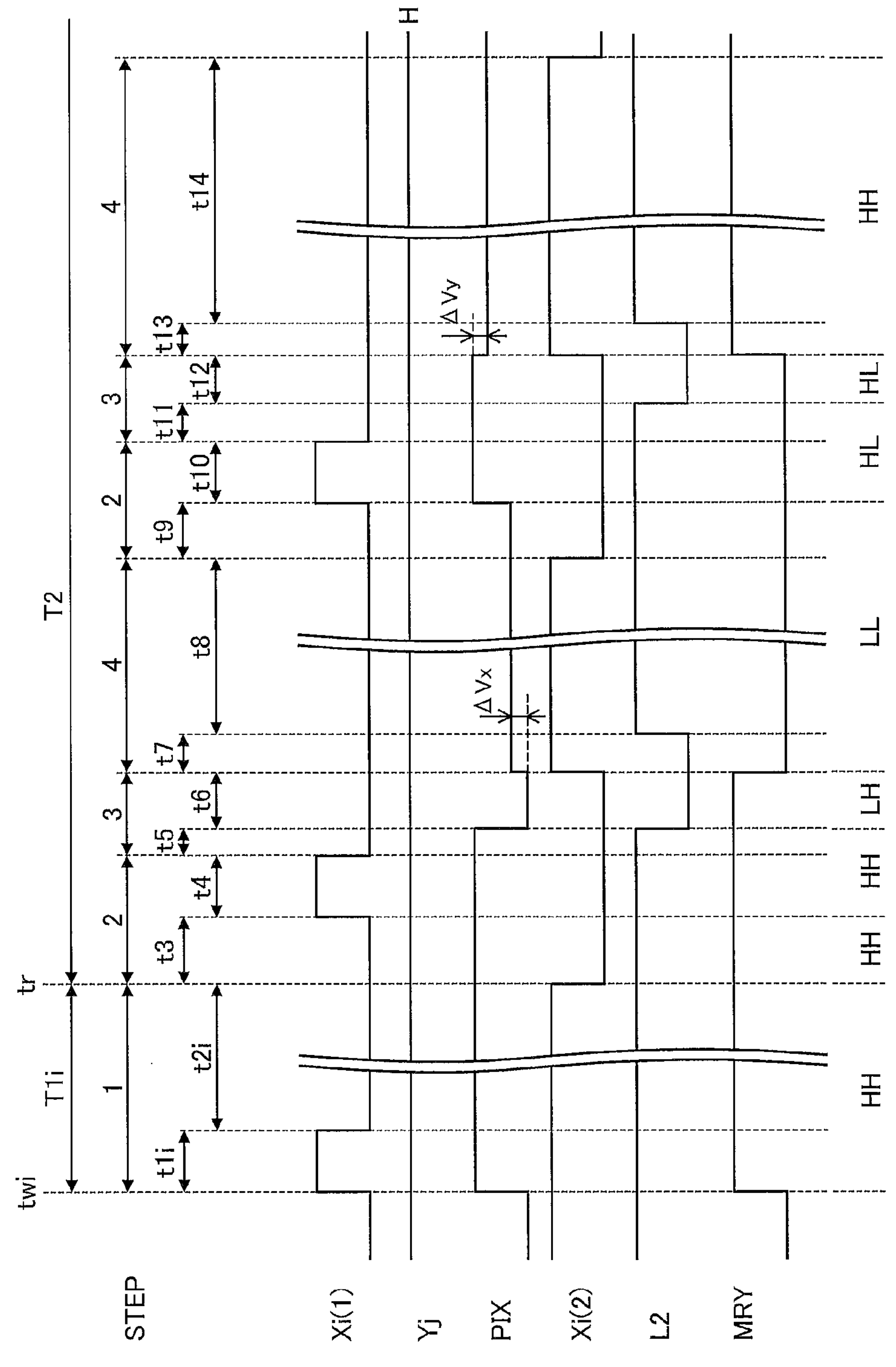
FIG. 23 is a view showing signals used in a writing operation of the fifth memory circuit illustrated in FIG. 22.
Figure 24:
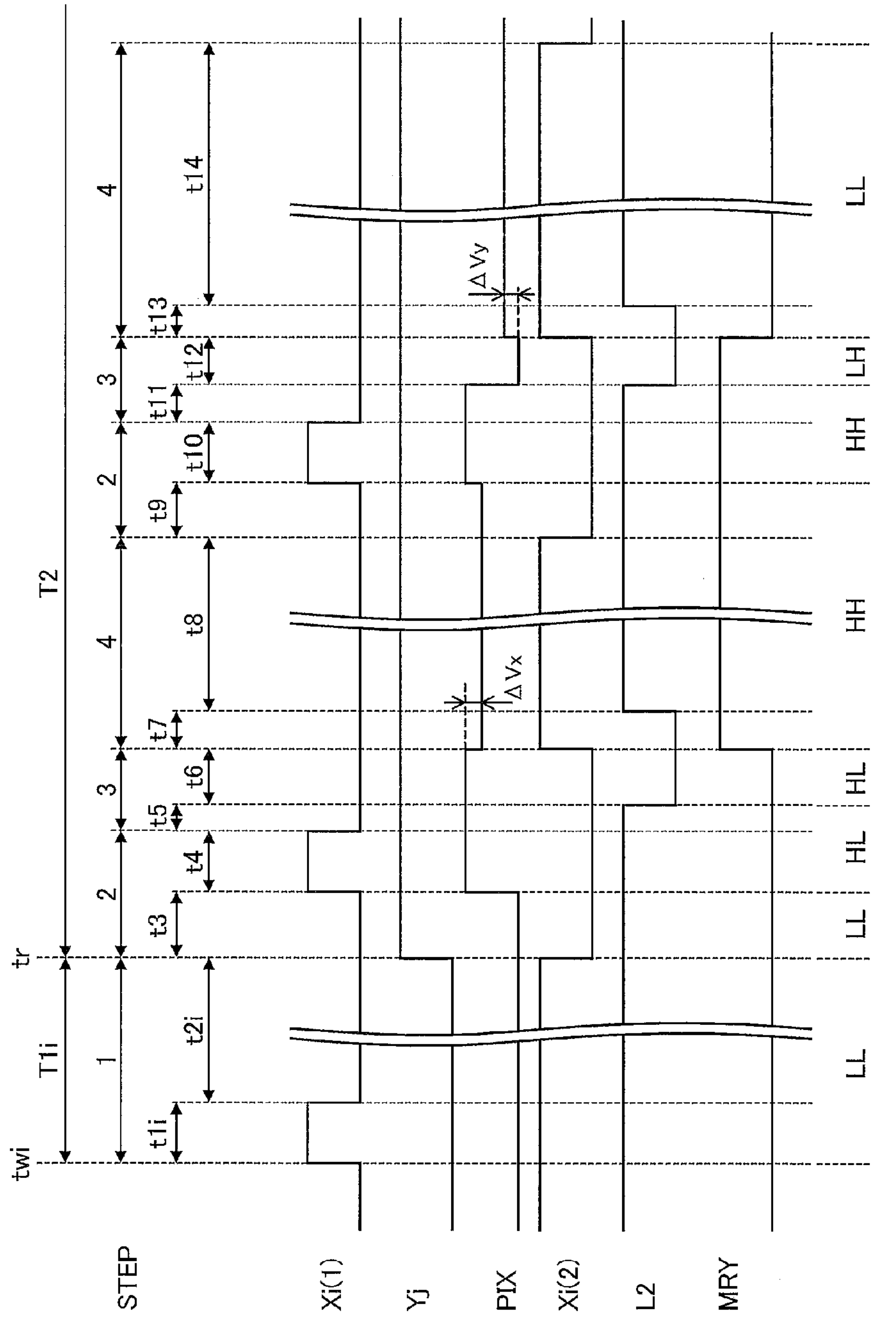
FIG. 24 is a view showing signals used in another writing operation of the fifth memory circuit illustrated in FIG. 22.

Each of FIGS. 23 and 24 shows a writing operation of data of the memory circuit MR5. According to the present example, in a case where any data is written in memory circuits MR5 provided at different rows, rows, each of which corresponds to the write address, are driven sequentially, row by row. For this reason, it is impossible that switching circuits SW1, provided at different rows, are turned on simultaneously so as to cause data writing time periods of such rows to overlap each other. Accordingly, writing time periods T1 of the rows are different from each other. A writing time period T1 at an ith row is referred to as "T1*i*". FIG. 23 shows a case where the high potential is written as a first potential level during the writing time period T1*i*. FIG. 24 shows a case where the low potential is written as a second potential level during the writing time period T1*i*. Further, at a bottom of each of FIGS. 23 and 24, a potential of the node PIX (on the left side) and a potential of the node MRY (on the right side) are shown for each of time periods corresponding to (a) through (h) of FIG. 34.

In FIG. 23, the word line control circuit 14 applies a binary level potential to the first word line Xiw(1) and the second word line Xiw(2), which binary level potential is represented by a high (active) level or a low (inactive) level. A high potential and a low potential of the binary level can be set for each of the aforementioned lines, independently. The writing/reading circuit 15 supplies, to the bit line Yj, a binary logical level represented by a high level or a low level, which are lower than a high potential of the first word line Xiw(1). A high potential of the second word line Xiw(2) is identical with a high potential of the bit line Yj or a high potential of the first word line Xi(1). A low potential of the second word line Xiw(2) is lower than the low potential of the binary logical level. Further, a potential supplied by the reference potential line RL1 is constant.

For the writing operation of data, a writing time period T1*i* and a refreshing time period T2 are provided. The writing time period T1*i* is started at a time twi. For the rows, different times twi are set respectively. After the writing of data in the memory circuit MR5 provided in the row corresponding to the write address is finished, the refreshing time period T2 is started at a time tr. For all the rows including rows each of which does not correspond to the write address, the same time tr is set. During the writing time period T1*i*, data to be retained by the memory circuit MR5 is written. The writing time period T1*i* includes a time period t1*i* and a time period t2*i* which sequentially follows the time period t1*i*. During the refreshing time period T2, a binary logical level corresponding to the data written in the memory circuit MR5 is retained while being refreshed. The refreshing time period T2 is constituted by continuous time periods t3 through t14, which are sequentially provided.

During the time period t1*i* of the writing time period T1*i*, potentials of the first word line Xiw(1) and the second word line Xiw(2) become high. This turns on the transistors N1 and N6, so that (i) the switching circuit SW1 is turned into the electrically-conductive state and (ii) the data transfer section TS1 is turned into the transfer operation state. As a result, a first potential level (here, the high level), supplied to the bit line Yj, is written in the node PIX. During the time period t2*i*, the potential of the first word line Xiw(1) becomes low, while the potential of the second word line Xiw(2) keeps being high. This (i) causes the transistor N1 to be in the OFF state, that is, the switching circuit SW1 is turned into the shutoff state, and (ii) causes the transistor N6 to keep being in the ON state, that is, the data transfer section TS1 keeps being in the transfer operation state. As a result, the first potential level is transferred from the node PIX to the node MRY, and the nodes PIX and MRY are electrically disconnected from the bit line Yj. Further, during the time period T1*i*, the potential of the control line L2 is the high level which is identical with the first potential level. The process described above corresponds to a state illustrated in (a) of FIG. 34.

Next, the refreshing time period T2 is started. During the refreshing time period T2, the potential of the bit line Yj is the high level which is identical with the first potential level. Furthermore, all the first word lines Xi(1) ($1 \leq i \leq n$) and all the second word lines Xi(2) ($1 \leq i \leq n$) are driven in the following manner. That is, all the memory cells 20 are subjected to an all refresh operation.

During the time period t3 of the refreshing time period T2, the potential of the first word line Xi(1) becomes low, the potential of the second word line Xi(2) becomes low, and the potential of the control line L2 keeps being high. This causes the transistor N6 to be in the OFF state, that is, the data transfer section TS1 is turned into the non-transfer operation state. As a result, the nodes PIX and MRY are electrically disconnected from each other. Further, the transistor P6 is turned on. However, both the potentials of the node PIX and the control line L2 are high, and the transistor N5 is in the OFF state irrespective of the potential of the node MRY. Accordingly, the refresh output control section RS1 carries out the second operation. Both the nodes PIX and MRY retain the high potential. The process described above corresponds to a state illustrated in (b) of FIG. 34.

During the time period t4, the potential of the first word line Xi(1) becomes high, the potential of the second word line Xi(2) keeps being low, and the potential of the control line L2 keeps being high. This turns on the transistor N1, that is, the switching circuit SW1 is turned into the electrically-conductive state. As a result, the high potential is written in the node PIX from the bit line Yj again.

During the time period t5, the potential of the first word line Xi(1) becomes low, the potential of the second word line Xi(2) keeps being low, and the potential of the control line L2 keeps being high. This causes the transistor N1 to be in the OFF state, that is, the switching circuit SW1 is turned into the shutoff state. As a result, the node PIX is electrically disconnected from the bit line Yj, and retains the high potential.

Each of the processes of the time periods t4 and t5 corresponds to a state illustrated in (c) of FIG. 34.

During the time period t6, the potential of the first word line Xi(1) keeps being low, the potential of the second word line Xi(2) keeps being low, and the potential of the control line L2 becomes low. This causes the transistor N6 to be in the ON state, that is, the refresh output control section RS1 is turned into the state for carrying out the first operation. Further, since the potential of the node MRY is high, the transistor N5 is in the ON state. As a result, the refresh output control section RS1 is turned into the active state. Accordingly, the low potential is supplied from the control line L2 to the node PIX via the transistors N5 and P6. The control line L2 corresponds to a supply source VS1 illustrated in FIG. 33.

The process of the time period t6 corresponds to a state illustrated in (d) of FIG. 34.

During the time period t7, the potential of the first word line Xi(1) keeps being low, the potential of the second word line Xi(2) becomes high, and the potential of the control line L2 keeps being low. This (i) causes the transistor N6 to be in the ON state, that is, the data transfer section TS1 is turned into the transfer operation state, and (ii) causes the transistor P6 to be in the OFF state, that is, the refresh output control section RS1 is turned into the state for carrying out the second operation. As a result, the second potential level (here, the low level) is transferred from the node PIX to the node MRY. Here, an electric charge is transferred between the capacitors Ca1 and Cb1, so that both the potentials of the nodes PIX and MRY become low. A positive electric charge is transferred from the capacitor Cb1 to the capacitor Ca1 via the transistor N2 so that the potential of the node PIX is increased by a small voltage of $\Delta Vx$. However, the potential of the node PIX is still in a range of the low potential.

During the time period t8, the potential of the first word line Xi(1) keeps being low, the potential of the second word line Xi(2) keeps being high, and the potential of the control line L2 becomes high. This causes the transistors N6 and P6 to keep being in the OFF state. As a result, both the nodes PIX and MRY retain the low potential. Accordingly, a change in the potential of the control line L2 has no influence on the node PIX.

During the time period t9, the potential of the first word line Xi(1) keeps being low, the potential of the second word line Xi(2) becomes low, and the potential of the control line L2 keeps being high. This (i) causes the transistor N6 to be in the OFF state, that is, the data transfer section TS1 is turned into the non-transfer operation state, and (ii) causes the transistor P6 to be in the ON state, that is, the refresh output control section RS1 is turned into the state for carrying out the first operation. As a result, the nodes PIX and MRY are electrically disconnected from each other. Here, since the potential of the node MRY is low, the transistor N5 is in the OFF state. Accordingly, the refresh output control section RS1 is turned into the inactive state. Both the nodes PIX and MRY therefore retain the low potential.

Each of the processes of the time periods t7 through t9 corresponds to a state illustrated in (e) of FIG. 34.

During the time period t10, the potential of the first word line Xi(1) becomes high, the potential of the second word line Xi(2) keeps being low, and the potential of the control line L2 keeps being high. This causes the transistor N1 to be in the ON state, that is, the switching circuit SW1 is turned into the electrically-conductive state. As a result, the high potential is written in the node PIX from the bit line Yj again.

During the time period t11, the potential of the first word line Xi(1) becomes low, the potential of the second word line Xi(2) keeps being low, and the potential of the control line L2 keeps being high. This causes the transistor N1 to be in the OFF state, that is, the switching circuit SW1 is turned into the shutoff state. As a result, the node PIX is electrically disconnected from the bit line Yj, and retains the high potential.

Each of the processes of the time periods t10 and t11 corresponds to a state illustrated in (f) of FIG. 34.

During the time period t12, the potential of the first word line Xi(1) keeps being low, the potential of the second word line Xi(2) keeps being low, and the potential of the control line L2 keeps being low. Here, the transistor P6 is in the ON state. However, since the potential of the node MRY is low, the transistor N5 is in the OFF state. Accordingly, the refresh output control section RS1 is in the inactive state, that is, the output of the refresh output control section RS1 is still stopped. The node PIX therefore keeps retaining the high potential.

The process of the time period t12 corresponds to a state illustrated in (g) of FIG. 34.

During the time period t13, the potential of the first word line Xi(1) keeps being low, the potential of the second word line Xi(2) becomes high, and the potential of the control line keeps being low. This (i) causes the transistor N6 to be in the ON state, that is, the data transfer section TS1 is turned into the transfer operation state, and (ii) causes the transistor P6 to be in the OFF state, that is, the refresh output control section RS1 is turned into the state for carrying out the second operation. Accordingly, the first potential level (here, the high level) is transferred from the node PIX to the node MRY. Here, an electric charge is transferred between the capacitors Ca1 and Cb1, so that both the potentials of the nodes PIX and MRY become high. Here, a positive electric charge is transferred from the capacitor Ca1 to the capacitor Cb1 via the transistor N2 so that the potential of the node PIX is reduced by a small voltage of ΔVy. However, the potential of the node PIX is still in a range of the high potential.

During the time period t14, the potential of the first word line Xi(1) keeps being low, the potential of the second word line Xi(2) keeps being high, and the potential of the control line L2 becomes high. This causes both the nodes PIX and the MRY to retain the high potential.

Each of the processes of the time periods t13 and t14 corresponds to a state illustrated in (h) of FIG. 34.

With the operations described above, the potential of the node PIX is high during the time periods t1*i* through t5, and the time periods t10 through t14, and is low during the time periods t6 through t9. The potential of the node MRY is high during the time periods t1*i* through t6, and the time periods t13 and t14, and is low during the time periods t7 through t12.

After that, in a case where the refreshing time period T2 is continued, the instruction decoder 12 repeats the operations of the time periods t3 through t14. In a case where new data is written, or data is read out, the instruction decoder 12 finishes the refreshing time period T2, and canceling an all refresh operation mode.

The operation shown in FIG. 23 is thus carried out.

Note that an instruction of the all refresh operation can be generated by use of a clock internally generated with the use of an oscillator or the like, instead of externally supplying a signal. With the arrangement, it becomes unnecessary for an external system to supply a refresh instruction at regular time intervals. This allows a system structure to be more flexible. In a dynamic memory circuit employing the memory cell 20 of the present example, the all refresh operation can be carried out with respect to an entire array at once, without carrying out scanning for each of the word lines. Accordingly, it is possible to reduce the number of peripheral circuits which are necessary for a general conventional dynamic memory circuit to carry out the refresh operation while carrying out destructive reading with respect to the potential of the bit line Yj.

Next, the following description deals with an operation shown in FIG. 24.

In FIG. 24, the low level is written as the second potential level during the writing time period T1*i*. Note that changes in potentials of the first word line Xi(1), the second word line Xi(2), and the third word line Xi(3) in each of the time periods are the same as in FIG. 23, except that the potential of the bit line Yj is low during the writing time period T1*i*.

With the arrangement, the potential of the node PIX is low during the time periods t1*i* through t3, and the time periods t12 through t14, and is high during the time periods t4 through t11. The potential of the node MRY is low during the time periods t1*i* through t6, and the time periods t13 and t14, and is high during the time periods t7 through t12.

Note that (a) through (h) of FIG. 34 illustrate transitions of the state of the memory cell 20. As operation steps of the memory circuit MR5 in FIGS. 23 and 24 can be classified as described below.

(1) First Step (Time Periods t1*i* and t2*i* (Writing Time Period T1*i*))

In the first step, on a condition that (i) the writing/reading circuit 15 has supplied, to the bit line Yj, the binary logical level corresponding to data and (ii) the refresh output control section RS1 has carried out the second operation, the switching circuit SW1 is turned into the electrically-conductive state. As a result, the binary logical level is written in the memory cell 20. Then, on a condition that (i) the binary logical level has been written in the memory cell 20 and (ii) the refresh output control section RS1 has carried out the second operation, the data transfer section TS1 carries out the transfer operation.

(2) Second Step (Time Periods t3 and t4, and Time Periods t9 and t10).

In the second step following the first step, on a condition that (i) the refresh output control section RS1 has carried out the second operation and (ii) the data transfer section TS1 has carried out the non-transfer operation, the switching circuit SW1 is turned into the electrically-conductive state. As a result, a binary logical level is supplied to the first data retention section DS1 via the bit line Yj, which binary logical level is identical with the level of the control information which controls the refresh output control section RS1 to be in the active state.

(3) Third Step (Time Periods t5 and t6, and Time Periods t11 and t12)

In the third step following the second step, on a condition that (i) the switching circuit SW1 has been turned into the shutoff state and (ii) the data transfer section TS1 has carried out the non-transfer operation, the refresh output control section RS1 carries out the first operation. When the first operation is finished, a binary logical level is supplied from the supply source VS1 to the input of the refresh output control section RS1, which binary logical level is identical with a reversal level of the control information which controls the refresh output control section RS1 to be in the active state.

(4) Fourth Step (Time Periods t7 and t8, and Time Periods t13 and t14)

In the fourth step following the third step, on a condition that (i) the switching circuit SW1 has been turned into the shutoff state and (ii) the refresh output control section RS1 has carried out the second operation, the data transfer section TS1 carries out the transfer operation.

As an entire writing operation, first, the operation of the first step is carried out, and then, a series of the operations of the second step through the fourth step (from the beginning of the second step to the end of the fourth step) (time periods t3 through t8) are carried out at least once.

Next, the following description deals with a first modified example of the present example.

Figure 25:
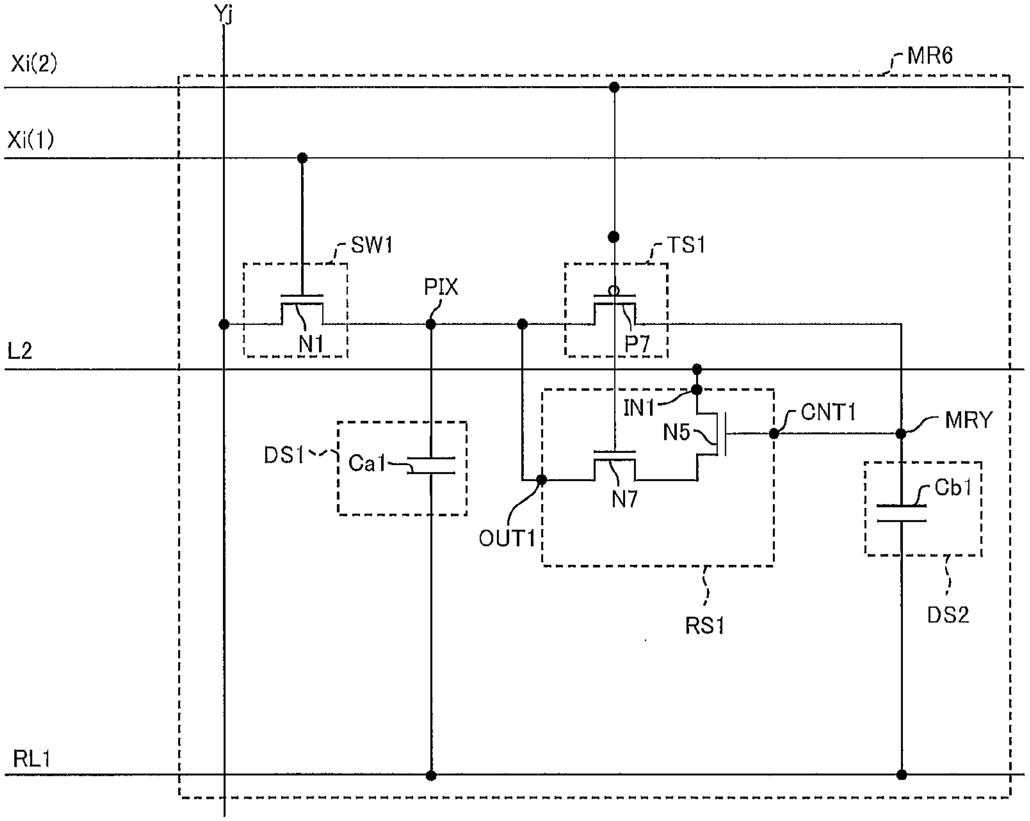
FIG. 25 is a circuit diagram illustrating an arrangement of a sixth memory circuit in accordance with an embodiment of the present invention.

FIG. 25 illustrates a memory circuit MR6 serving as an equivalent circuit, which corresponds to an arrangement of a memory cell 20 in accordance with the present modified example.

The memory circuit MR6 is such that, in the memory circuit MR5 illustrated in FIG. 22, (i) the transistor N6 is replaced with a transistor (third switch) P7 which is a P-channel TFT, and (ii) the transistor P6 is replaced with a transistor (second switch) N7 which is an N-channel TFT.

In a case where the transistor P7 is in the ON state, the data transfer section TS1 is in the transfer operation state. In a case where the transistor P7 is in the OFF state, the data transfer section TS1 is controlled to be in the non-transfer operation state.

In a case where the transistor N7 is in the ON state, the refresh output control section RS1 is in the state for carrying out the first operation. In a case where the transistor N7 is in the OFF state, the refresh output control section RS1 is controlled to be in the state for carrying out the second operation.

Figure 26:
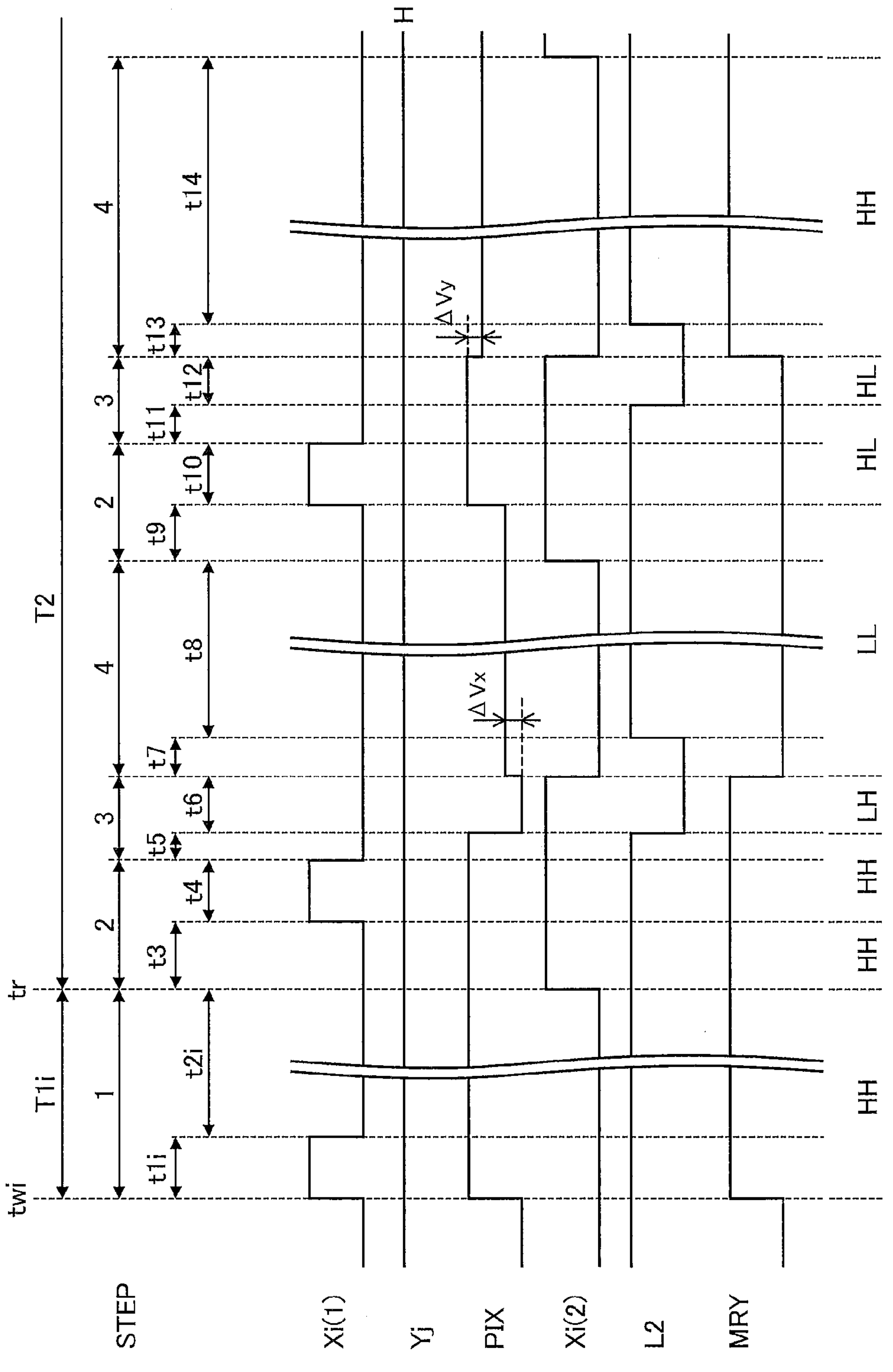
FIG. 26 is a view showing signals used in a writing operation of the sixth memory circuit illustrated in FIG. 25.

FIG. 26 shows an operation of the memory circuit MR6.

Waveforms of potentials of lines for driving each of the memory circuits, shown in FIG. 26, are identical with the waveforms shown in FIG. 23, except that a waveform of the potential of the second word line Xi(2), shown in FIG. 23, is reversed between the high level and the low level.

With the arrangement, the potential of the node PIX is high during the time periods t1*i* through t5, and the time periods t10 through t14, and is low during the time periods t6 through t9. The potential of the node MRY is high during the time periods t1*i* through t6, and time periods t13 and t14, and is low during the time periods t7 through t12.

Next, the following description deals with a second modified example of the present example.

Figure 27:
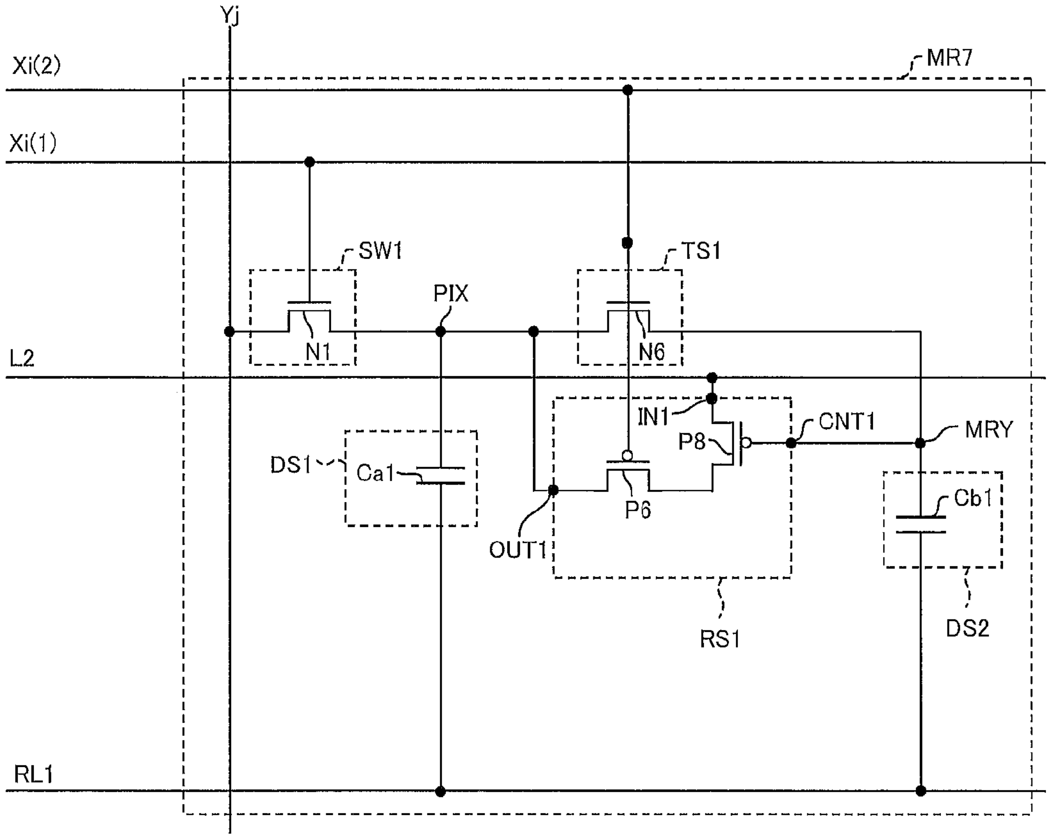
FIG. 27 is a circuit diagram illustrating an arrangement of a seventh memory circuit in accordance with an embodiment of the present invention.

FIG. 27 illustrates a memory circuit MR7 serving as an equivalent circuit, which corresponds to an arrangement of a memory cell 20 in accordance with the present modified example.

The memory circuit MR7 is such that, in the memory circuit MR5 illustrated in FIG. 22, the transistor N5 is replaced with a transistor (first switch) P8 which is a P-channel TFT.

Since the transistor P8 is a P-channel TFT, (i) control information which controls the refresh output control section RS1 to be in the active state when the refresh output control section RS1 carries out the first operation, i.e., an active level, is a low level, and (ii) control information which controls the refresh output control section RS1 to be in the inactive state when the refresh output control section RS1 carries out the first operation, i.e., an inactive level, is a high level. The low potential of the second word line Xiw(2) is identical with the low potential of the binary logical level. In the case of the arrangement illustrated in FIG. 27, all the potentials of the control lines can be provided by use of the potentials of the binary logical level.

Figure 28:
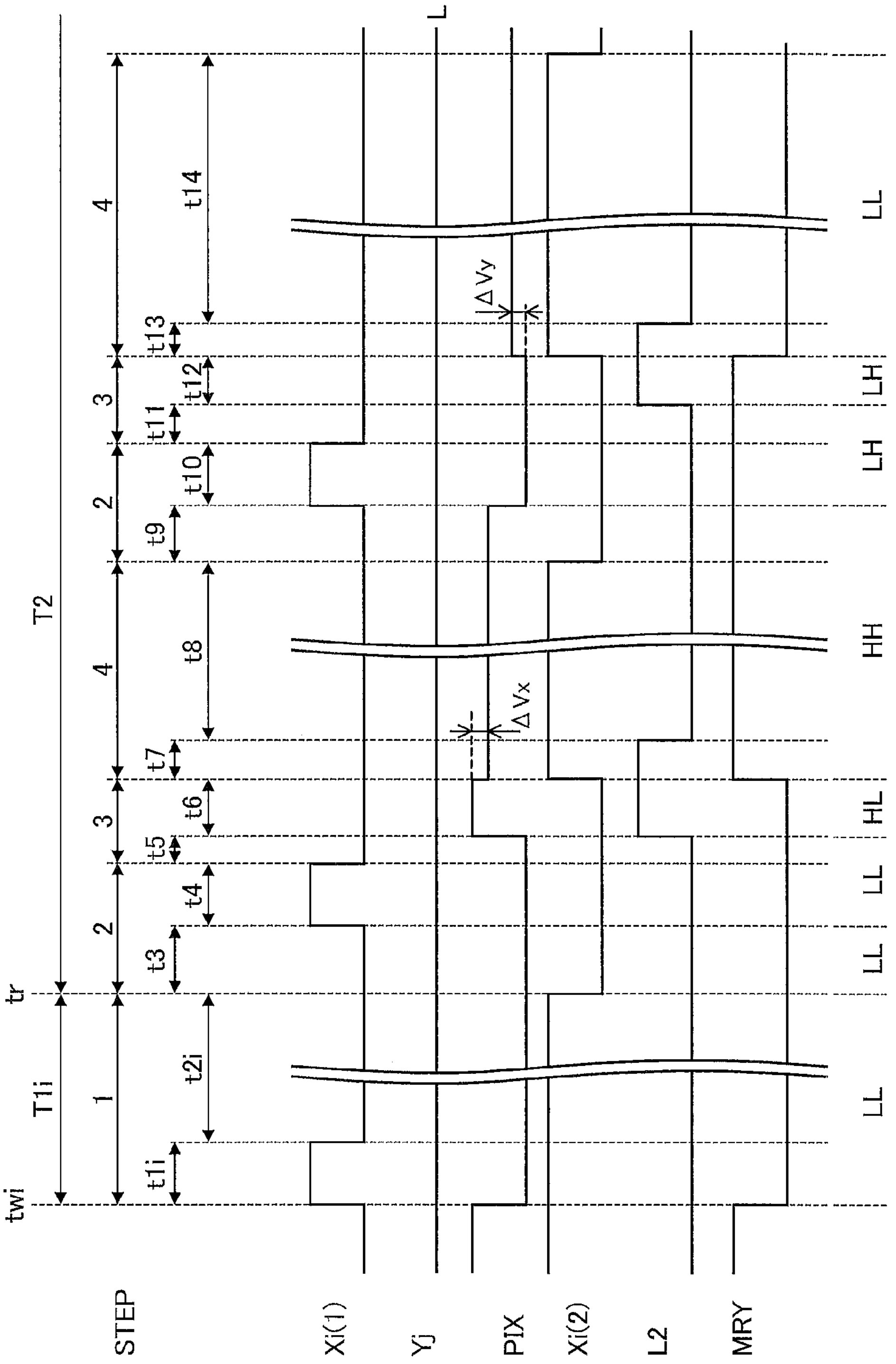
FIG. 28 is a view showing signals used in a writing operation of the seventh memory circuit illustrated in FIG. 27.

FIG. 28 shows an operation of the memory circuit MR7.

Waveforms of potentials of lines for driving each of memory circuits MR7, shown in FIG. 28, are identical with the waveforms of the potentials, shown in FIG. 23, except that the waveform of the potential of the control line L2, shown in FIG. 23, is reversed between the high level and the low level. The waveforms of the potentials of the nodes PIX and MRY are such that the waveforms of the potentials, shown in FIG. 23, are reversed upside down between the high level and the low level. A center of such a reversal is a center level between the high level and the low level.

With the arrangement, the potential of the node PIX is low during the time periods t1*i* through t5, and the time periods t10 through t14, and is high during the time periods t6 through t9. The potential of the node MRY is low during the time periods t1*i* through t6, and the time periods t13 and t14, and is high during the time periods t7 through t12.

EXAMPLE 4

Figure 29:
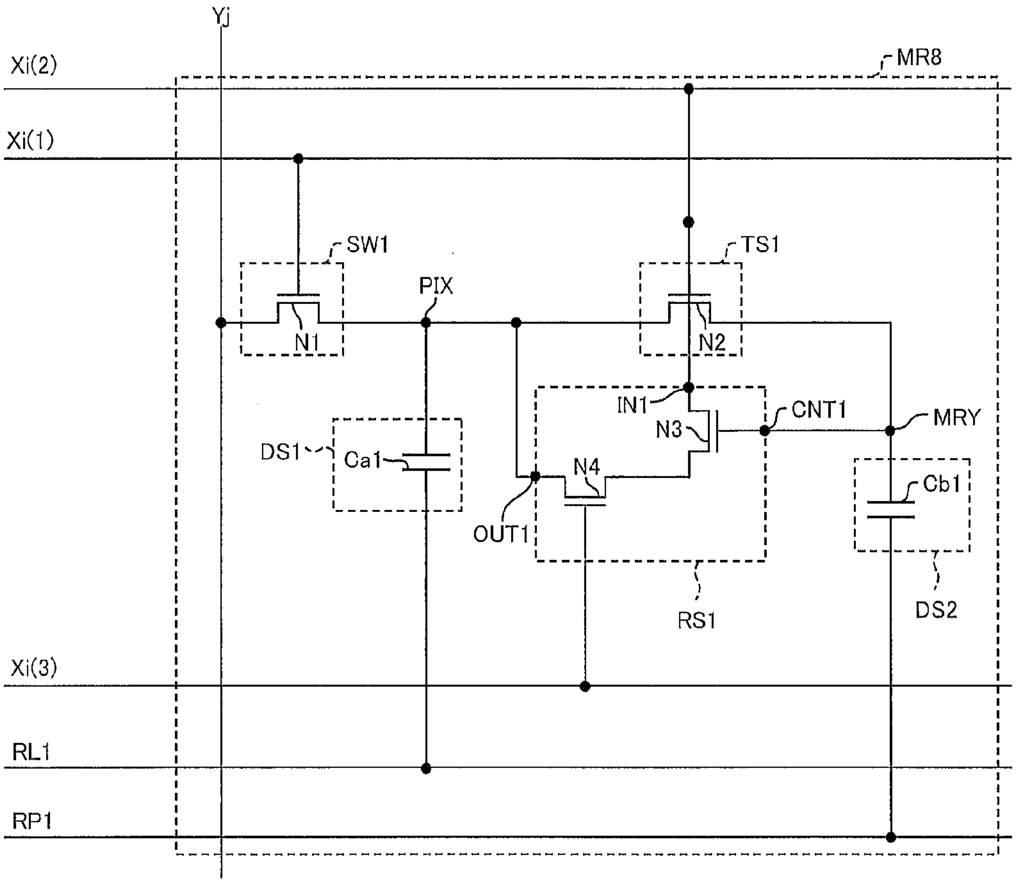
FIG. 29 is a circuit diagram illustrating an arrangement of an eighth memory circuit in accordance with an embodiment of the present invention.

FIG. 29 illustrates a memory circuit MR8 serving as an equivalent circuit, which corresponds to an arrangement of a memory cell 20 of the present example.

The memory circuit MR8 is such that, in a memory circuit MR1 illustrated in FIG. 11, (i) a refresh pulse line (fifth line) RP1 is additionally provided, and (ii) the other one of ends of a capacitor Cb1 is connected to the refresh pulse RP1, instead of being connected to a reference potential line RL1. The refresh pulse line RP1 is provided for each of rows, and is driven by a row driver such as a word line control circuit. Note that all memory cells 20 receives the same signal via corresponding refresh pulse lines RP1. For this reason, the refresh pulse line RP1 is not necessarily provided for each of the rows, and is not necessarily driven by a word line control circuit 14. It is possible to drive the refresh pulse line RP1 by use of a writing/reading circuit 15 or the like. Further, a high potential of a second word line Xi(2) is identical with a high potential retained by a node PIX.

Figure 30:
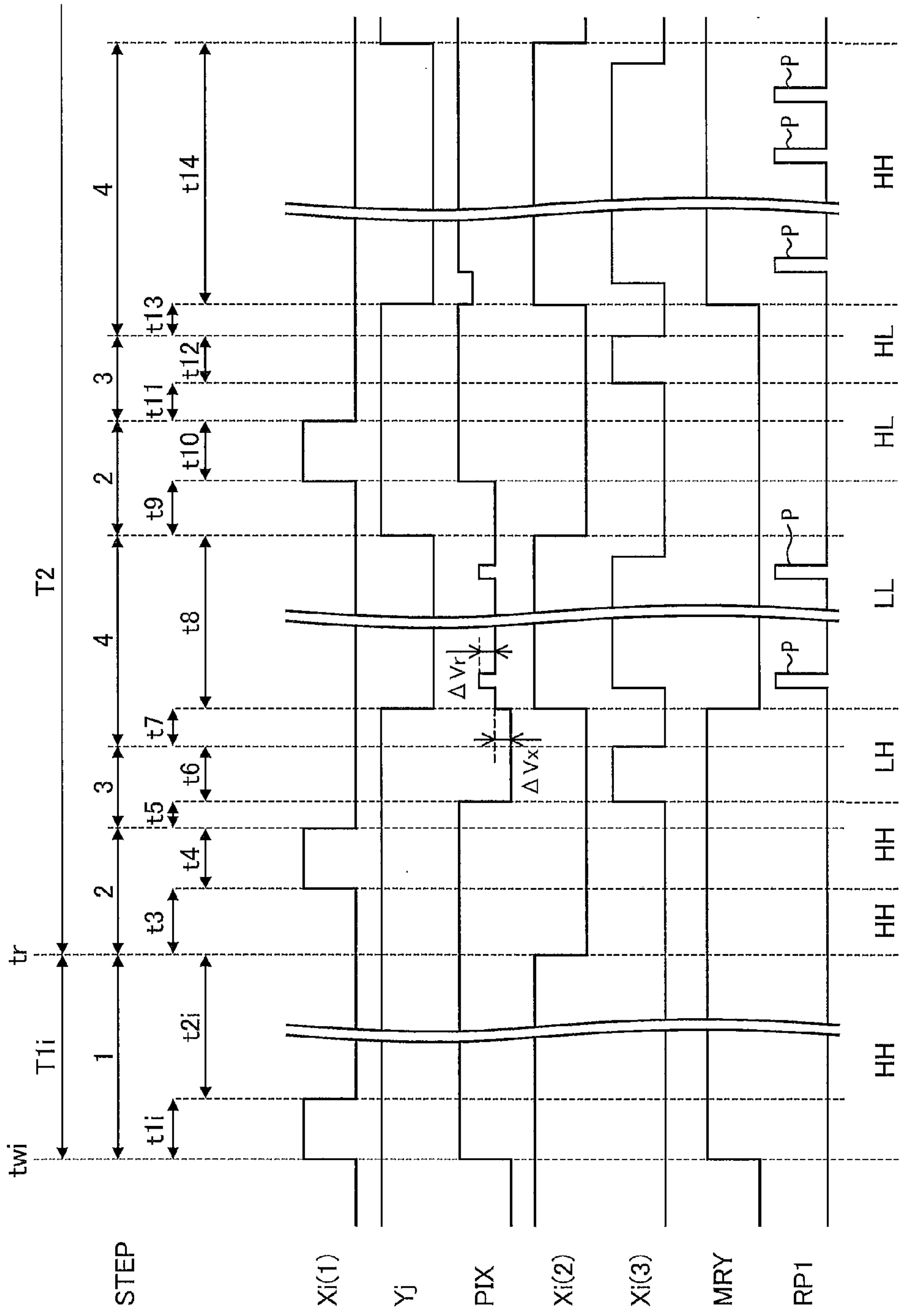
FIG. 30 is a view showing signals used in a writing operation of the eighth memory circuit illustrated in FIG. 29.

FIG. 30 shows an operation of the memory circuit MR8.

Waveforms of potentials, shown in FIG. 30, are such that, as to waveforms shown in FIG. 12, a first time period is provided in each of time periods t8 and t14, in which first time period a potential of a bit line Yj is low and a potential of a third word line Xi(3) is high. A positive pulse P, which rises from the low level to the high level and whose width is short, is supplied to the refresh pulse line RP1 at predetermined intervals only during a time period in each of the time periods t8 and t14, in which time period the potential of the third word line Xi(3) is high.

An operation of the first time period is carried out after, in the fourth step, on a condition that (i) the switching circuit SW1 is turned into the shutoff state and (ii) the refresh output control section RS1 has carried out a second operation, a data transfer section TS1 carries out a transfer operation. In the first time period, on a condition that (i) the switching circuit SW1 is turned into the shutoff state and (ii) the data transfer section TS1 keeps carrying out the transfer operation, the refresh output control section RS1 carries out a first operation. The time period in which the potential of the bit line Yj is low should include the first time period.

Operations of the time periods t1 through t7, and the time periods t9 through t13, are identical with operations shown in FIG. 12.

In FIG. 12, since the transistors N1 and N4 are in the OFF state during the time periods t8 and t14, the node PIX is in a floating state during the time periods t8 and t14. However, there is a risk that the potential of the node PIX might be changed due to an off-leakage current of the transistor N1 and an off-leakage current of the transistor N4.

On the other hand, in FIG. 30, the potential of the bit line Yj is low during the time period t8. Accordingly, in a case where the potential of the node PIX is low, it is possible to suppress an increase in the potential of the node PIX, even if (i) a transistor N1 which originally has a large off-leakage current is employed or (ii) the off-leakage current of the transistor N1 toward the bit line Yj becomes greater as the low potential of the bit line Yj becomes lower than the low potential of the node PIX.

During the time period t8, the potential of the third word line Xi(3) is high, and the positive pulse is supplied to the refresh pulse line RP1. This increases the potential of the node MRY by "$\Delta Vr = Cb1/(Ca1+Cb1) \times$(amplitude of change in potential of refresh pulse line RP1)". Note, however, that "Ca1" and "Cb1" indicate a capacitance of a capacitor Ca1 and a capacitance of a capacitor Cb1, respectively. Here, "VL" is a potential of the MRY when the potential of the refresh pulse line RP1 is low. Since the nodes PIX and MRY are electrically connected to each other, both the potentials of the nodes PIX and MRY are "$VL+\Delta Vr$". Here, a potential of a first drain/source terminal of a transistor N3 is high, and a potential of a gate terminal of the transistor N3 and a potential of a second drain/source terminal of the transistor N3 are "VL+ΔVr". Accordingly, the transistor N3 keeps being in the OFF state, and the node PIX is not charged by the second word line Xi(2). In a case where the potential of the refresh pulse line RP1 becomes low, the potential of the node PIX returns to the "VL", which is a potential before the potential of the node PIX is increased. That is, the potential of the node PIX keeps being low.

During the time period t14, a homopolar (high) refresh operation is carried out by use of the refresh pulse line RP1. The homopolar refresh operation is carried out in a case where the potential of the node PIX is "high potential−ΔVy (the potential by which the potential was changed when the transistor N2 is turned on)". The time period t14 includes the time period in which the potential of the third word line Xi(3) is high. During this time period, the potential of the refresh output control line RC1 is caused to be high, and the positive pulse is supplied to the refresh pulse line RP1. This increases the potential of the node MRY by "ΔVr=Cb1/(Ca1+Cb1)× (amplitude of change in potential of refresh pulse line RP1)".

Here, "VH" is a potential of the node MRY when the potential of the refresh pulse line RP1 is low. In this case, the potential of the node MRY is "VH+ΔVr". In a case where "VH+ΔVr" becomes greater than "(potential of gate terminal of transistor N2)−Vth", the transistor N2 is turned into the OFF state. Here, the potential of the gate terminal of the transistor N2 is identical with the potential of the second word line Xi(2), and "Vth" is a threshold voltage of the transistor N2.

Further, in a case where "VH+ΔVr" becomes greater than "potential of source terminal of transistor N3+Vth", the transistor N3 is turned into the ON state. Here, the potential of the source terminal of the transistor N3 is identical with the potential of the first drain/source terminal of the transistor N3, that is, the potential of the second word line Xi(2). Accordingly, the node PIX is electrically connected to the second word line Xi(2), and the potential of the node PIX is refreshed to the high potential. In a case where the potential of the refresh pulse line RP1 becomes low, the potential of the node MRY becomes "high potential−Vth". Here, "Vth" is a threshold voltage of the transistor N2. As described above, every time the positive pulse is supplied to the refresh pulse line RP1, the high potential of the node PIX can be refreshed.

The positive pulse is supplied to the refresh pulse line RP1 so as to refresh the potential (high potential) of the node PIX to be high. Note that it is necessary to set the amplitude of the positive pulse so that the potential of the node MRY becomes greater than "(target high potential to be obtained by refresh operation)+Vth". Here, "Vth" is a threshold voltage of the transistor N3.

In FIG. 30, the potential of the node PIX is retained to be low during the time period t8. Note, however, that, in a case where the potential of the node PIX is high during the time period t8, it is possible to carry out the homopolar (high) refresh operation as in the time period t14 shown in FIG. 30. Further, in a case where the potential of the node PIX is low during the time period t14, it is possible to retain the potential of the node PIX to be low, as in the time period t8 shown in FIG. 30.

Note that in a case where a memory circuit (i) includes transistors whose channel has a polarity opposite to that of the transistors of the memory circuit MR8 and (ii) carries out an operation whose logic is opposite to that of FIG. 30, a negative pulse dropping from the high level to the low level is applied to the refresh pulse line RP1 during the time periods t8 and t14. With the arrangement, in a case where the nodes PIX and MRY retain the high level, the nodes PIX and MRY keep retaining the high level during the time periods t8 and t14. Meanwhile, in a case where the node PIX retains the low level, the low level retained by the node PIX is refreshed to the low potential by the second word line Xi(2). In a case where the node PIX is refreshed to the low potential, and the potential of the refresh pulse line RP1 becomes low, the potential of the node MRY becomes "low potential+Vth".

That is, in a case where the control information which controls the refresh output control section RS1 to be in the active state when the refresh output control section RS1 carries out the first operation, i.e., the active level, is the higher one of the first potential level and the second potential level, a pulse for switching the low level to the high level is supplied to the refresh pulse line RP1. In a case where the control information which controls the refresh output control section RS1 to be in the active state when the refresh output control section RS1 carries out the first operation, i.e., the active level, is the lower one of the first potential level and the second potential level, a pulse for switching the high level to the low level is supplied to the refresh pulse line RP1.

Further, during the first time period, the binary logical level is supplied to the bit line Yj, which binary logical level is identical with the level of the control information which controls the refresh output control section RS1 to be in the inactive state when the refresh output control section RS1 carries out the first operation.

According to the present example, the high potential of the node PIX, i.e., the high and low potentials of the first data retention section DS1, can be retained for a long time. It is therefore possible to decrease a frequency of a polarity reversal of the data to be retained. The polarity reversal generates a consumption current related to charging/discharging of the capacitor Ca1 and the capacitor Cb1. Accordingly, it is possible to reduce the power consumption by an amount corresponding to a reduction in the number of times that the charging/discharging is carried out.

EXAMPLE 5

Figure 41:
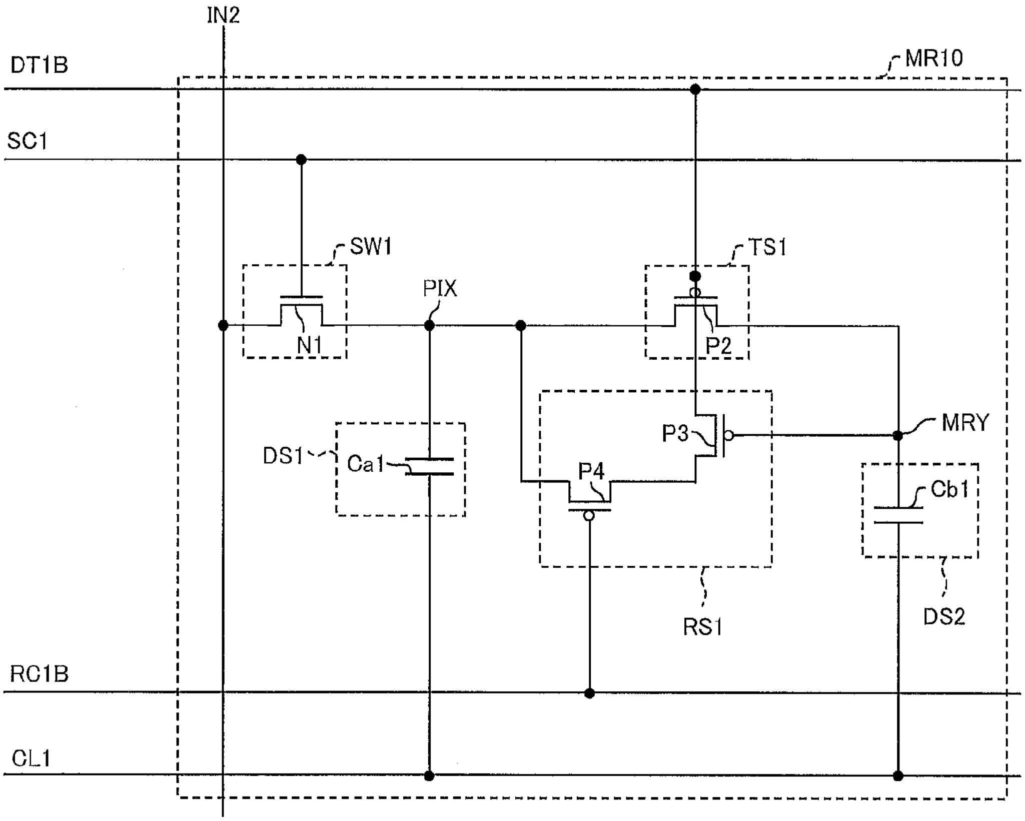
FIG. 41 is a circuit diagram illustrating an arrangement of a ninth memory circuit in accordance with an embodiment of the present invention.

FIG. 41 illustrated a memory circuit MR10 serving as an equivalent circuit, which corresponds to an arrangement of a memory cell 20 of the present example.

The memory circuit MR10 is such that, in a memory circuit MR1 illustrated in FIG. 11, a transistor N2 is replaced with a P-channel transistor P2, a transistor N3 is replaced with a P-channel transistor P3, and a transistor N4 is replaced with a P-channel transistor P4. Further, a data transfer control line DT1B is employed as a data transfer control line DT1 illustrated in FIG. 33, a refresh output control line RC1B is employed as a refresh output control line RC1 illustrated in FIG. 33, a data input line IN2 is employed as a data input line IN, and a reference potential line RL1 illustrated in FIG. 11 is replaced with a storage capacitor line CL1.

Figure 42:
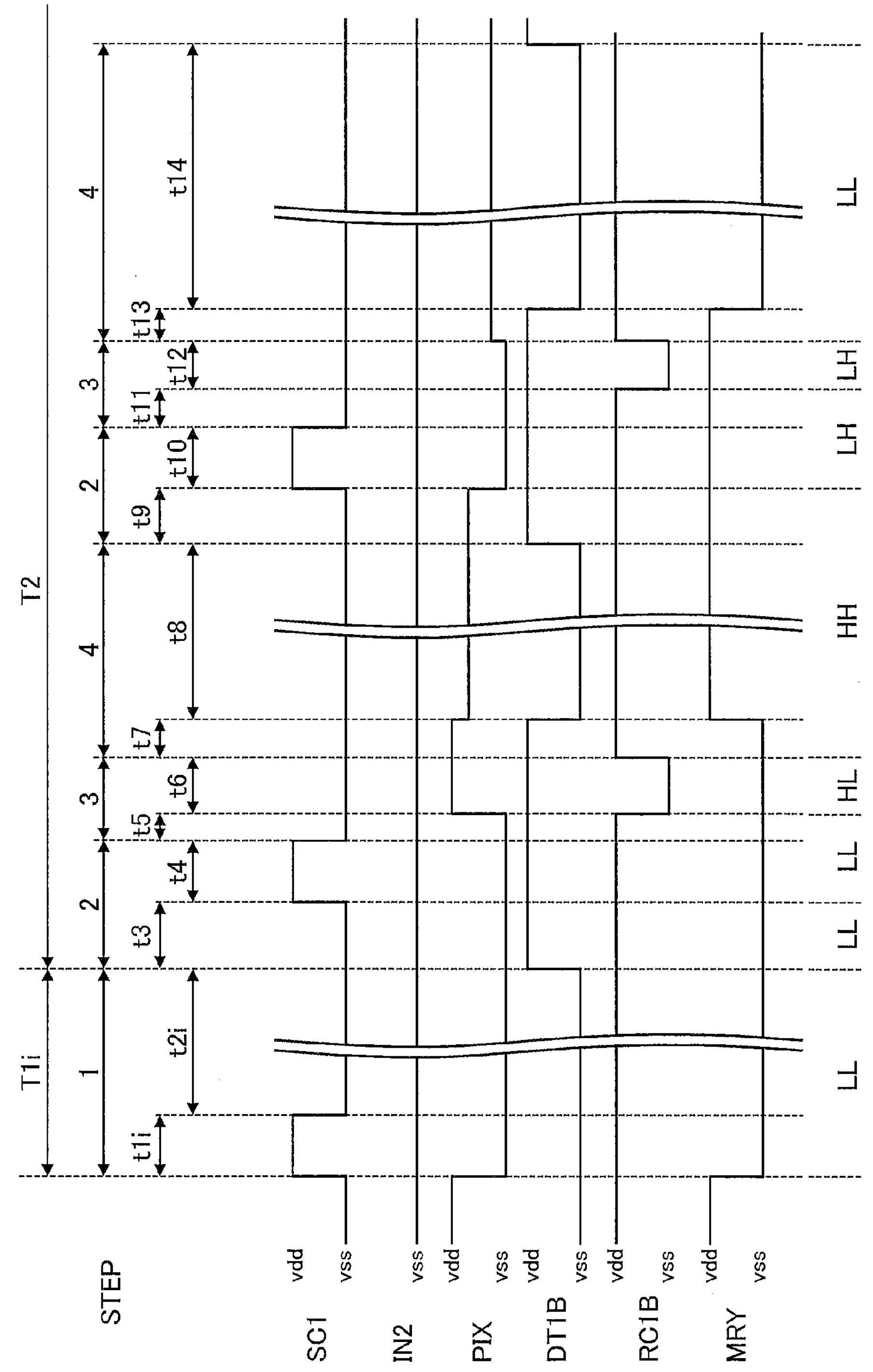
FIG. 42 is a view showing signals used in a writing operation of the ninth memory circuit illustrated in FIG. 41.

As shown in FIG. 42 in which signals used in a writing operation are shown, the memory cell 20 can be operated by use of two logical power sources, namely, a high-level power source vdd and a low-level power source vss. Note that a potential of the storage capacitor line CL1 is constant.

A potential vdd serving as an active level is supplied to a switch control line SC1 during time periods t1*i*, t4, and t10, and a potential vss serving as an inactive level is supplied to the switch control line SC1 during the other time periods.

A potential of the data input line IN2 is vss during a refreshing time period T2.

The potential vss serving as the active level is supplied to the data transfer control line DT1B during time periods t1*im*, t2*i*, t8, and t14. The potential vdd serving as the inactive level is supplied to the data transfer control line DT1B during the other time periods.

The potential vss serving as the active level is supplied to the refresh output control line RC1B during time periods t6 and t12. The potential vdd serving as the inactive level is supplied to the refresh output control line RCB1 during the other time periods.

According to the arrangement described above, the potential of the data input line IN2 is vss during the refreshing time period T2. Accordingly, the transistor N1 is in the ON state while the potential of the switch control line SC1 is vdd. It is therefore possible to write the potential vss in a node PIX by the data input line IN2.

Further, in a case where the potential vss is written by the data input line IN2 during the writing time period T1, it is possible to carry out the writing even when the potential of the switch control line SC1 is vdd. In a case where the potential vdd is written by the data input line IN2, it is possible to carry out the writing in such a manner that (i) the potential of the node PIX is set to be within a range of the low level in advance, and therefore (ii) the transistor N1 is turned into the ON state when the potential of the switch control line SC1 becomes vdd. In the case where the potential vdd is written, the potential of the node PIX is increased to "vdd−Vth", that is, the potential vdd is reduced by a threshold voltage Vth of the transistor N1 (N-channel transistor).

In a case where (i) the potential of the data transfer control line DT1B is vss and (ii) one of the potentials of the nodes PIX and MRY is within a range of the high level, the transistor P2 is turned into the ON state. Here, in a case where the potential of the node PIX is vss, the potential vss is written in the node MRY from the node PIX. However, the potential of the node MRY is reduced to "vss+Vth", that is, the potential higher than the potential vss by a threshold voltage Vth of the transistor P2 (P-channel transistor) (time period t14).

In a case where (i) the potential of the node MRY is "vss+Vth", (ii) an inequality of "vdd−(vss+Vth)>Vth" is satisfied, and (iii) the potential of the data transfer control line DT1B is vdd, the transistor P3 is turned into the ON state. As a result, the potential vdd can be supplied from the source to the drain. Here, in a case where the potential of the refresh output control line RC1B becomes vss, the transistor P4 is turned into the ON state, and the potential vdd of the data transfer control line DT1B is written in the node PIX via the transistors P3 and P4 (time period t6).

In a case where the potential vdd is supplied from the data input line IN2 to the node PIX during the time period T1*i*, the potential of the node PIX becomes "vdd−Vth", as described above. The potential of the node PIX is transferred to the node MRY, and the potential of the node PIX is not reduced substantially. Accordingly, the potential of the node MRY becomes substantially identical with "vdd−Vth". In this case, it is possible to manage to cause the transistor P3 to be in the OFF state. Here, in a case where the potential of the node MRY is increased by use of another power source (which is provided independently) during the time period t5, the potential of the node MRY becomes higher than "vdd−Vth". Accordingly, it is possible to cause successfully the transistor P3 to be in the OFF state.

As described above, according to the present example, it is possible to carry out, by use of two potentials, the control which is necessary for a memory operation. This means that logic control can be carried out with the use of a potential which is identical with a binary logical level to be retained in a pixel. That is, it is unnecessary to provide an additional power source for the logic control, and therefore it is possible to have a reduction in power consumption due to an operation of such an additional power source. In a case where the memory circuit MR10 is applied to a display device in accordance with the following embodiment, it is possible to carry out a logical operation with the minimum number of power sources (in a case where multi-valued display is not carried out).

With the arrangement, it is possible to write the high/low level in the node PIX by use of the potential vdd/vss without any influence of a threshold voltage Vth of the transistor, except for a case where a change in potential is caused due to an off-leakage current or a parasitic capacitance. That is, it is possible to obtain, as the potential of the node PIX, a potential similar to that of each of the circuit arrangements of the aforementioned examples.

Figure 43:
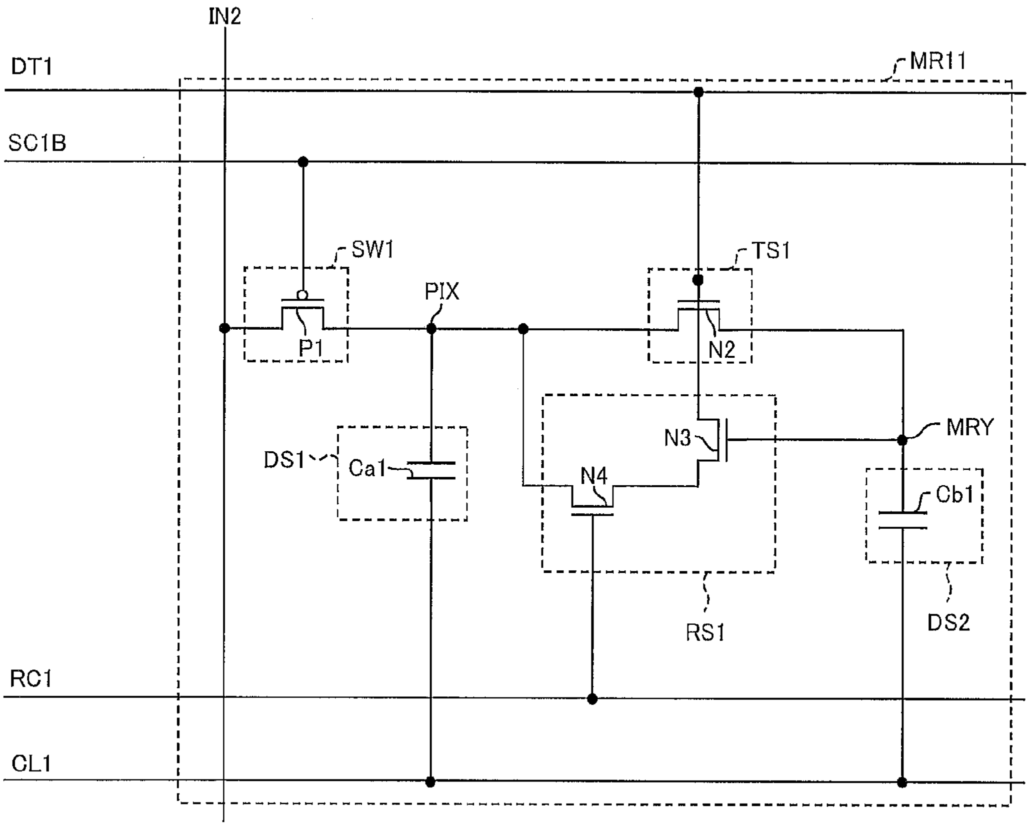
FIG. 43 is a circuit diagram illustrating an arrangement of a tenth memory circuit in accordance with an embodiment of the present invention.
Figure 44:
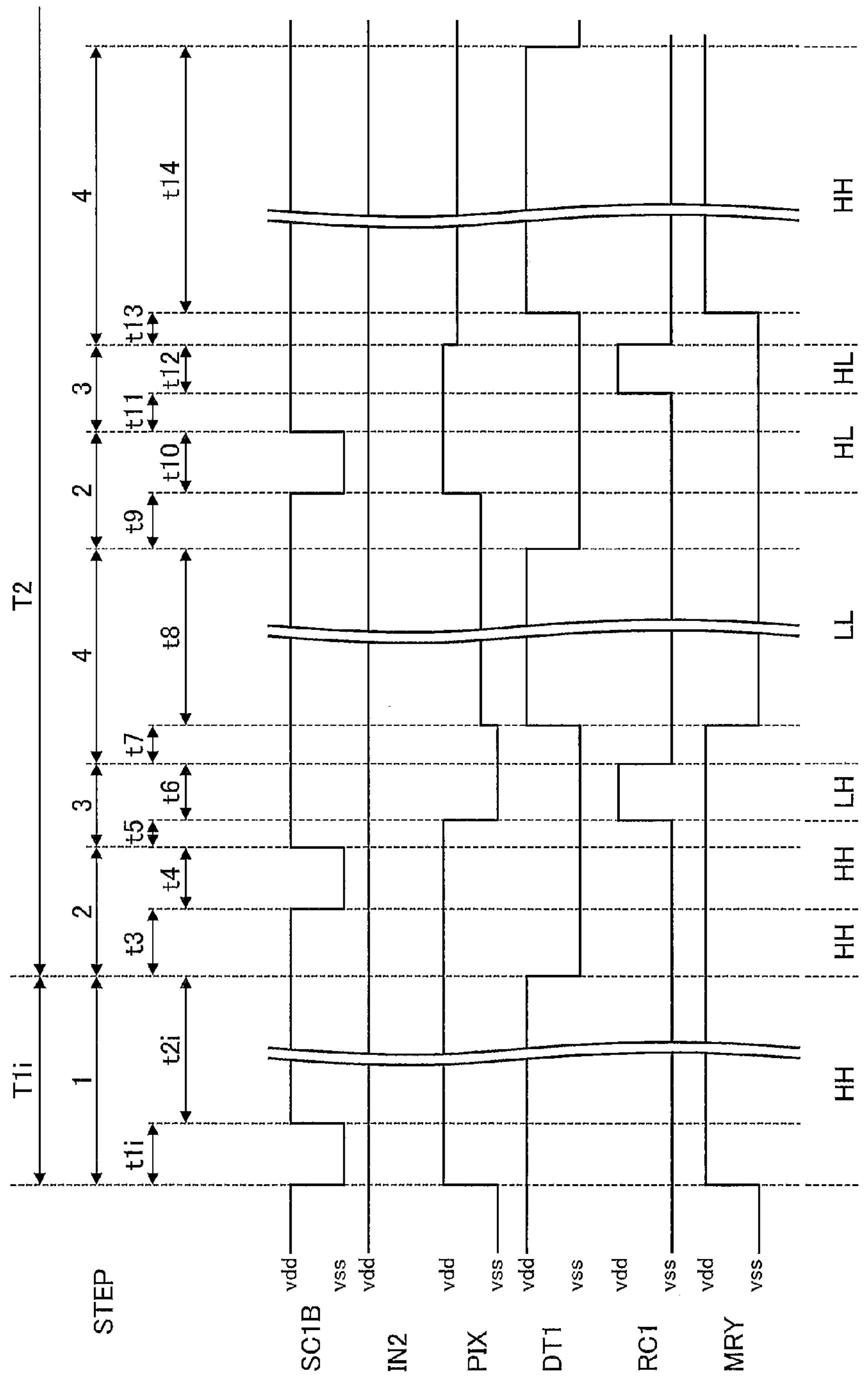
FIG. 44 is a view showing signals used in a writing operation of the tenth memory circuit illustrated in FIG. 43.

Next, FIG. 43 illustrates an arrangement of a memory circuit MR11, which is a modified example of the memory circuit MR10.

The memory circuit MR11 has an arrangement in which the operation logic of the memory circuit MR10 is reversed. The memory circuit MR is such that the transistor N1 of the memory circuit MR10 is replaced with a P-channel transistor P1, the transistor P2 of the memory circuit MR10 is replaced with an N-channel transistor N2, the transistor P3 of the memory circuit MR10 is replaced with an N-channel transistor N3, and the transistor P4 of the memory circuit MR10 is replaced with an N-channel transistor N4.

Further, the data transfer control line DT1B illustrated in FIG. 41 is replaced with the data transfer control line DT1, the switch control line SC1 illustrated in FIG. 41 is replaced with the switch control line SC1B, the refresh output control line RC1B illustrated in FIG. 41 is replaced with the refresh output control line RC1. Potentials of signals, shown in FIG. 42, are reversed (see FIG. 44).

With the arrangement, it is also possible to achieve the same functions and effects as those of the arrangement illustrated in FIG. 41 and shown in FIG. 42.

The details of the memory cell 20 are thus described.

[Explanation of Display Device]

Figure 35:
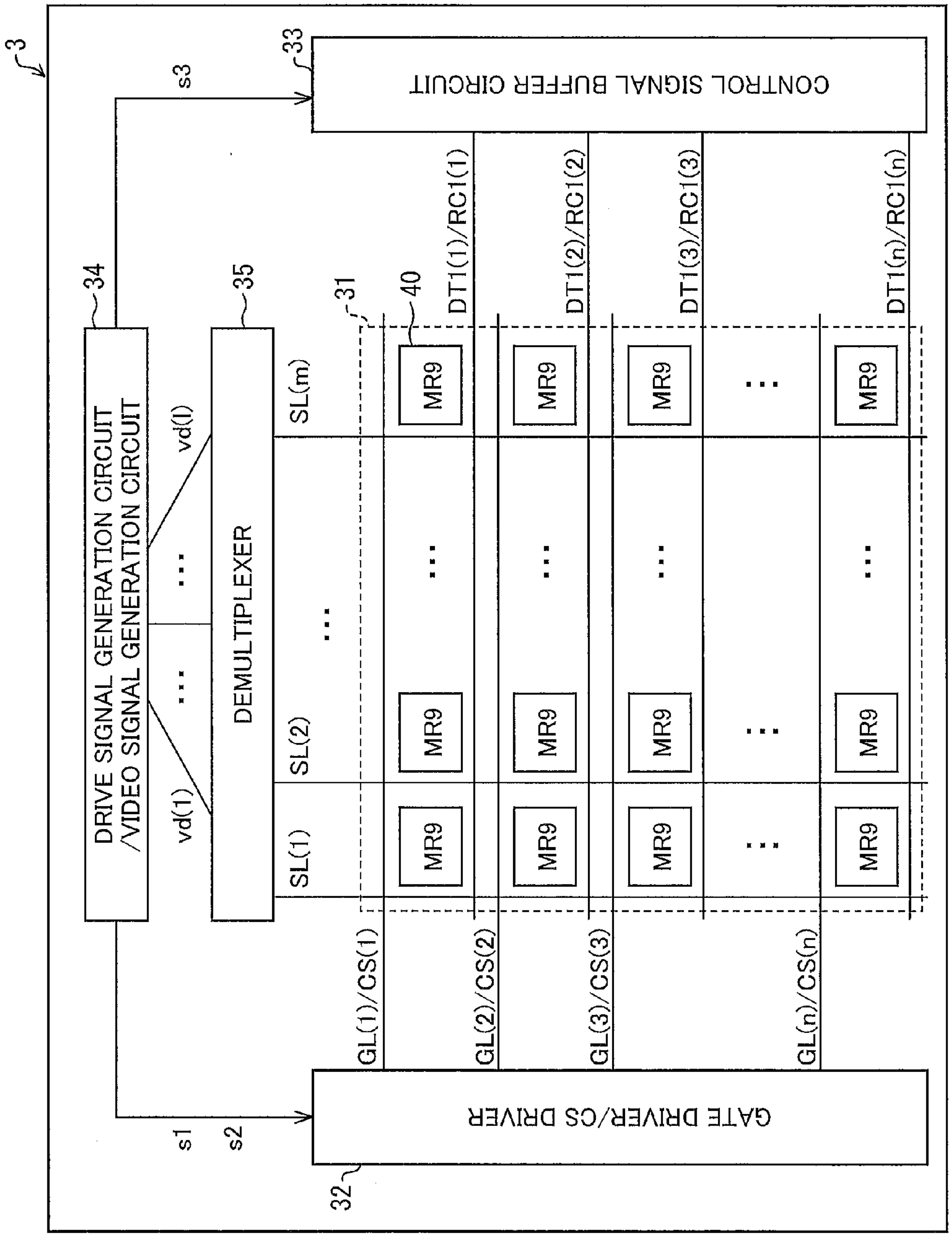
FIG. 35 is a block diagram illustrating an arrangement of a display device in accordance with an embodiment of the present invention.
Figure 36:
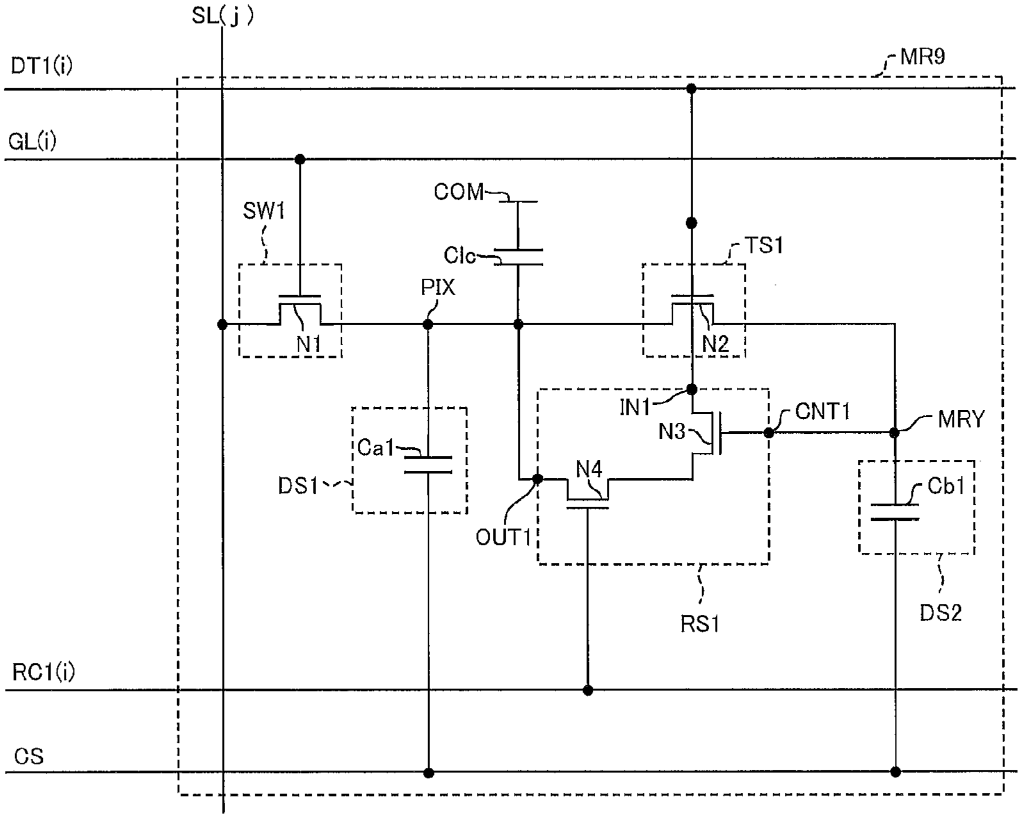
FIG. 36 is a circuit diagram illustrating an arrangement of a pixel included in the display device illustrated in FIG. 35.
Figure 37:
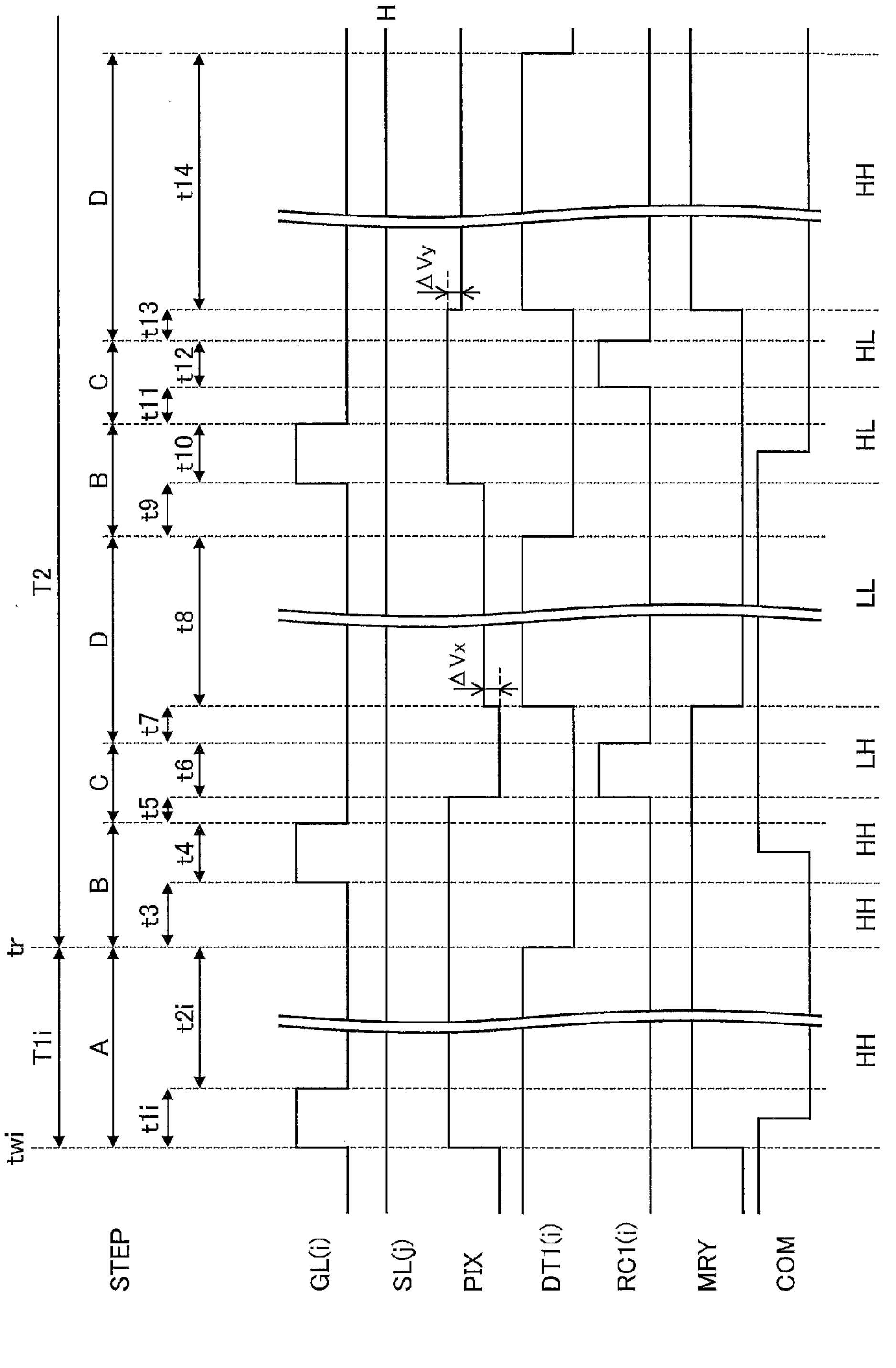
FIG. 37 is a view showing signals used in an operation of the pixel illustrated in FIG. 36.

The following description deals with a display device employing a memory device 1 with reference to FIGS. 35 through 37.

FIG. 35 illustrates an arrangement of a liquid crystal display device 3, which corresponds a display device of the present embodiment. An operation of the liquid crystal display device 3 is carried out (i) in a multiple gray-scale display mode which is used to display, for example, an operation screen of a mobile phone, or (ii) in a memory circuit operation mode which is used to display, for example, a stand-by screen of the mobile phone. The multiple gray-scale display mode and the memory circuit operation mode are switchable with each other.

The liquid crystal display device 3 includes a pixel array 31, a gate driver/CS driver 32, a control signal buffer circuit 33, a drive signal generation circuit/video signal generation circuit 34, a demultiplexer 35, a gate line (scan signal line) GL(i), a storage capacitor line CS(i), a data transfer control line DT1(*i*), a refresh output control line RC1(*i*), a source line (data signal line) SL(j), and an output signal line vd(k). Note, however, that i is an integer in a range of $1 \leq i \leq n$, j is an integer in a range of $1 \leq j \leq m$, and k is an integer in a range of $1 \leq k \leq 1 < m$.

The pixel array 31 is such that a plurality of pixels 40 serving as a plurality of pixel circuits MR9 are arranged in a matrix manner. The pixel array 31 is used to display an image. Each of the plurality of pixels 40 includes a memory cell 20 of the embodiment described above. Accordingly, the pixel array 31 includes a memory array 10 of the embodiment described above.

The gate driver/CS driver 32 is a drive circuit for driving, via the gate line GL(i) and the storage capacitor line CS(i), the plurality of pixels 40 provided in n rows. The gate line GL(i) and the storage capacitor line CS(i) are connected to each of pixels 40 provided in the ith row. The gate line GL(i) also serves as a switch control line SC1 (illustrated in FIG. 33) of the embodiment described above, i.e., a first word line Xi(1). The storage capacitor line CS(i) also serves as a reference potential line RL1 of the embodiment described above. Further, in a case where a refresh pulse line RP1 (illustrated in FIG. 29) used in a memory circuit MR8 of the embodiment described above is provided, another storage capacitor line serving as the refresh pulse line RP1 is provided for each of the rows.

The control signal buffer circuit 33 is a drive circuit for driving, via the data transfer control line DT1(*i*) and the refresh output control line RC1(*i*), the plurality of pixels 40 provided in the n rows. The data transfer control line DT1(*i*) corresponds to a data transfer control line DT1 (illustrated in FIG. 33) of the embodiment described above, i.e., a second word line Xi(2). The refresh output control line RC1(*i*) corresponds to a refresh output control line RC1 of the embodiment described above, i.e., a third word line Xi(3). Further, in a case where a memory circuit MR5 (illustrated in FIG. 22) of the embodiment described above is provided, the data transfer control line DT1(*i*) also serves as the refresh output control line RC1(*i*).

The drive signal generation circuit/video signal generation circuit 34 is a control drive circuit for carrying out image display and a memory operation. In addition to a processing circuit for processing data to be displayed, the drive signal generation circuit/video signal generation circuit 34 includes an input/output interface 11, an instruction decoder 12, a timing control circuit 13, and a writing/reading circuit 15, each of which is illustrated in FIG. 31. The timing control circuit 13 can serve as not only a circuit for generating timing in the memory operation but also as a circuit for generating timing of a gate start pulse, a gate clock, a source start pulse, a source clock, and the like, each being used in a display operation.

The drive signal generation circuit/video signal generation circuit 34 outputs a multiple gray-scale video signal (multi-valued level data signal) from a video output terminal in a multicolor display mode (in which the memory circuit is not in operation), so as to drive the source line SL(j) via the output signal line vd(k) and the demultiplexer 35. Further, simultaneously, the drive signal generation circuit/video signal generation circuit 34 outputs a signal s1 for driving/controlling the gate driver/CS driver 32. With the operation, the data to be displayed is written in each of the plurality of pixels 40, so as to display a multiple gray scale moving image or a still image.

Further, in the memory circuit operation mode, the drive signal generation circuit/video signal generation circuit 34 (i) supplies data to be retained in each of the plurality of pixels 40 from the video output terminal to the source line SL(j) via the output signal line vd(k) and the demultiplexer 35, (ii) outputs a signal s2 for driving/controlling the gate driver/CS driver 32, and (iii) outputs a signal s3 for driving/controlling the control signal buffer circuit 33. With the operation, (i) data is written or retained in each of the plurality of pixels 40, or (ii) data is read out from each of the plurality of pixels 40.

Note, however, that the data written and retained in each of the plurality of pixels 40 may be used to only display an image, and the operation of reading out the data from each of the plurality of pixels 40 is not necessarily carried out. The drive signal generation circuit/video signal generation circuit 34 outputs, in the memory circuit operation mode, from the video output terminal to the output signal line vd(k), data which is a binary logical level represented by a first potential level or a second potential level. In a case where each of the plurality of pixels 40 serves as a color pixel, it is possible to display an image with colors the number of which is obtained by multiplying exponentially 2 by the number of colors of such color pixels. For example, in a case where there are RGB pixels, namely, red pixels, green pixels, and blue pixels, it is possible to display an image in a display mode with "third power of 2=8" colors. The demultiplexer 35 distributes data supplied to the output signal line vd(k) to a corresponding source line SL(j).

As is clear from the above explanation, the gate driver/CS driver 32 and the control signal buffer circuit 33 constitute a row driver. Further, the drive signal generation circuit/video signal generation circuit 34 and the demultiplexer 35 constitute a column driver.

Next, FIG. 36 illustrates the pixel circuit MR9 serving as an equivalent circuit, which corresponds to an example of an arrangement of each of the plurality of pixels 40.

The pixel circuit MR9 has such an arrangement that a liquid crystal capacitor C1*c* is added to a memory circuit MR1 illustrated in FIG. 11. Note that a first word line Xi(1), a second word line Xi(2), a third word line Xi(3), and a bit line Yj, each being illustrated in FIG. 11, correspond to a gate line GL(i), a data transfer control line DT1(*i*), a refresh output control line RC1(*i*), and a source line SL(j), respectively.

The liquid crystal capacitor C1*c* is such that a liquid crystal layer is provided between the node PIX and a common electrode COM. That is, the node PIX is connected to a pixel electrode. Here, the capacitor Ca1 also functions as a storage capacitor for the pixel 40. Further, a transistor N1 constituting the switching circuit SW1 also functions as a selection element for the pixel 40. The common electrode COM is provided on a common electrode substrate which faces a matrix substrate on which the circuit illustrated in FIG. 35 is provided. Note, however, that the common electrode COM can be provided on the matrix substrate.

Note that any of the memory circuits described above can be employed as the memory circuit included in the pixel circuit MR9.

In the multiple gray-scale display mode, the pixel circuit MR9 displays an image on a condition that (i) a data signal having a potential levels, the number of which is more than binary levels, is supplied to the pixel 40, and, as a result, (ii) the refresh control section RS1 is not in the active state, i.e., the state for carrying out the first operation. In the multiple gray-scale display mode, the potential of the data transfer control line DT1(*i*) can be fixed to the low level so as to cause only the capacitor Ca1 to function as a storage capacitor. Alternatively, the potential of the data transfer control line DT1(*i*) is fixed to the high level so as to cause a combination of the capacitors Ca1 and Cb1 to function as a storage capacitor. Further, by (i) fixing the potential of the refresh output control line RC1(*i*) to the low level to keep the transistor N4 being in an OFF state, or (ii) setting the potential of the data transfer control line DT1(*i*) to be high to cause the transistor N3 to be in the OFF state, it becomes possible to prevent the potential of the data transfer control line DT1 from having an influence on a display gray scale of the liquid crystal capacitor C1*c*, which display gray scale is determined by an electric charge stored in the first data retention section DS1. Accordingly, it is possible to achieve display quality which is identical with that of a liquid crystal display device having no memory function.

Further, FIG. 37 shows an operation of the pixel circuit MR9 in the memory circuit operation mode. An operation of the memory circuit operation mode shown in FIG. 37 is identical with an operation shown in FIG. 12, except that a waveform of a potential of the common electrode COM is added. As described above, the memory circuit operation mode is carried out by a writing operation with respect to the memory cell 20 of the memory device 1.

Note that operation steps of the pixel circuit MR9, shown in FIG. 37, can be classified as described below.

(1) Step A (Time Periods t1*i* and t2*i* (Writing Time Period T11)

In the step A, on a condition that (i) the drive signal generation circuit/video signal generation circuit 34 and the demultiplexer 35 have supplied, to the source line SL(j), a binary logical level corresponding to a data signal, and (ii) the refresh output control section RS1 has carried out a second operation, the switching circuit SW1 is turned into the electrically-conductive state. As a result, the binary logical level is written in the pixel 40. Further, on a condition that (i) the binary logical level has been written in the memory cell 20, and (ii) the refresh output control section RS1 has carried out the second operation, the data transfer section TS1 carries out a transfer operation.

(2) Step B (Time Periods t3 and t4, Time Periods t9 and t10)

In the step B following the step A, on a condition that (i) the binary logical level has been supplied to the source line SL(j), (ii) the refresh output control section RS1 has carried out the second operation, and (iii) the data transfer section TS1 has carried out a non-transfer operation, the switching circuit SW1 is turned into the electrically-conductive state. As a result, the first data retention section DS1 is supplied with a binary logical level which is identical with a level of control information which controls the refresh output control section RS1 to be in the active state.

(3) Step C (Time Periods t5 and t6, and Time Periods t11 and t12)

In the step C following the step B, on a condition that (i) the switching circuit SW1 is in a shutoff state and (ii) the data transfer section TS1 has carried out the non-transfer operation, the refresh output control section RS1 carries out a first operation. When the first operation is finished, the data transfer control line DT1(*i*) serving as a supply source VS1 is supplying, to an input of the refresh output control section RS1, a binary logical level which is identical with a reversal level of the level of the control information which controls the refresh output control section RS1 to be in the active state.

(4) Step D (Time Periods t7 and t8, and Time Periods t13 and t14)

In the step D following the step C, on a condition that (i) the switching circuit SW1 is in the shutoff state and (ii) the refresh output control section RS1 has carried out the second operation, the data transfer section TS1 carries out the transfer operation.

As an entire operation of the memory circuit operation mode, first, the operation of the step A is carried out, and then, a series of the operations of the steps B through D (from the beginning of the step B to the end of the step D) (time periods t3 through t8) are carried out at least once.

Further, the potential of the common electrode COM is driven to be reversed between the high level and the low level every time the transistor N1 is turned into the ON state. The common electrode of the liquid crystal capacitor is thus subjected to reversal driving with an AC by use of the binary level. It is therefore possible to display brightness and darkness by driving the liquid crystal capacitor with the AC positively and negatively.

Further, here, as an example, the binary level supplied to the common electrode COM is represented by the first potential level or the second potential level. With the arrangement, it becomes possible to realize easily, by use of only the first and second potential levels, black display and white display with either a positive liquid crystal applied voltage or a negative liquid crystal applied voltage. For example, the high potential of the common electrode COM is identical with the high potential of the binary logical level, and the low potential of the common electrode COM is identical with the low potential of the binary logical level. In this case, when (i) the potential of the common electrode COM is low and (ii) the potential of the node PIX is low, the black display is carried out positively. When (i) the potential of the common electrode COM is low and (ii) the potential of the node PIX is high, the white display is carried out positively. When (i) the potential of the common electrode COM is high and (ii) the potential of the node PIX is low, the white display is carried out negatively. When (i) the potential of the common electrode COM is high and (ii) the potential of the node PIX is high, the black display is carried out negatively. Accordingly, every time the potential of the node Pix is refreshed, the liquid crystal is driven so that a polarity of the liquid crystal applied voltage is reversed while the display gray scale is substantially maintained. It is therefore possible to (i) cause the liquid crystal to be subjected to the driving with the AC and (ii) in the driving, an effective value of the liquid crystal applied voltage is constant either positively or negatively.

Further, here, as an example, the binary level supplied to the common electrode COM is reversed during only a time period in which the switching circuit SW1 is in the electrically-conductive state (see FIG. 37). With the arrangement, the binary level supplied to the common electrode COM is reversed during only a time period in which the pixel electrode is electrically connected to the source line SL(j) via the switching circuit SW1. Accordingly, the potential of the common electrode COM is reversed while the potential of the pixel electrode is fixed to the potential of the source line SL(j). As a result, it is possible to prevent the potential of the pixel electrode thus retained, particularly, the potential of the pixel electrode during the refreshing time period, from being fluctuated in a floating state due to a reversal of the potential of the common electrode COM.

As described above, according to the present embodiment, it is possible to allow a display device to have both functions of (i) a multiple gray-scale display mode (second display mode) and (ii) a memory circuit operation mode (first display mode). In the memory circuit operation mode, an image which is not likely to be changed as a time elapses, such as a still image, is displayed. In this case, it is possible to stop (i) an operation of a circuit, such as an amplifier for displaying a multiple gray-scale image by use of a video signal generation circuit, or (ii) an operation for supplying data. Accordingly, it is possible to realize low power consumption. Further, in the memory circuit operation mode, the potential can be refreshed in the pixel 40. Accordingly, it is unnecessary to rewrite data of the pixel 40 by charging/discharging the source line SL(j) again. It is thus possible to have a reduction in power consumption. Furthermore, a polarity of data can be reversed in the pixel 40. Accordingly, it is unnecessary to rewrite the data by charging/discharging the source line SL(j), which data has been reversed at the time of the polarity reversal. It is thus possible to have a reduction in power consumption.

In the pixel circuit MR9 serving as a memory circuit, there is no element which causes a significant increase in power consumption, such as a flow through current of an inverter for carrying out the refreshing operation. Accordingly, it is possible to have a significant reduction in power consumption of the memory circuit operation mode itself, as compared with a conventional memory circuit.

Note that it is possible to realize a display device including a memory device 1 in which any of the memory circuits MR described in the aforementioned embodiment is provided in a drive circuit of the display device, such as a CS driver. In such a case, a binary logical level of data, retained in a memory cell, can be used by directly outputting the binary logical level from the memory cell, for example. In a case where the memory circuit MR1 illustrated in FIG. 11 is used, all the transistors used in the memory circuit MR1 are N-channel TFTs. Accordingly, it is possible to form the memory cell in the drive circuit which is provided monolithically in a display panel made of amorphous silicon.

The details of the display device are thus explained.

Note that, in the above example, the binary logical level is supplied from the writing/reading circuit 15 to the bit line Yj, and is retained by the memory cell 20 without any change. Note, however, that the arrangement of the memory cell used in the arrangement explained with reference to FIGS. 1 and 6, that is, the arrangement of the pixel, is not limited to this generally. For example, there is a case where the memory cell 20 can retain a plurality of data bits, each of which is constituted by a binary logical level. In this case, the binary logical level of each of the data bits is supplied from the writing/reading circuit 15 in chronological order. Alternatively, a PAM value in which a weight of each of the data bits is added is supplied from the writing/reading circuit 15 in chronological order. That is, a discrete level is supplied from the writing/reading circuit 15 to the memory cell 20, and at what level the memory cell 20 retains the discrete level depends on an arrangement inside the memory cell 20.

Further, there is a case where (i) the memory cell 20 can retain one or more data bits and (ii) each of the data bits is constituted by a multivalued logical level which is not less than a ternary logical level. In this case, if the memory cell 20 is arranged to be able to retain a plurality of data bits, the logical level of each of the data bits can be supplied from the writing/reading circuit 15 in chronological order, in the same manner as described above. Alternatively, a PAM value in which weight of each of the data bits is added can be supplied in chronological order, in the same manner as described above. On the other hand, in a case where the memory cell 20 is arranged to be able to retain one data bit, each logical level is directly supplied from the writing/reading circuit 15 to the memory cell 20. In these cases, the discrete level is also supplied from the writing/reading circuit 15 to the memory cell 20, and the memory cell 20 also retains the logical level in accordance with the discrete level.

Further, there may be an arrangement in which an analogue value (which corresponds to one PAM value representing an entire logical level) is synthesized from a plurality of logical levels in the memory cell 20. However, the arrangement here is such that the memory cell 20 can retain each logical level indicating digital data. That is, the memory cell 20 is arranged to be able to retain at least each logical level indicating digital data. In a case where only one discrete level is supplied from the writing/reading circuit 15 and is written and retained in the memory cell 20 as one level, the discrete level can be considered as a logical level.

Accordingly, in each of the examples described above, the discrete level, that is, the first potential level or the second potential level, is supplied to the memory cell 20, and the memory cell 20 retains the binary logical level represented by the first potential level or the second potential level.

Furthermore, since the writing/reading circuit 15 supplies the discrete levels, each of the discrete levels is generated by use of the first potential level supplied from the first power source and the second potential level supplied from the second power source. The higher one of the first and the second potential levels is not necessarily the highest potential of the discrete levels, while the lower one of the first and second potential levels is not necessarily the lowest potential of the discrete levels.

In this case, the potential supplied from the third power source is higher than the highest potential of the discrete levels, and the potential supplied from the fourth power source is lower than the lowest potential of the discrete levels. In a case where the first operation mode is carried out, among the third and fourth power sources for supplying the potentials which cannot be provided within a potential range of the discrete levels generated by use of the first and second power sources, the third power source is necessary and is kept being in operation, while the fourth power source is unnecessary and is stopped from being in operation.

According to the memory device described above, the following arrangements including the arrangement illustrated in FIG. 38 are obtained.

That is, a first memory device of the present invention includes: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source, the second power source, and the third power source being capable of, in combination with each other, carrying out a first operation mode in which the column driver supplies the one of the plurality of discrete levels to the memory cell so as to cause the memory cell to retain the one of the plurality of logical levels, in a case where the first operation mode is carried out, the first power source, the second power source, and the third power source being caused to be in operation, and the fourth power source being stopped from being in operation.

According to the first memory device, in a case where the first operation mode is carried out, the first power source, the second power source, and the third power source are caused to be in operation, and the fourth power source is stopped from being in operation. It is therefore possible to reduce power consumption by an amount corresponding to an operation of the fourth power source in the first operation mode, which operation is unnecessary in the first operation mode.

As a result, it is possible to realize a memory device which can (i) carry out the first operation mode in which a discrete level is supplied to a memory cell so as to cause the memory cell to retain a logical level, and (ii) prevent unnecessary power consumption due to an operation of a power source in the first operation mode, which power source is unnecessary in the first operation mode.

In the first memory device, a difference between the potential supplied from the third power source and a lower one of the first potential level and the second potential level can be set to be not more than twice a difference between the first potential level and the second potential level.

According to the arrangement, the first operation mode is carried out with a power source voltage in a range of not more than twice the difference between the first potential level and the second potential level. Accordingly, it is possible to have a reduction in power consumption by carrying out the operation with a power source voltage within a narrow range which could not be realized with a conventional technique.

Further, in the above arrangement, the operation of the fourth power source having a lower potential than that of the third power source is stopped. Note, however, that the present invention is not limited to this. For example, in a case where the transistors constituting the memory circuit are P-channel transistors, the fourth power source is necessary and the third power source is unnecessary in the first operation mode.

Accordingly, a second memory device of the present invention includes: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source, the second power source, and the fourth power source being capable of, in combination with each other, carrying out a first operation mode in which the column driver supplies the one of the plurality of discrete levels to the memory cell so as to cause the memory cell to retain the one of the plurality of logical levels, in a case where the first operation mode is carried out, the first power source, the second power source, and the fourth power source being caused to be in operation, and the third power source being stopped from being in operation.

According to the second memory device, in a case where the first operation mode is carried out, the first power source, the second power source, and the fourth power source are caused to be in operation, and the third power source is stopped from being in operation. It is therefore possible to reduce the power consumption by an amount corresponding to an operation of the third power source in the first operation mode, which operation is unnecessary in the first operation mode.

As a result, it is possible to realize a memory device which can (i) carry out the first operation mode in which a discrete level is supplied to a memory cell so as to cause the memory cell to retain a logical level, and (ii) prevent unnecessary power consumption due to an operation of a power source in the first operation mode, which power source is unnecessary in the first operation mode.

In the second memory device, a difference between the potential supplied from the fourth power source and a higher one of the first potential level and the second potential level can be set to be not more than twice a difference between the first potential level and the second potential level.

According to the arrangement, the first operation mode is carried out with a power source voltage in a range which is not more than twice the difference between the first potential level and the second potential level. Accordingly, it is possible to have a reduction in power consumption by carrying out the operation with a power source voltage within a narrow range which could not be realized with a conventional technique.

Further, as described above, there is a case where both the third and fourth power sources are unnecessary in the first operation mode.

Accordingly, a third memory device of the present invention includes: a memory array in which a plurality of memory cells are arranged in a matrix manner; a row driver for driving each of a plurality of rows of the memory array; a column driver for driving each of a plurality of columns of the memory array, the column driver being capable of supplying, by use of one of a plurality of discrete levels, to each of the plurality of the memory cells, one of a plurality of logical levels to be retained by the memory cell; a first power source for supplying a first potential level; a second power source for supplying a second potential level; a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source and the second power source being capable of, in combination with each other, carrying out a first operation mode in which the column driver supplies the one of the plurality of discrete levels to the memory cell so as to cause the memory cell to retain the one of the plurality of logical levels, in a case where the first operation mode is carried out, the first power source and the second power source being caused to be in operation, and the third power source and the fourth power source being stopped from being in operation.

According to the third memory device of the present invention, in a case where the first operation mode is carried out, the first and second power sources are caused to be in operation, and the third and fourth power sources are stopped from being in operation. It is therefore possible to reduce the power consumption by an amount corresponding to operations of the third and fourth power sources in the first operation mode, which operations are unnecessary in the first operation mode.

As a result, it is possible to realize a memory device which can (i) carry out the first operation mode in which a discrete level is supplied to a memory cell so as to cause the memory cell to retain a logical level, and (ii) prevent unnecessary power consumption due to operations of the power sources in the first operation mode, which power sources are unnecessary in the first operation.

Further, the first operation mode is carried out with a power source voltage in a range which is identical with a difference between the first potential level and the second potential level. It is therefore possible to have a reduction in power consumption by carrying out the operation with a power source voltage within a significantly narrow range which could not be realized with a conventional technique.

In the third memory device, at least a part of the memory cell can be constituted by a CMOS circuit, which part is controlled from an outside of the memory cell.

According to the arrangement, at least the part of the memory cell is constituted by the COMS circuit, which part is controlled from the outside of the memory cell. Further, in a case where a part of the memory cell is controlled inside the memory cell, the part is controlled by use of binary logical levels. Accordingly, it is possible to operate the memory cell by use of only the binary logical levels. It is therefore possible to stop the operations of the third power source and the fourth power source easily.

Further, a fourth memory device of the present invention in accordance with any one of the first, second, and third memory devices, further includes: a first line being provided for each of the plurality of rows of the memory array, the first line being connected to corresponding ones of the plurality of memory cells, provided at the each of the plurality of rows; a second line being connected to the corresponding ones of the plurality of memory cells, provided at the each of the plurality of rows; a third line being connected to the corresponding ones of the plurality of memory cells, provided at the each of the plurality of rows; and a fourth line being provided for each of the plurality of columns of the memory array, the fourth line (i) being connected to corresponding ones of the plurality of memory cells, provided at the each of the plurality of columns and (ii) being driven so that the column driver supplies the one of the plurality of discrete levels, each of the plurality of memory cells including a switching circuit, a first retention section, a transfer section, a second retention section, and a first control section, the switching circuit being driven by the row driver via the first line so as to cause selectively the fourth line and the first retention section to be (i) electrically connected to each other or (ii) electrically disconnected from each other, the first retention section receiving the one of the plurality of discrete levels from the first retention section and retaining the one of the plurality of logical levels in accordance with one of the plurality of discrete levels, the transfer section being driven via the second line so as to carry out selectively (i) a transfer operation in which the one of the plurality of logical levels, retained by the first retention section, is transferred from the first retention section to the second retention section, while the first retention section keeps retaining the one of the plurality of logical levels, or (ii) a non-transfer operation in which the transfer operation is not carried out, the second retention section retaining the one of the plurality of logical levels thus received, the first control section being driven via the third line so as to control, in accordance with the one of the plurality of logical levels supplied to the second retention section, the one of the plurality of logical levels, retained by the first retention section.

According to the fourth memory device, it is possible to, in the first operation mode, retain the logical level in the memory cell by use of the first retention section and the second retention section, while refreshing the logical level. It becomes therefore unnecessary to carry out the refresh operation externally. Accordingly, in the first operation mode, it is possible to (i) reduce the power consumption by stopping the operation(s) of the third power source and/or the fourth power source, and (ii) reduce the power consumption related to the refresh operation.

Moreover, a fifth memory device of the present invention in accordance with any one of the first, second, and third memory devices, further includes: a first line being provided for each of the plurality of rows of the memory array, the first line being connected to corresponding ones of the plurality of memory cells, provided at the each of the plurality of rows; a second line being connected to the corresponding ones of the plurality of memory cells, provided at the each of the plurality of rows; a third line being connected to the corresponding ones of the plurality of memory cells, provided at the each of the plurality of rows; and a fourth line being provided for each of the plurality of columns of the memory array, the fourth line (i) being connected to corresponding ones of the plurality of memory cells, provided at the each of the plurality of columns and (ii) being driven so that the column driver supplies the one of the plurality of discrete levels, each of the plurality of memory cells including a switching circuit, a first retention section, a transfer section, a second retention section, and a first control section, the switching circuit being driven by the row driver via the first line so as to cause selectively the fourth line and the first retention section to be (i) electrically connected to each other or (ii) electrically disconnected from each other, the first retention section receiving the one of the plurality of discrete levels from the first retention section and retaining the one of the plurality of logical levels in accordance with one of the plurality of discrete levels, the transfer section being driven via the second line so as to carry out selectively (i) a transfer operation in which the one of the plurality of logical levels, retained by the first retention section, is transferred from the first retention section to the second retention section, while the first retention section keeps retaining the one of the plurality of logical levels, or (ii) a non-transfer operation in which the transfer operation is not carried out, the second retention section retaining the one of the plurality of logical levels thus received, the first control section being driven via the third line so as to be selectively controlled to be in a state for carrying out a first operation or in a state for carrying out a second operation, the first operation being an operation for controlling, in accordance with control information represented by the one of the plurality of logical levels retained by the second retention section, the first control section to be in (i) an active state in which the first control section receives an input and supplies the input, as an output, to the first retention section, or (ii) an inactive state in which the first control section does not supply its output, the second operation being an operation for causing the first control section to stop supplying its output, irrespective of the control information, the memory device still further including: a supply source for supplying a potential to the first control section, which potential is set as the input of the first control section.

According to the fifth memory device, it is possible to, in the first operation mode, retain the logical level in the memory cell by use of the first retention section and the second retention section, while refreshing the logical level. It becomes therefore unnecessary to carry out the refresh operation externally. Accordingly, in the first operation mode, it is possible to (i) reduce the power consumption by stopping the operation(s) of the third power source and/or the fourth power source, and (ii) reduce power consumption related to the refresh operation.

Further, the first control section can have an arrangement in which no inverter is provided. Accordingly, it is possible to (i) avoid an increase in power consumption due to a flow through current, and (ii) avoid generation of a malfunction by causing the first retention section and the second retention section to retain the same logical level, even if there is a leakage in a transfer element of the transfer section.

Further, in any one of the memory devices described above, the third power source can generate a potential to be supplied by stepping up a higher one of the first potential level and the second potential level.

According to the arrangement, it is possible to generate the potential supplied from the third power source by supplying, from an external power source, the higher one of the first and second potential levels. Accordingly, it is possible to reduce the number of external power sources.

Furthermore, in any one of the memory devices described above, the fourth power source can generate a potential to be supplied by stepping down a lower one of the first potential level and the second potential level.

According to the arrangement, it is possible to generate the potential supplied from the fourth power source by supplying, from an external power source, the lower one of the first potential level and the second potential level. Accordingly, it is possible to reduce the number of external power sources.

Moreover, a display device of the present invention includes: any one of the memory devices described above; and a liquid crystal capacitor in each of the plurality of memory cells, the liquid crystal capacitor receiving a data signal from the column driver, in the first operation mode, the one of the plurality of discrete levels, supplied from the column driver, being the data signal, the column driver being capable of supplying multivalued level data signal which is the data signal having potential levels, the number of which is greater than the number of the plurality of discrete levels, the first power source, the second power source, the third power source, and the fourth power source being capable of, in combination with each other, carrying out a second operation mode in which the multivalued level data signal is supplied.

According to the arrangement, in a case where first operation mode is carried out, power sources other than power sources which are necessary in the first operation mode are stopped from being operation. In a case where the second operation mode is carried out, the first, second, third, and fourth power sources are caused to be in operation. It is therefore possible to realize a display device which has multiple functions and high power source efficiency.

Further, in the display device described above, the third and fourth power sources can be used to generate a gate pulse used in the second operation mode.

According to the arrangement, in the second operation mode, it is possible to generate a gate pulse having an amplitude sufficient for supplying a multivalued level data to the memory cell.

The present invention is not limited to the description of the embodiments above, but may be altered by a skilled person within the scope of the claims. In other words, an embodiment based on a proper combination of technical means disclosed in different embodiments is encompassed in the technical scope of the present invention.

INDUSTRIAL APPLICABILITY

The present invention is suitably applicable to a display of a mobile phone or the like.

REFERENCE SIGNS LIST

1: Memory device
3: Liquid crystal display device (display device)
10: Memory array
14: Word line control circuit (row driver)
15: Writing/reading circuit (column driver)
20: Memory cell
40: Pixel (memory cell)
VDD: Power source (first power source)
VSS: Power source (second power source)
GVDD: Power source (third power source)
GVSS: Power source (fourth power source)
SC1: Switch control line (first line)
DT1: Data transfer control line (second line)
RC1: Refresh output control line (third line)
IN1: Data input line (fourth line)
Xi(1) (1≤i≤n): First word line (first line)
Xi(2) (1≤i≤n): Second word line (second line, supply source)
Xi(3) (1≤i≤n): Third word line (third line)
Yj (1≤j≤m): Bit line (fourth line)
DS1: First data retention section (first retention section)
DS2: Second data retention section (second retention section)
TS1: Data transfer section (transfer section)
RS1: Refresh output control section (first control section)
VS1: Supply source
L1, L2: Control line (supply source)

The invention claimed is:

1. A memory device comprising:
a memory array in which a plurality of memory cells are arranged in a matrix manner;
a row driver for driving each of a plurality of rows of the memory array;
a column driver for driving each of a plurality of columns of the memory array, the column driver being capable of supplying, by use of one of a plurality of discrete levels, to each of the plurality of the memory cells, one of a plurality of logical levels to be retained by the memory cell;
a first power source for supplying a first potential level;
a second power source for supplying a second potential level;
a third power source for supplying a potential which is higher than a highest potential of the plurality of discrete levels; and
a fourth power source for supplying a potential which is lower than a lowest potential of the plurality of discrete levels,
the first potential level and the second potential level being used to supply the plurality of discrete levels,
the first power source and the second power source being capable of, in combination with each other, carrying out a first operation mode in which the column driver supplies the one of the plurality of discrete levels to the memory cell so as to cause the memory cell to retain the one of the plurality of logical levels,
in a case where the first operation mode is carried out, the first power source and the second power source being caused to be in operation, and at least one of the third power source and the fourth power source being stopped from being in operation.

2. The memory device as set forth in claim 1, wherein:
the first power source, the second power source and the third power source being capable of, in combination with each other, carrying out the first operation,
in the case where the first operation mode is carried out, the first power source, the second power source and the third power source being caused to be in operation, and the fourth power source being stopped from being in operation.

3. The memory device as set forth in claim 2, wherein:
a difference between the potential supplied from the third power source and a lower one of the first potential level and the second potential level is not more than twice a difference between the first potential level and the second potential level.

4. The memory device as set forth in claim 1, wherein:
the first power source, the second power source and the fourth power source being capable of, in combination with each other, carrying out the first operation,
in the case where the first operation mode is carried out, the first power source, the second power source, and the fourth power source being caused to be in operation, and the third power source being stopped from being in operation.

5. The memory device as set forth in claim 4, wherein:
a difference between the potential of the fourth power source and a higher one of the first potential level and the second potential level is not more than twice a difference between the first potential level and the second potential level.

6. The memory device as set forth in claim 1, wherein:

in the case where the first operation mode is carried out, the first power source and the second power source being caused to be in operation, and both of the third power source and the fourth power source being stopped from being in operation.

7. The memory device as set forth in claim 6, wherein:

at least a part of the memory cell is constituted by a CMOS circuit, which part is controlled from an outside of the memory cell.

8. The memory device as set forth in claim 1, wherein:

the number of the plurality of discrete levels is two.

9. The memory device as set forth in claim 8, wherein:

the highest potential is identical with one of the first potential level and the second potential level, while the lowest potential is identical with the other one of the first potential level and the second potential level.

10. The memory device as set forth in claim 1, wherein:

the number of the plurality of logical levels is two.

11. The memory device as set forth in claim 1, further comprising:

a first line being provided for each of the plurality of rows of the memory array, the first line being connected to corresponding ones of the plurality of memory cells, provided at the each of the plurality of rows;

a second line being connected to the corresponding ones of the plurality of memory cells, provided at the each of the plurality of rows;

a third line being connected to the corresponding ones of the plurality of memory cells, provided at the each of the plurality of rows; and a fourth line being provided for each of the plurality of columns of the memory array, the fourth line (i) being connected to corresponding ones of the plurality of memory cells, provided at the each of the plurality of columns and (ii) being driven so that the column driver supplies the one of the plurality of discrete levels, each of the plurality of memory cells including a switching circuit, a first retention section, a transfer section, a second retention section, and a first control section, the switching circuit being driven by the row driver via the first line so as to cause selectively the fourth line and the first retention section to be (i) electrically connected to each other or (ii) electrically disconnected from each other, the first retention section receiving the one of the plurality of discrete levels from the first retention section and retaining the one of the plurality of logical levels in accordance with one of the plurality of discrete levels, the transfer section being driven via the second line so as to carry out selectively (i) a transfer operation in which the one of the plurality of logical levels, retained by the first retention section, is transferred from the first retention section to the second retention section, while the first retention section keeps retaining the one of the plurality of logical levels, or (ii) a non-transfer operation in which the transfer operation is not carried out, the second retention section retaining the one of the plurality of logical levels thus received, the first control section being driven via the third line so as to control, in accordance with the one of the plurality of logical levels supplied to the second retention section, the one of the plurality of logical levels, retained by the first retention section.

12. The memory device as set forth in claim 1, further comprising:

a first line being provided for each of the plurality of rows of the memory array, the first line being connected to corresponding ones of the plurality of memory cells, provided at the each of the plurality of rows;

a second line being connected to the corresponding ones of the plurality of memory cells, provided at the each of the plurality of rows;

a third line being connected to the corresponding ones of the plurality of memory cells, provided at the each of the plurality of rows; and a fourth line being provided for each of the plurality of columns of the memory array, the fourth line (i) being connected to corresponding ones of the plurality of memory cells, provided at the each of the plurality of columns and (ii) being driven so that the column driver supplies the one of the plurality of discrete levels, each of the plurality of memory cells including a switching circuit, a first retention section, a transfer section, a second retention section, and a first control section, the switching circuit being driven by the row driver via the first line so as to cause selectively the fourth line and the first retention section to be (i) electrically connected to each other or (ii) electrically disconnected from each other, the first retention section receiving the one of the plurality of discrete levels from the first retention section and retaining the one of the plurality of logical levels in accordance with one of the plurality of discrete levels, the transfer section being driven via the second line so as to carry out selectively (i) a transfer operation in which the one of the plurality of logical levels, retained by the first retention section, is transferred from the first retention section to the second retention section, while the first retention section keeps retaining the one of the plurality of logical levels, or (ii) a non-transfer operation in which the transfer operation is not carried out, the second retention section retaining the one of the plurality of logical levels thus received, the first control section being driven via the third line so as to be selectively controlled to be in a state for carrying out a first operation or in a state for carrying out a second operation, the first operation being an operation for controlling, in accordance with control information represented by the one of the plurality of logical levels retained by the second retention section, the first control section to be in (i) an active state in which the first control section receives an input and supplies the input, as an output, to the first retention section, or (ii) an inactive state in which the first control section does not supply its output, the second operation being an operation for causing the first control section to stop supplying its output, irrespective of the control information, the memory device still further comprising:

a supply source for supplying a potential to the first control section, which potential is set as the input of the first control section.

13. The memory device as set forth in claim 1, wherein:

the third power source generates a potential to be supplied by stepping up a higher one of the first potential level land the second potential level.

14. The memory device as set forth in claim 1, wherein:

the fourth power source generates a potential to be supplied by stepping down a lower one of the first potential level and the second potential level.

15. A display device comprising:

a memory device recited in claim 1; and a liquid crystal capacitor in each of the plurality of memory cells, the liquid crystal capacitor receiving a data signal from the column driver, in the first operation mode, the one of the plurality of discrete levels, supplied from the column driver, being the data signal, the column driver being capable of supplying multivalued level data signal which is the data signal having potential levels, the number of which is greater than the number of the plurality of discrete levels, the first power source, the second power source, the third power source, and the fourth power source being capable of, in combination with each other, carrying out a second operation mode in which the multivalued level data signal is supplied.

16. The display device as set forth in claim 15, wherein:

the third power source and the fourth power source are used to generate a gate pulse used in the second operation mode.

17. A method of driving a memory device, the memory device including:

a memory array in which a plurality of memory cells are arranged in a matrix manner;

a row driver for driving each of a plurality of rows of the memory array;

a column driver for driving each of a plurality of columns of the memory array, the column driver being capable of supplying, by use of one of a plurality of discrete levels, to each of the plurality of the memory cells, one of a plurality of logical levels to be retained by the memory cell;

a first power source for supplying a first potential level;

a second power source for supplying a second potential level;

a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source and the second power source being capable of, in combination with each other, carrying out a first operation mode in which the column driver supplies the one of the plurality of discrete levels to the memory cell so as to cause the memory cell to retain the one of the plurality of logical levels, the method comprising the step of:

in a case where the first operation mode is carried out, causing (i) the first power source and the second power source to be in operation and (ii) at least one of the third power source and the fourth power source to be stopped from being in operation.

18. A method of driving a display device, the display device including:

a memory array in which a plurality of memory cells are arranged in a matrix manner;

a row driver for driving each of a plurality of rows of the memory array;

a column driver for driving each of a plurality of columns of the memory array, the column driver being capable of supplying, by use of one of a plurality of discrete levels, to each of the plurality of the memory cells, one of a plurality of logical levels to be retained by the memory cell;

a liquid crystal capacitor in each of the plurality of memory cells, the liquid crystal capacitor receiving a data signal from the column driver;

a first power source for supplying a first potential level;

a second power source for supplying a second potential level;

a third power source for supplying a potential which is higher than a highest potential of the plurality of discrete levels; and a fourth power source for supplying a potential which is lower than a lowest potential of the plurality of discrete levels, the first potential level and the second potential level being used to supply the plurality of discrete levels, the first power source and the second power source being capable of, in combination with each other, carrying out a first operation mode in which the column driver supplies the one of the plurality of discrete levels to the memory cell so as to cause the memory cell to retain the one of the plurality of logical levels, the one of the plurality of discrete levels, supplied from the column driver, being the data signal in the first operation mode, the column driver being capable of supplying a multivalued level data signal which is the data signal having potential levels, the number of which is greater than the number of the plurality of discrete levels, the first power source, the second power source, the third power source, and the fourth power source being capable of, in combination with each other, carrying out a second operation mode in which the multivalued level data signal is supplied to the memory cell, the method comprising the steps of:

in a case where the first operation is carried out, causing (i) the first power source and the second power source to be in operation and (ii) at least one of the third power source and the fourth power source to be stopped from being in operation; and in a case where the second operation mode is carried out, causing the first power source, the second power source, the third power source, and the fourth power source to be in operation.

* * * * *